(12) United States Patent
Masuoka et al.

(10) Patent No.: US 11,667,401 B2
(45) Date of Patent: Jun. 6, 2023

(54) MULTICOPTER SYSTEM AND METHOD FOR TRANSFERRING GOODS

(71) Applicant: OSAKA UNIVERSITY, Osaka (JP)

(72) Inventors: Hiroya Masuoka, Osaka (JP); Hironori Ohigashi, Osaka (JP); Satoshi Yagi, Osaka (JP); Taisei Nishishita, Osaka (JP); Masato Tsuru, Osaka (JP); Hiroki Nishii, Osaka (JP); Yoshihiro Nakata, Osaka (JP)

(73) Assignee: OSAKA UNIVERSITY, Osaka (JP)

( * ) Notice: Subject to any disclaimer, the term of this patent is extended or adjusted under 35 U.S.C. 154(b) by 526 days.

(21) Appl. No.: 16/967,997

(22) PCT Filed: Jan. 18, 2019

(86) PCT No.: PCT/JP2019/001530
§ 371 (c)(1),
(2) Date: Aug. 6, 2020

(87) PCT Pub. No.: WO2019/155854
PCT Pub. Date: Aug. 15, 2019

(65) Prior Publication Data
US 2021/0371129 A1 Dec. 2, 2021

(30) Foreign Application Priority Data

Feb. 7, 2018 (JP) .............................. JP2018-020040

(51) Int. Cl.
*B64F 1/32* (2006.01)
*B64C 39/02* (2023.01)
(Continued)

(52) U.S. Cl.
CPC ............ *B64F 1/324* (2020.01); *B64C 39/024* (2013.01); *B64D 9/003* (2013.01); *B64F 1/12* (2013.01); *B64U 10/13* (2023.01); *B64U 2101/60* (2023.01)

(58) Field of Classification Search
CPC .......... B64F 1/324; B64F 1/12; B64C 39/024; B64D 9/003; B64U 10/13; B64U 2101/60
See application file for complete search history.

(56) References Cited

U.S. PATENT DOCUMENTS 3,081,964 A * 3/1963 Quenzler ............ B64C 29/0033
244/54
7,175,135 B2 * 2/2007 Dennis .................. B64C 39/024
244/110 F
(Continued)

FOREIGN PATENT DOCUMENTS

| JP | 2016-153337 | 8/2016 |
| JP | 2017-056924 | 3/2017 |
| JP | 2018-122781 | 8/2018 |

OTHER PUBLICATIONS

International Search Report for PCT/JP2019/001530 dated Apr. 9, 2019, 5 pages, with English Translation.
(Continued)

*Primary Examiner* — Justin M Benedik
(74) *Attorney, Agent, or Firm* — Nixon & Vanderhye PC

(57) ABSTRACT

A multicopter system according to one aspect of the present invention includes a multicopter configured to fly in a state of holding a package and a mooring device that is installed at a target position of a flight of the multicopter and includes a linear member that extends in a predetermined direction from the target position, the multicopter including a reception portion that has the shape of a recess including an
(Continued)

opening open toward one direction and is configured to receive the linear member via the opening.

10 Claims, 84 Drawing Sheets

(51) Int. Cl.
  B64D 9/00 (2006.01)
  B64F 1/12 (2006.01)
  *B64U 10/13* (2023.01)
  *B64U 101/60* (2023.01)

(56) References Cited

U.S. PATENT DOCUMENTS

| | | | |
|---|---|---|---|
| 7,954,758 B2* | 6/2011 | McGeer | B64C 39/024 244/110 G |
| 10,017,265 B1 | 7/2018 | Larsen | |
| 2012/0223182 A1* | 9/2012 | Gilchrist, III | B64F 1/0297 244/111 F |
| 2015/0158587 A1 | 6/2015 | Patrick et al. | |
| 2015/0175276 A1 | 6/2015 | Koster | |
| 2016/0114906 A1* | 4/2016 | McGeer | B64C 39/024 244/114 R |
| 2017/0225784 A1* | 8/2017 | Hayes | B63B 21/50 |
| 2018/0162528 A1* | 6/2018 | McGrew | B64F 1/02 |
| 2018/0327113 A1* | 11/2018 | von Flotow | B64F 1/029 |
| 2018/0356823 A1* | 12/2018 | Cooper | G08G 5/0013 |

OTHER PUBLICATIONS

Written Opinion of the ISA for PCT/JP2019/001530 dated Apr. 9, 2019, 4 pages.

Fujii et al., "Endless Flyer: Continuous Flying Drone with Automatic Batter Replacement", Information Processing Society of Japan; vol. 55; No. 8; pp. 1734-1742; Aug. 2014.

* cited by examiner

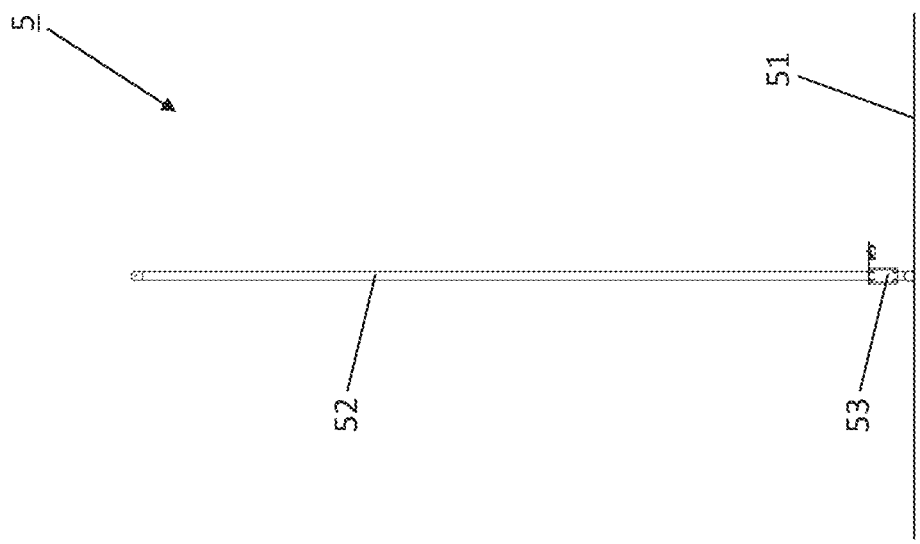

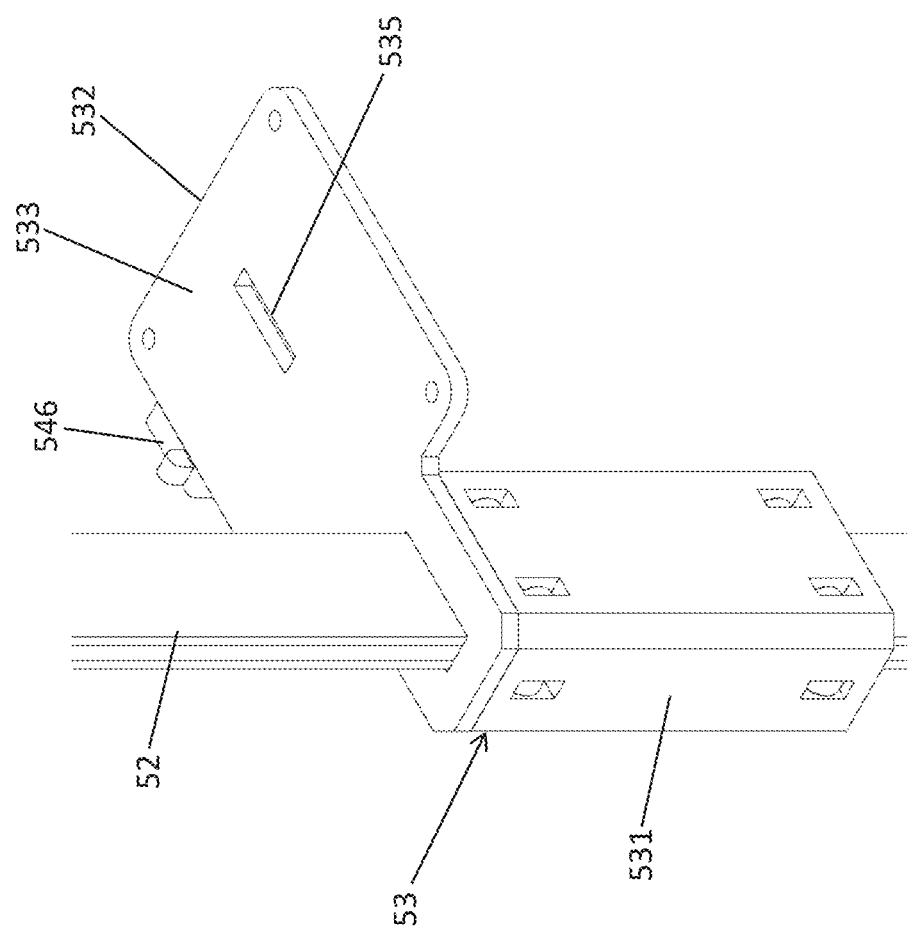

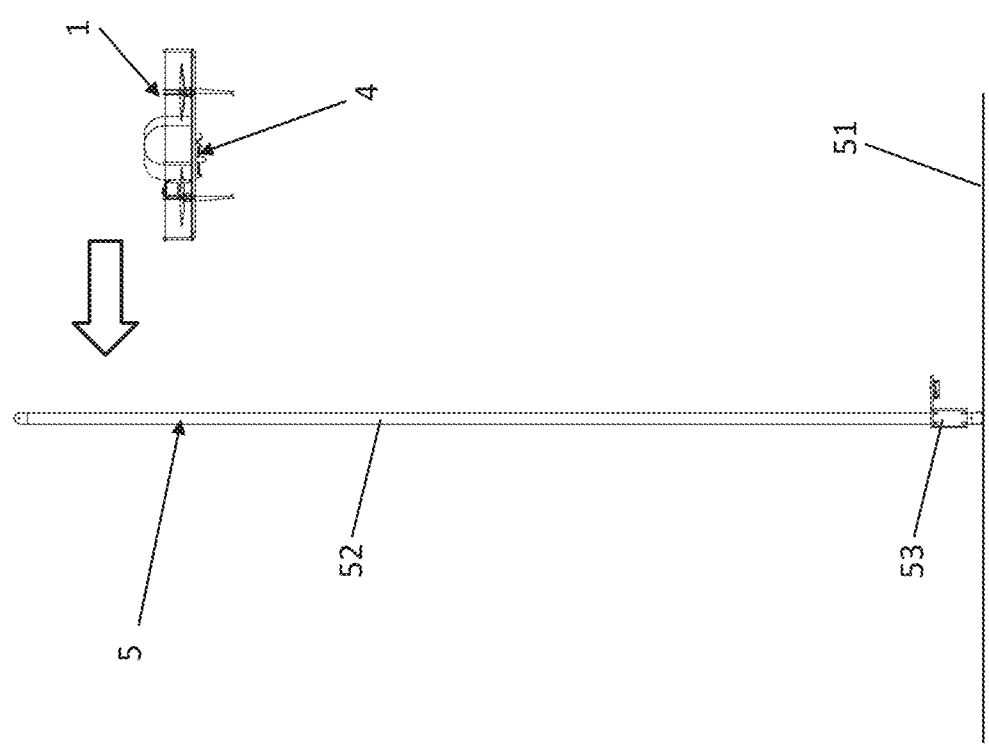

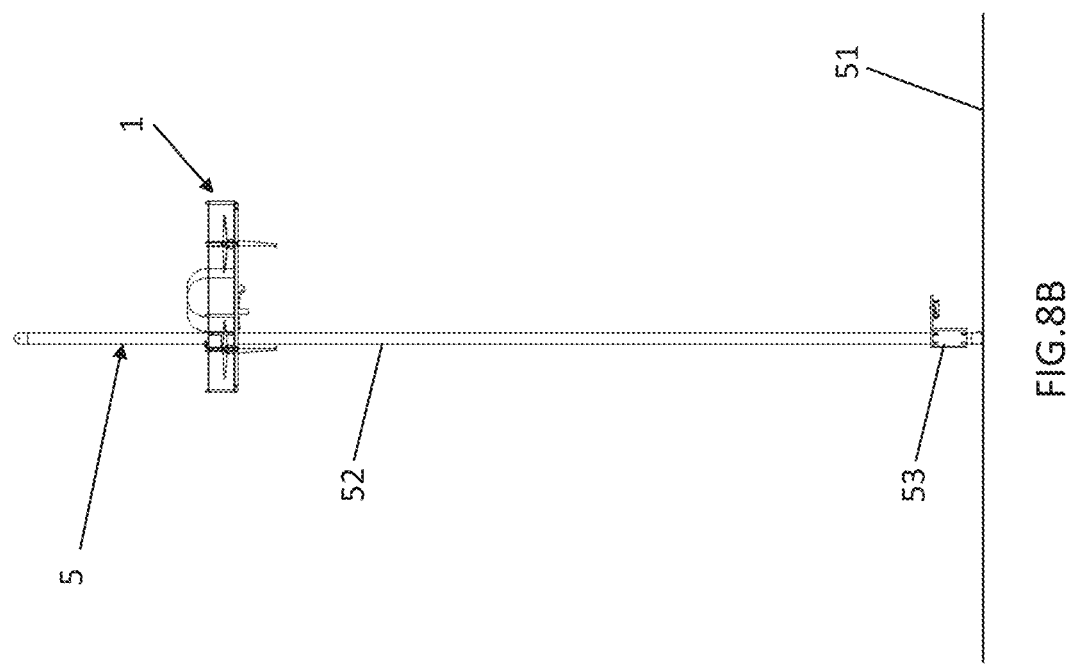

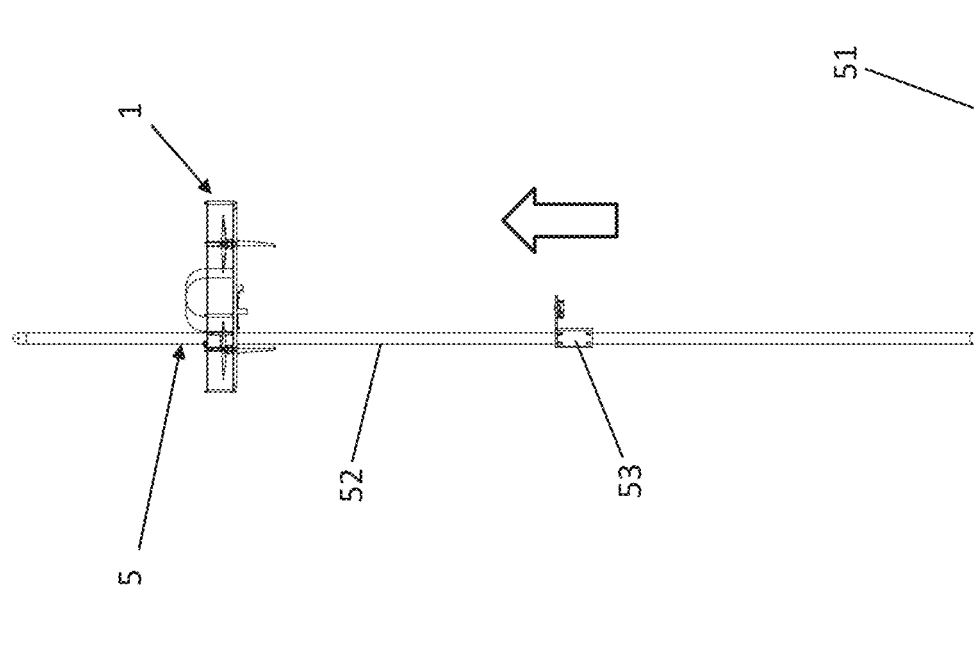

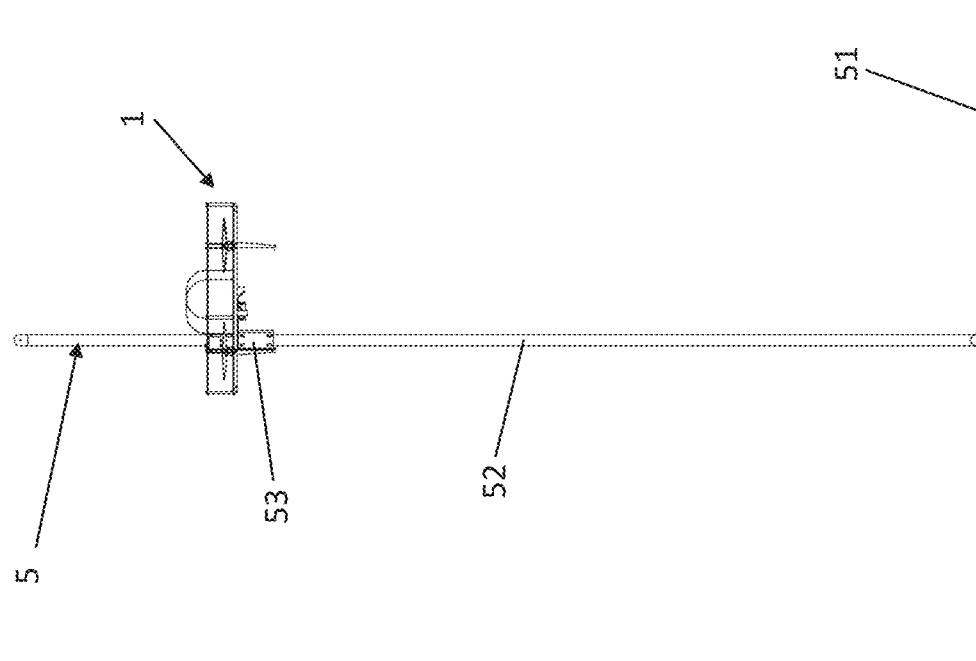

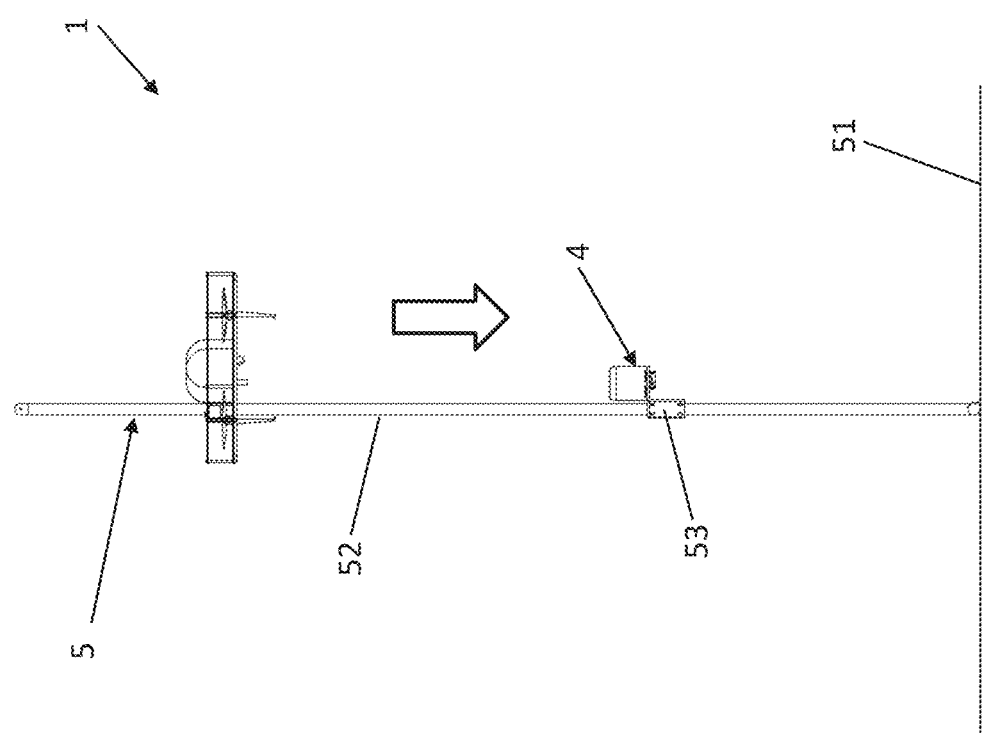

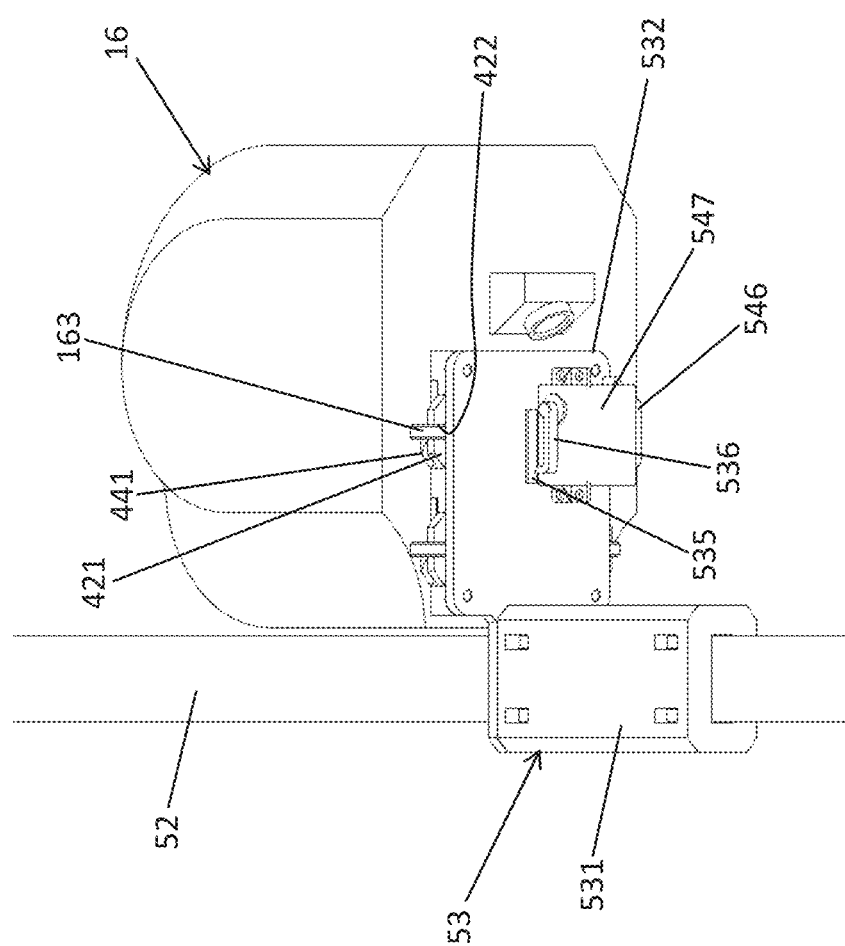

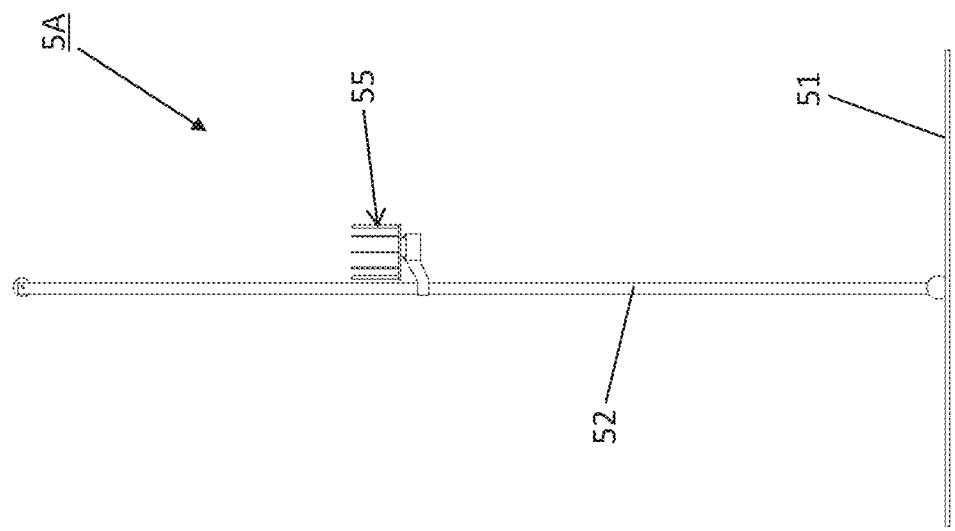

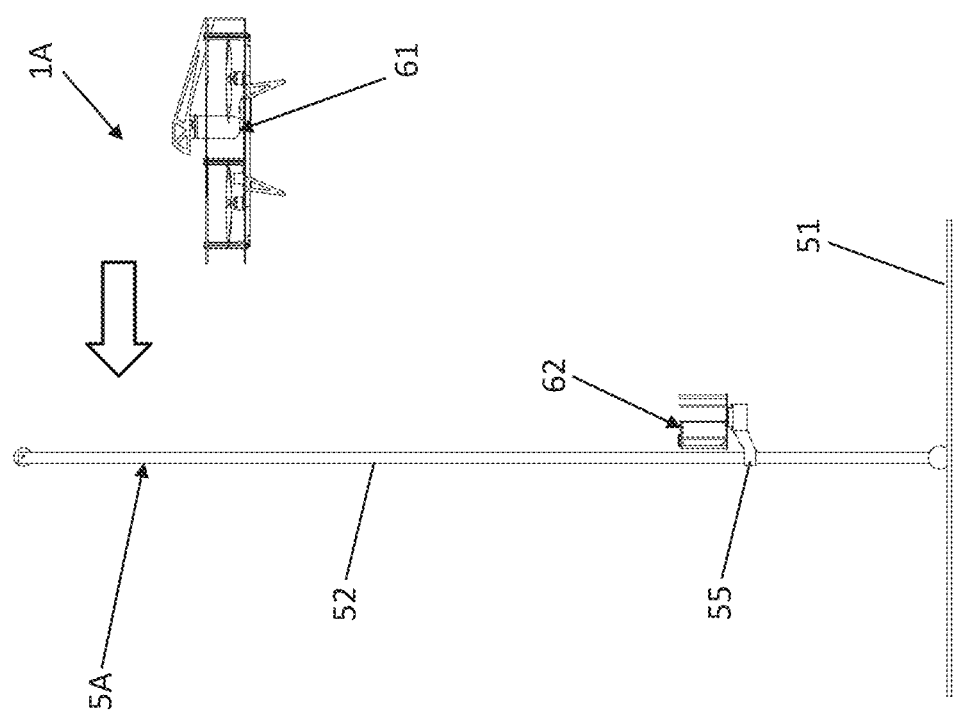

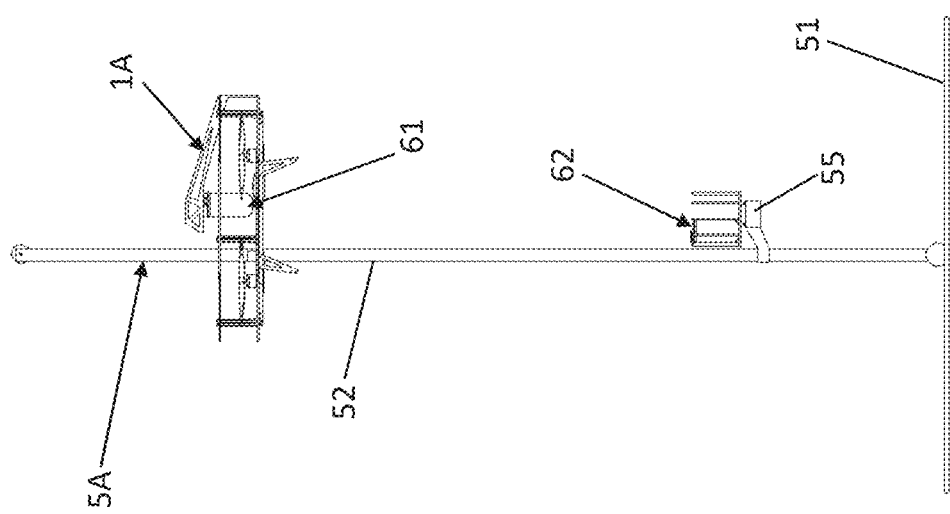

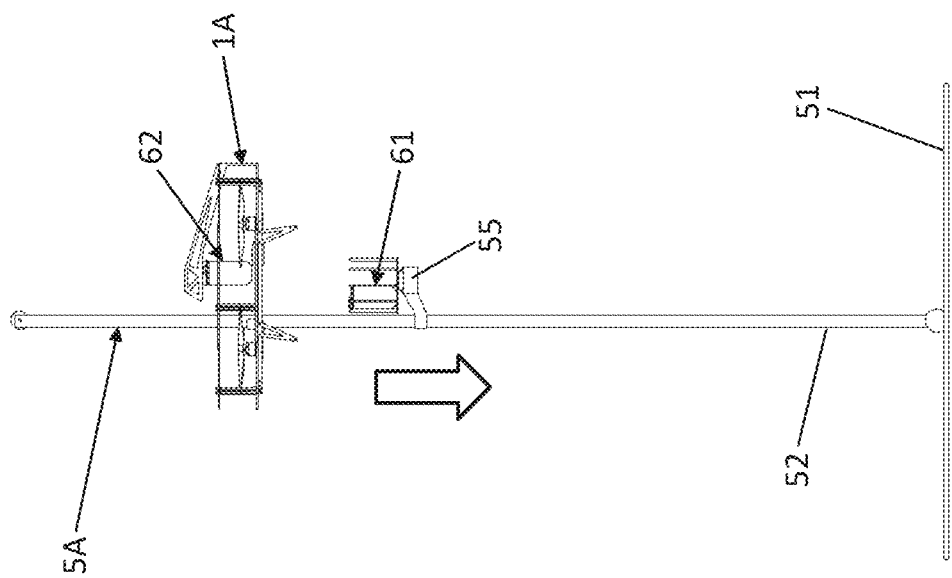

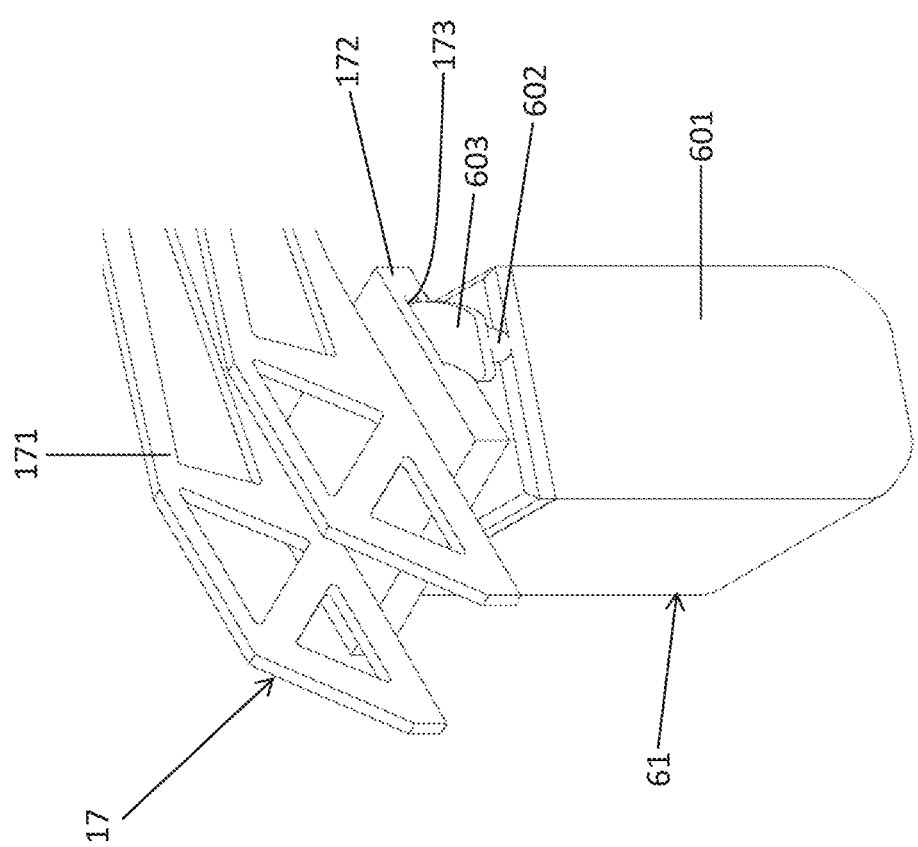

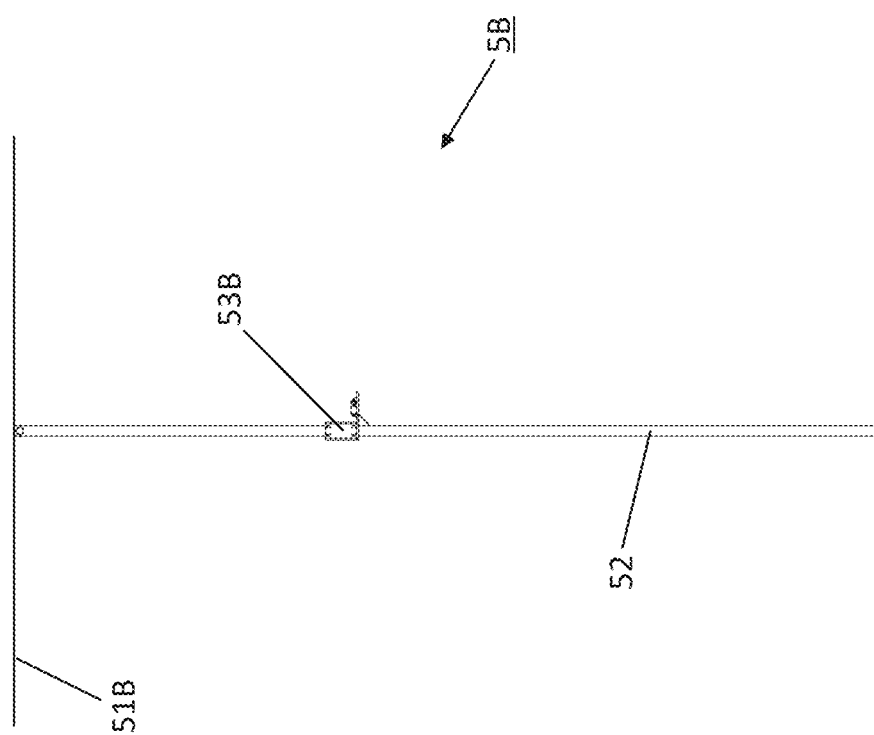

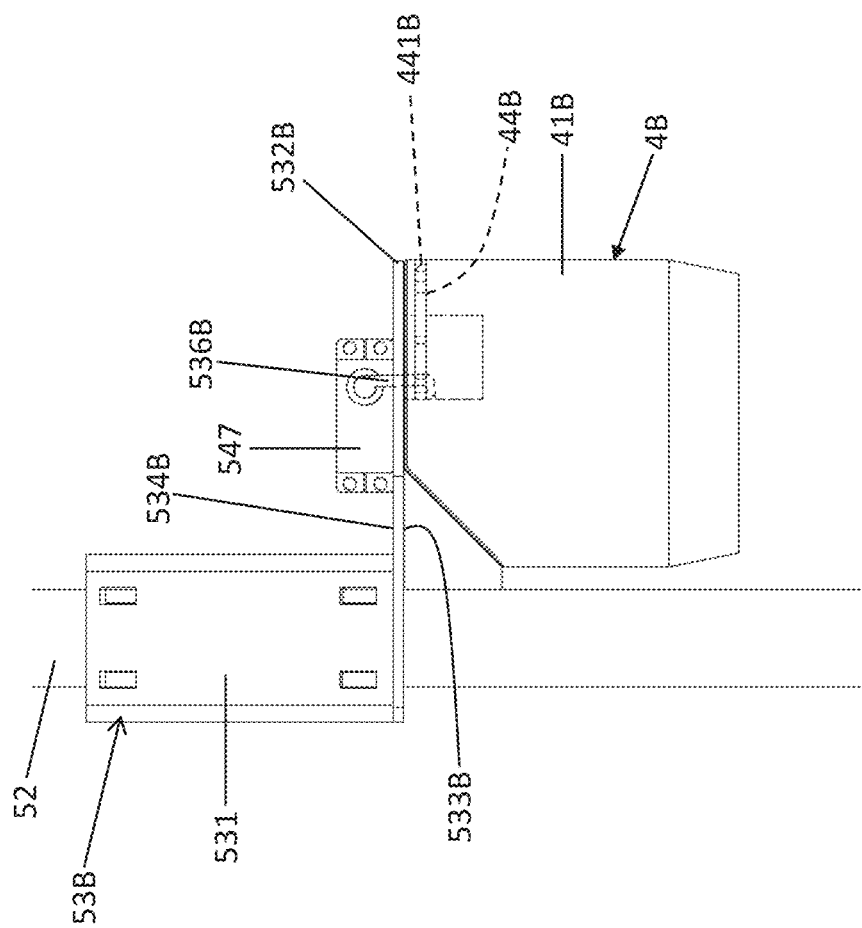

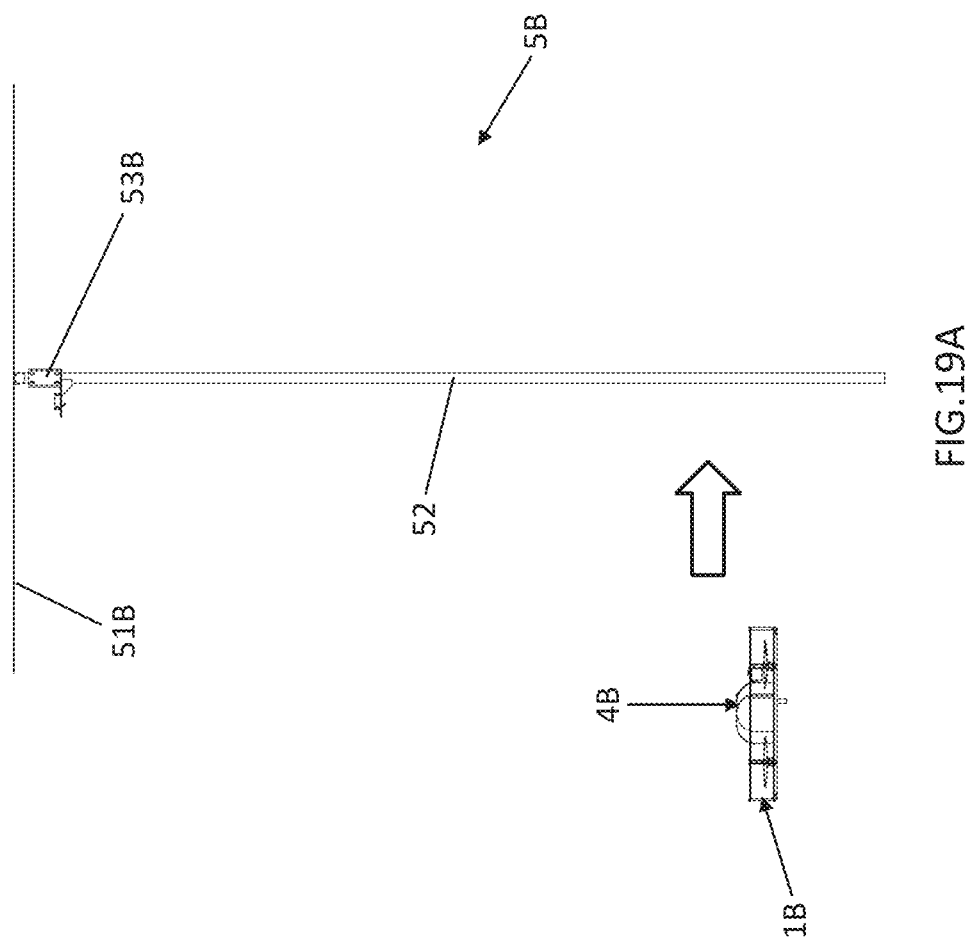

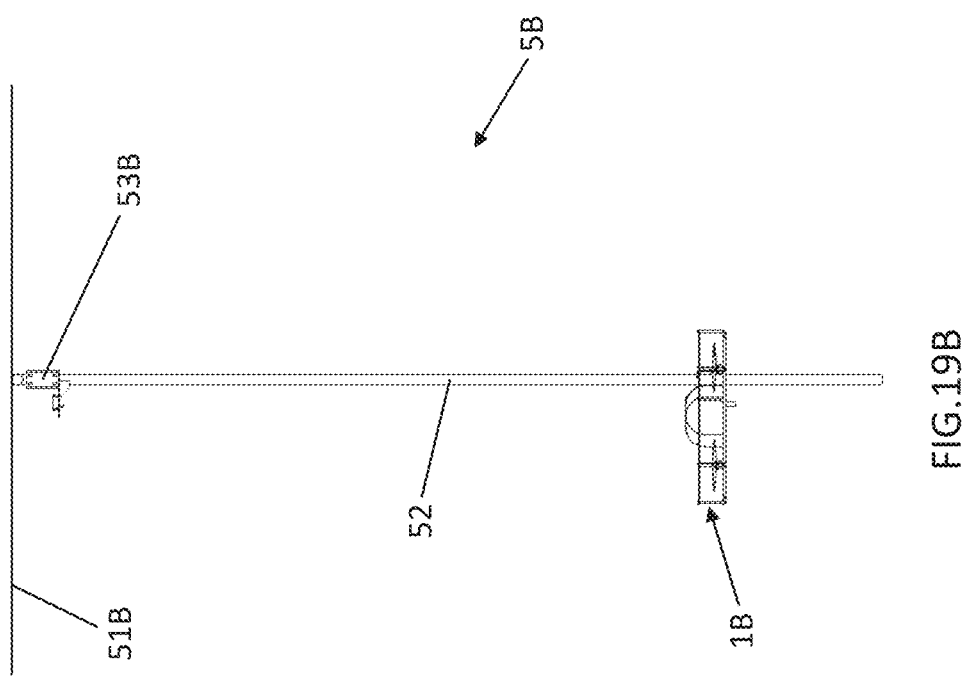

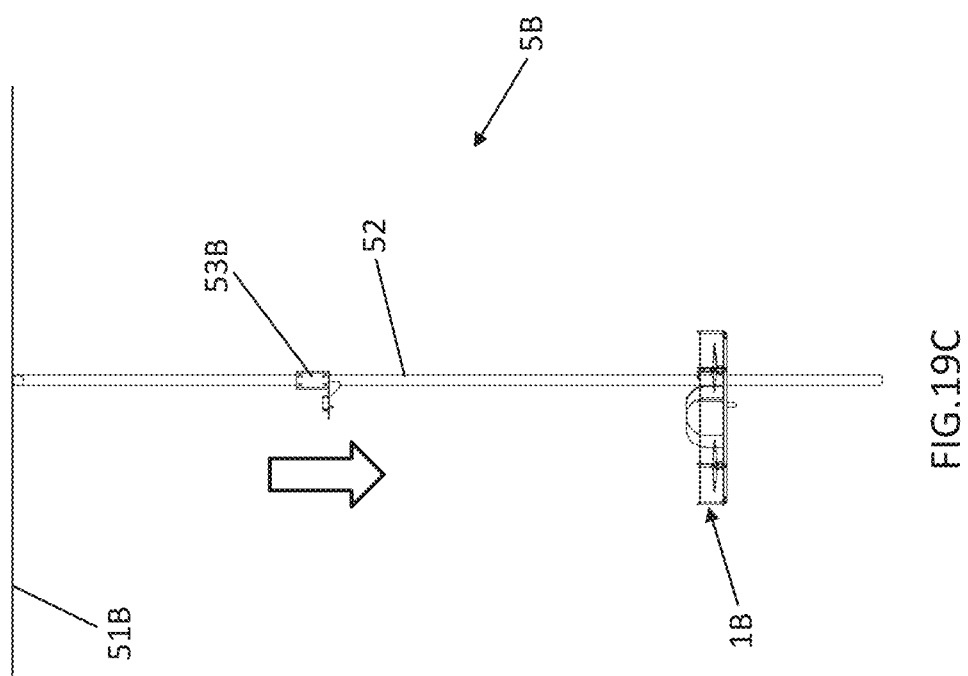

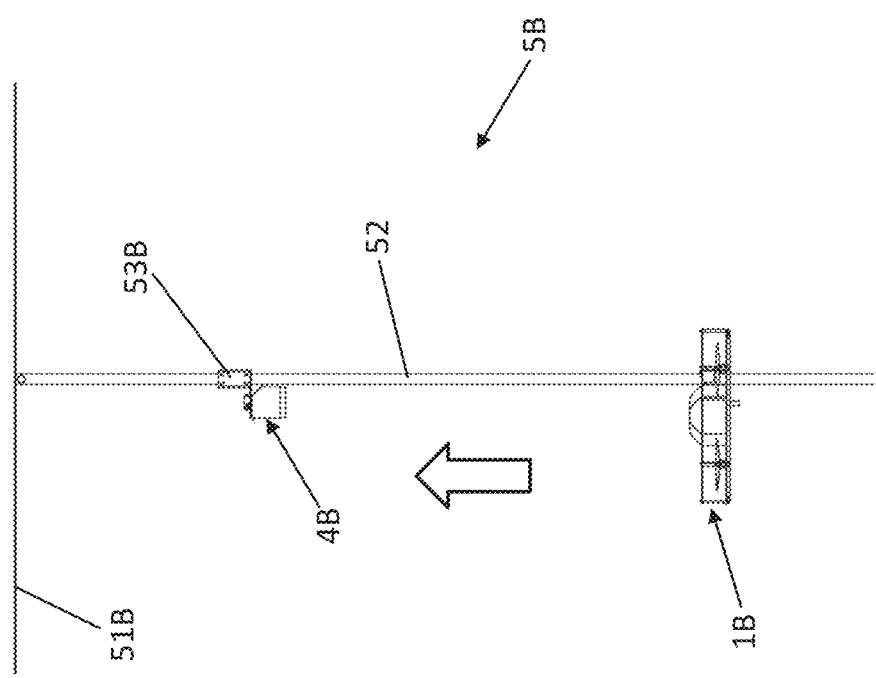

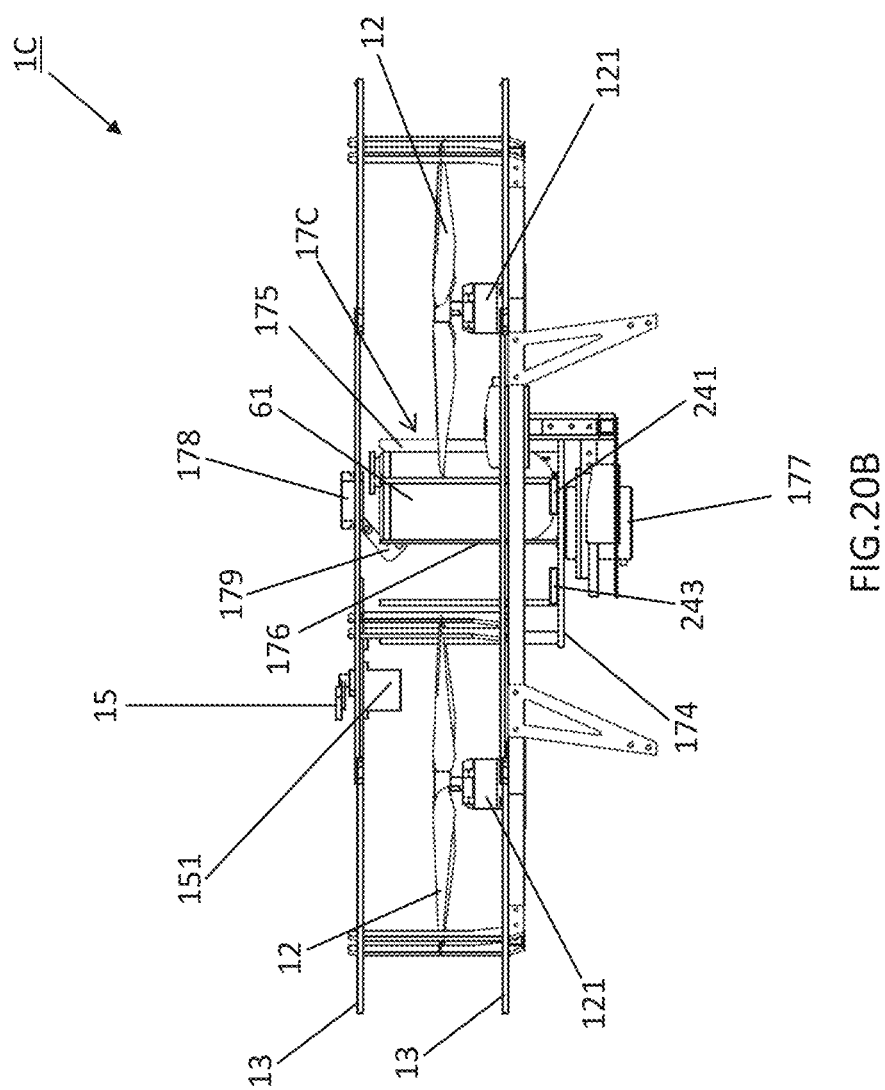

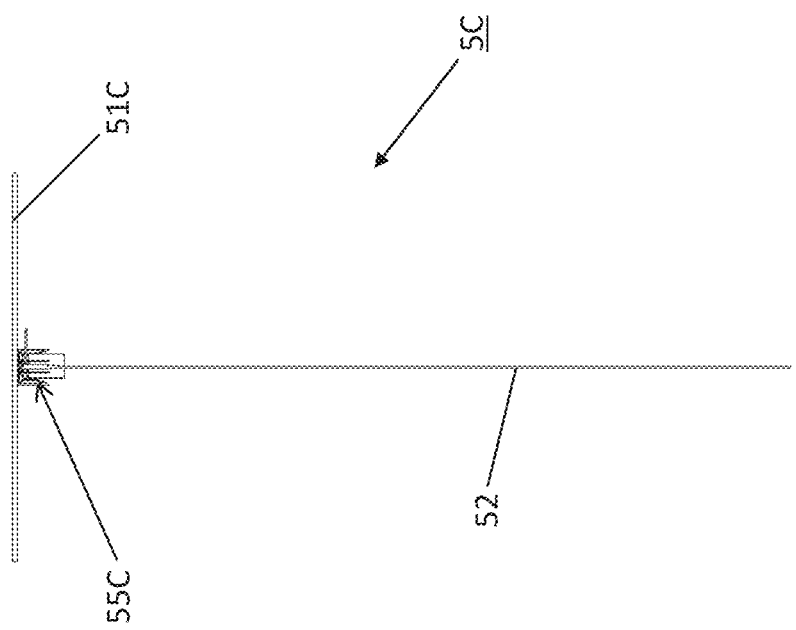

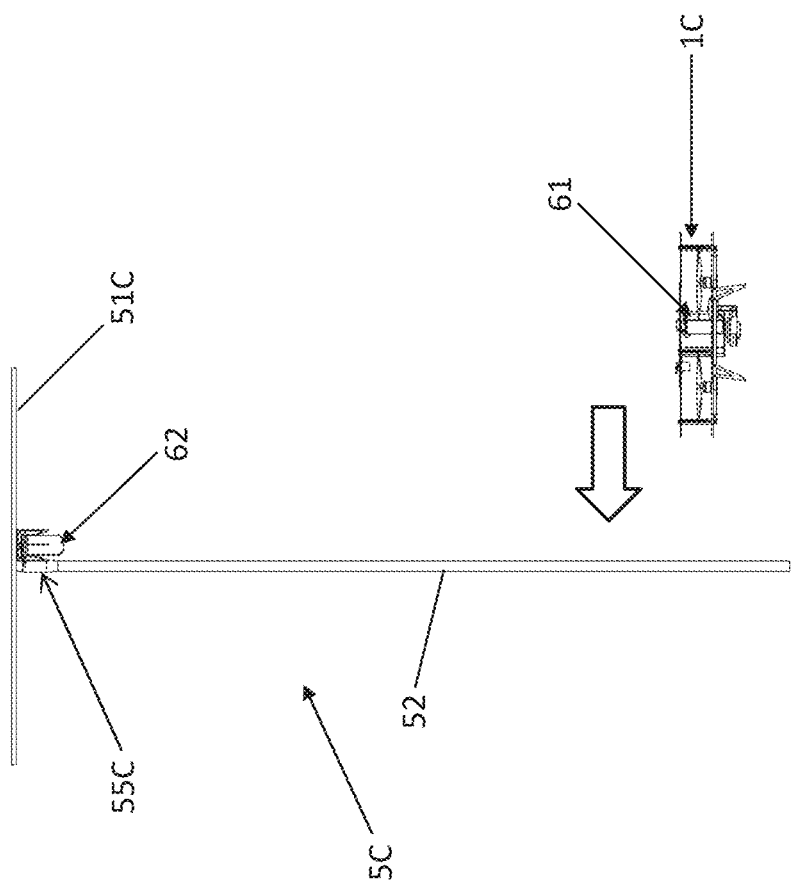

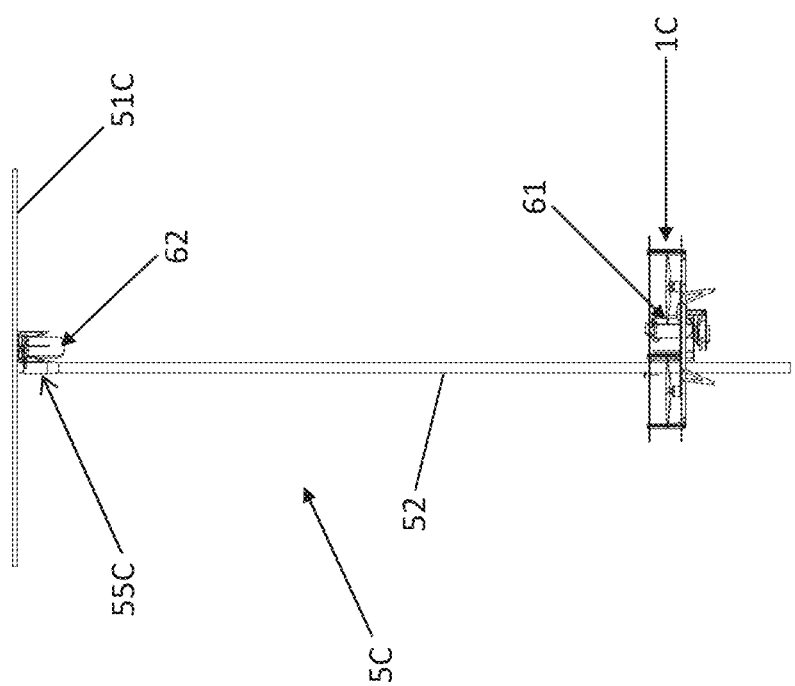

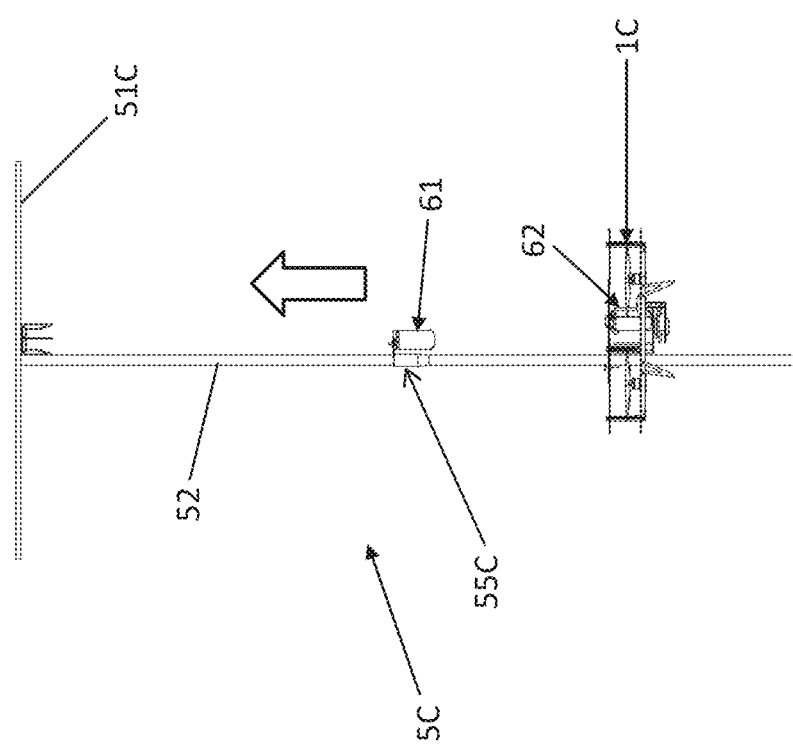

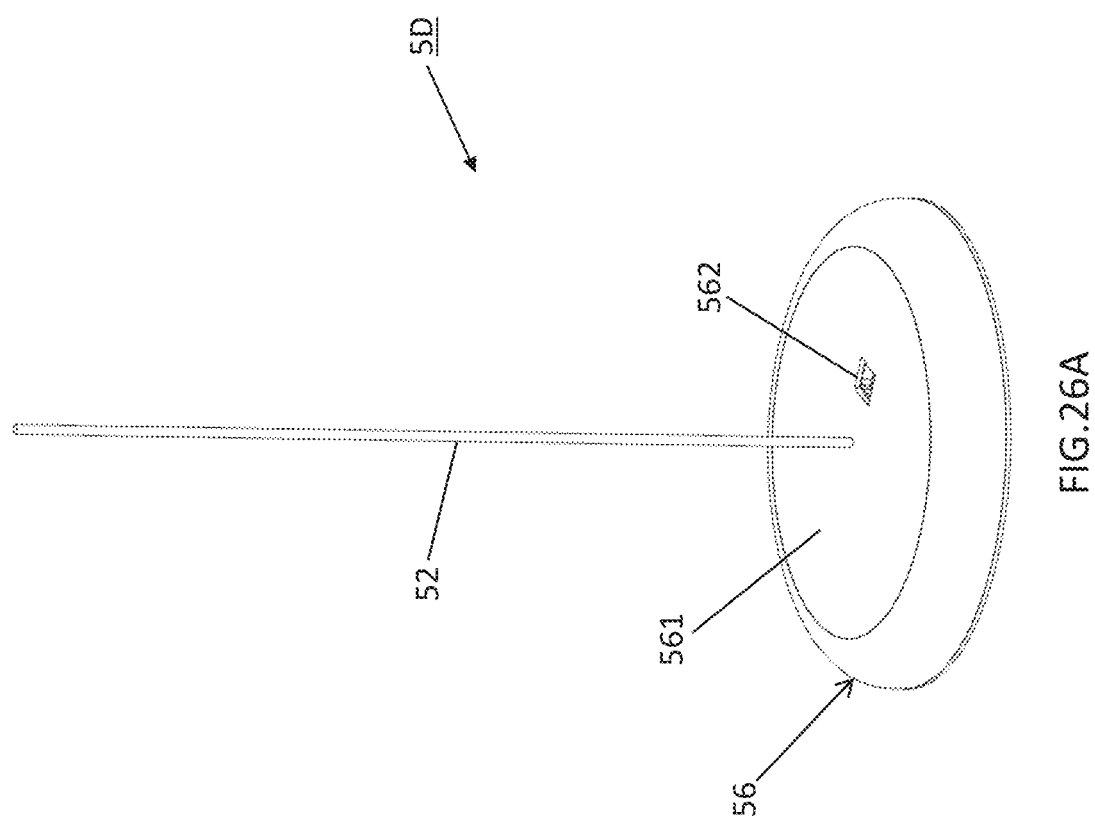

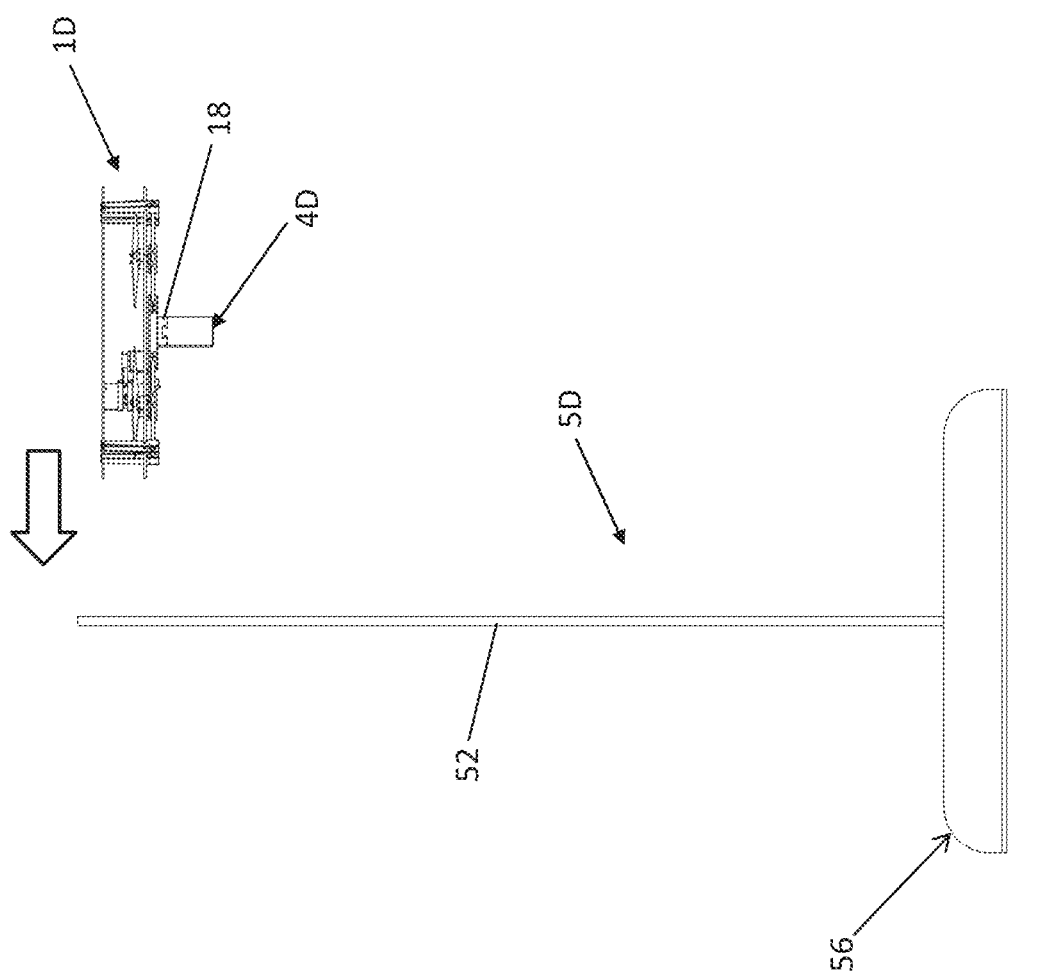

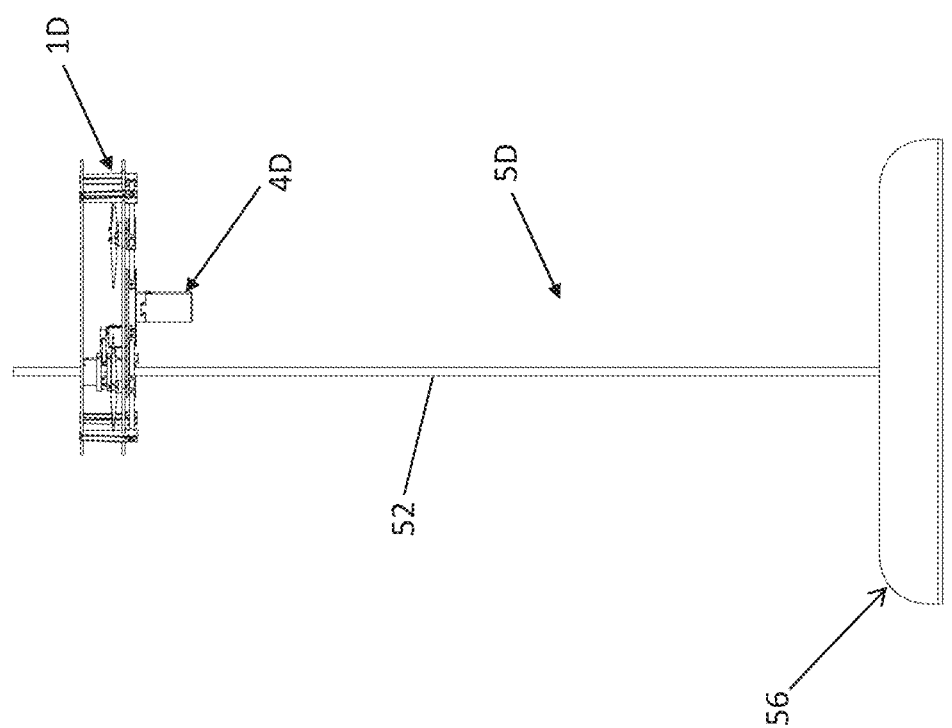

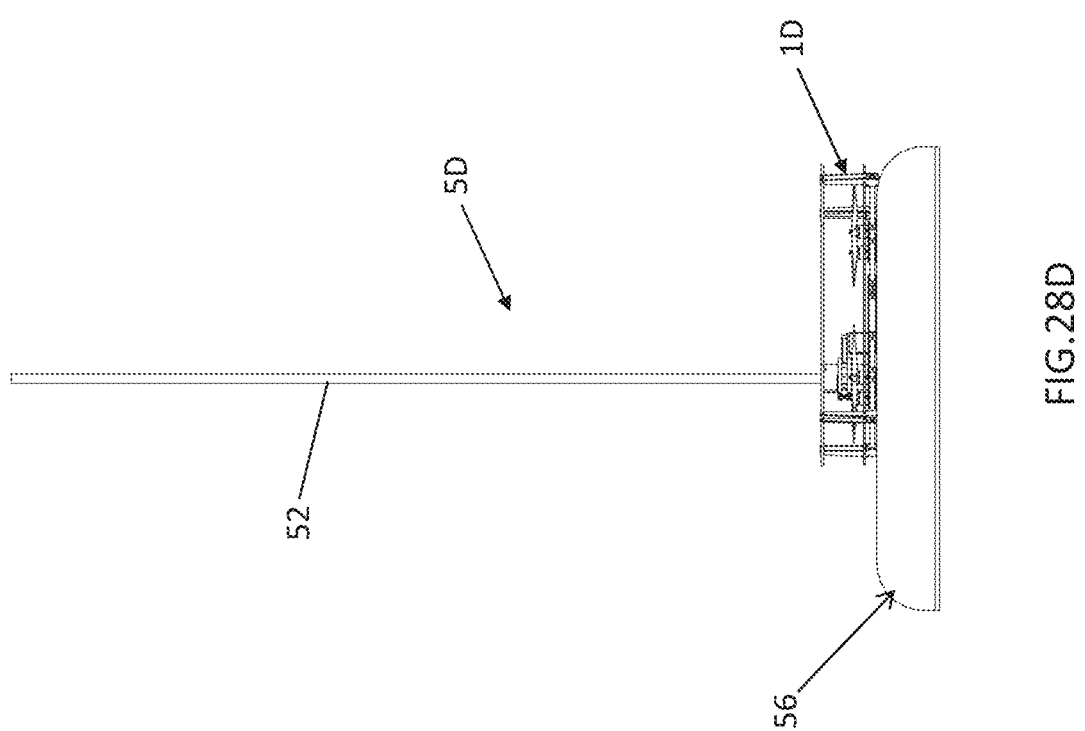

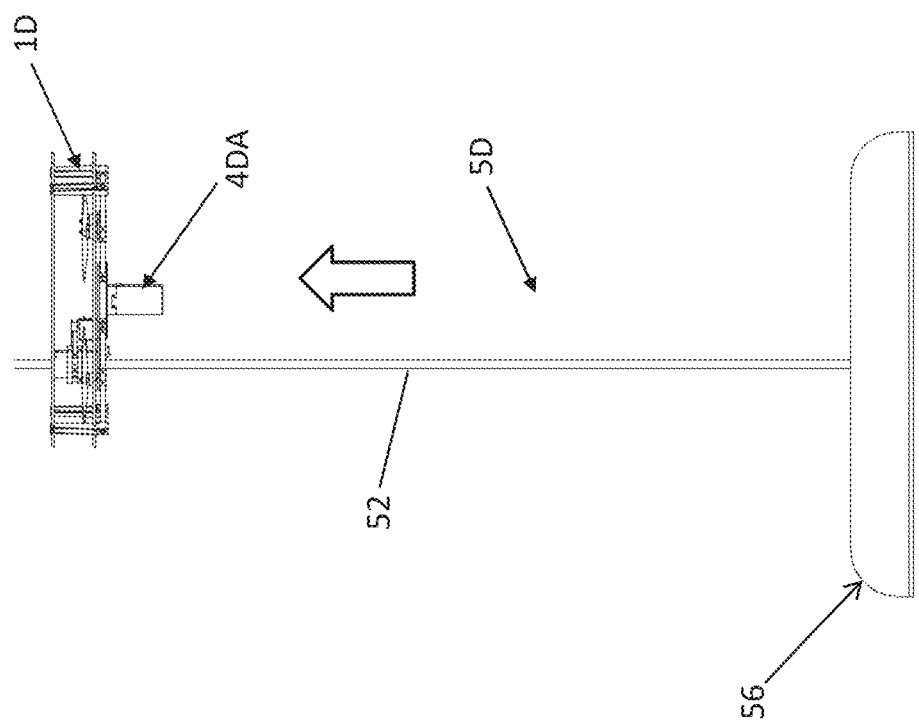

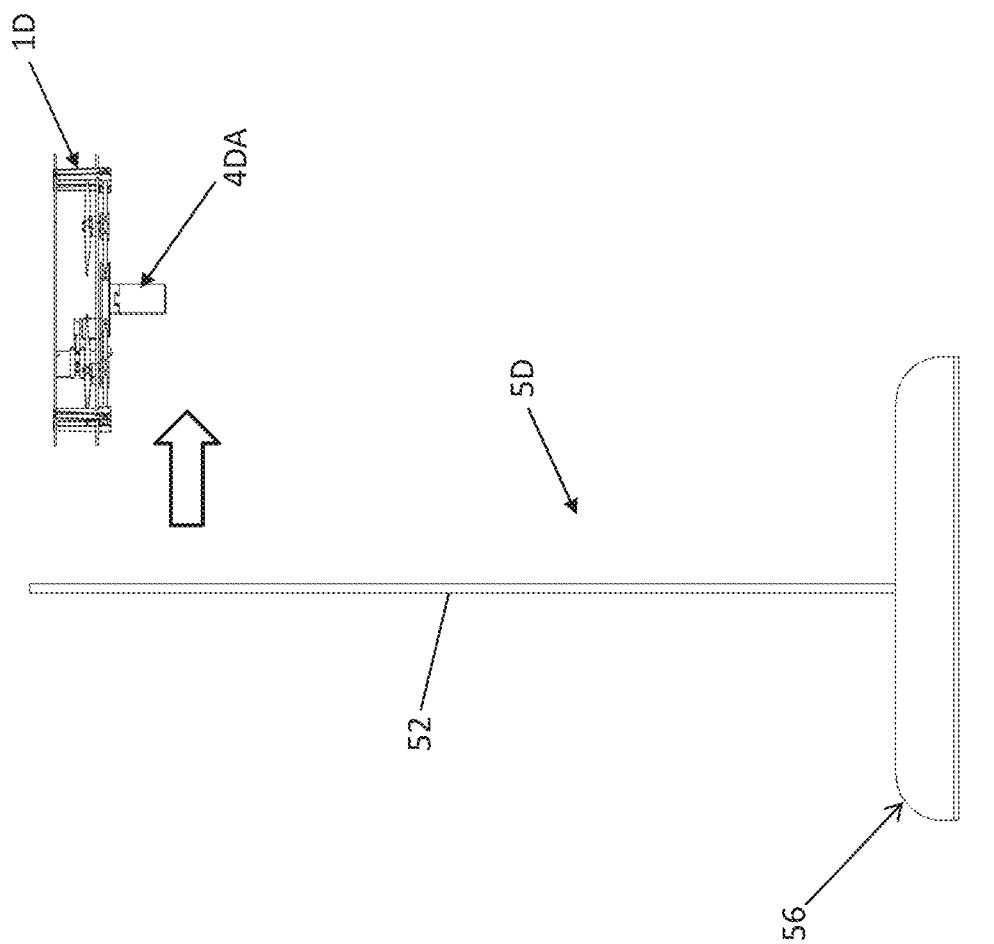

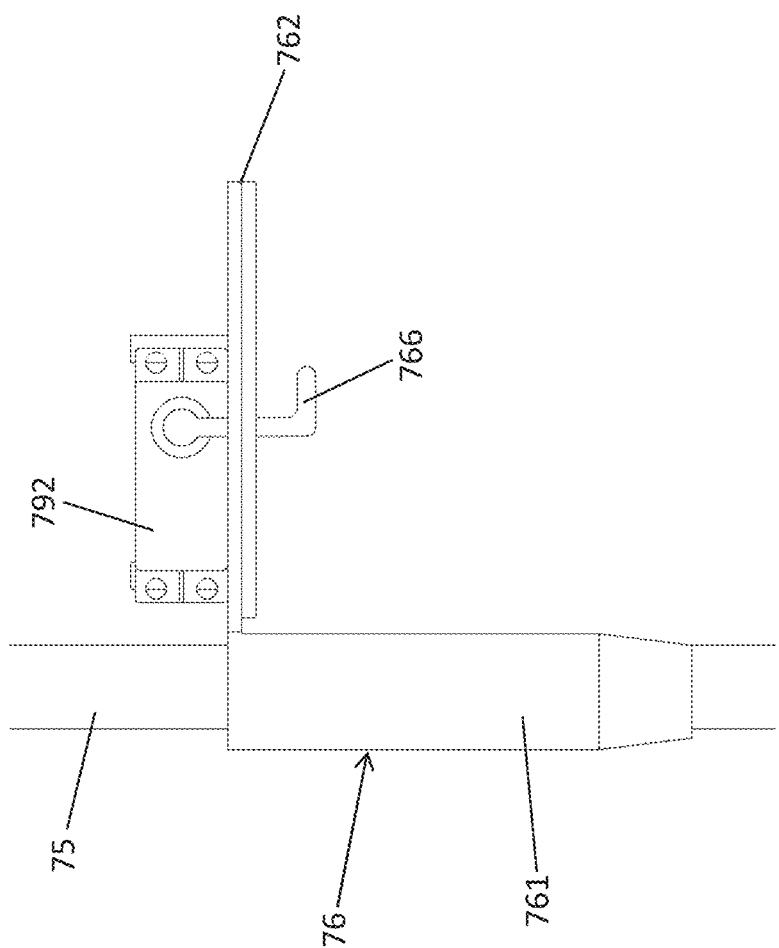

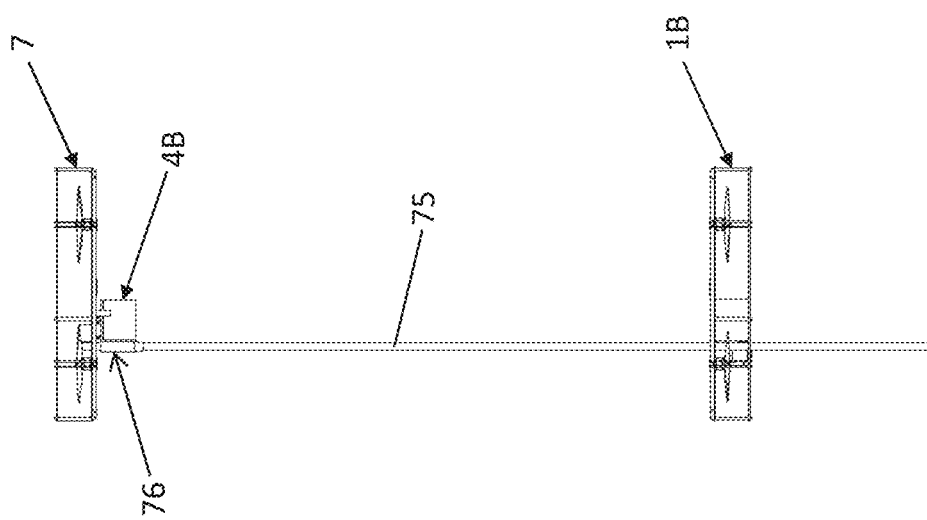

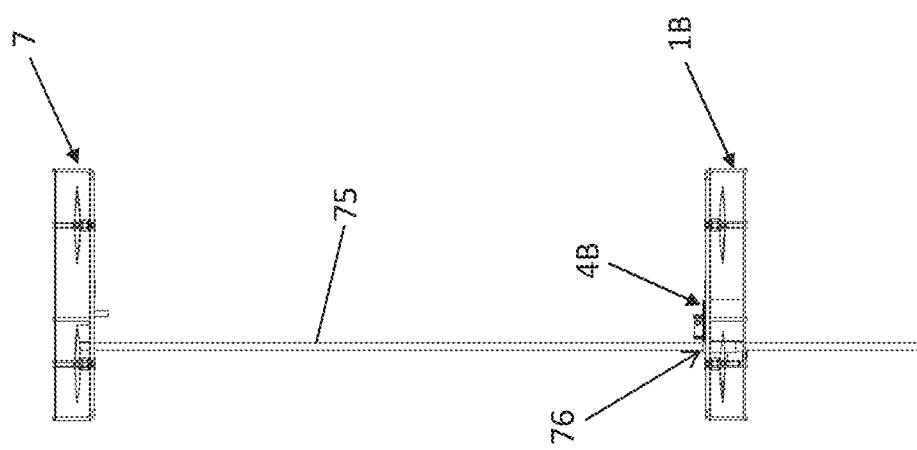

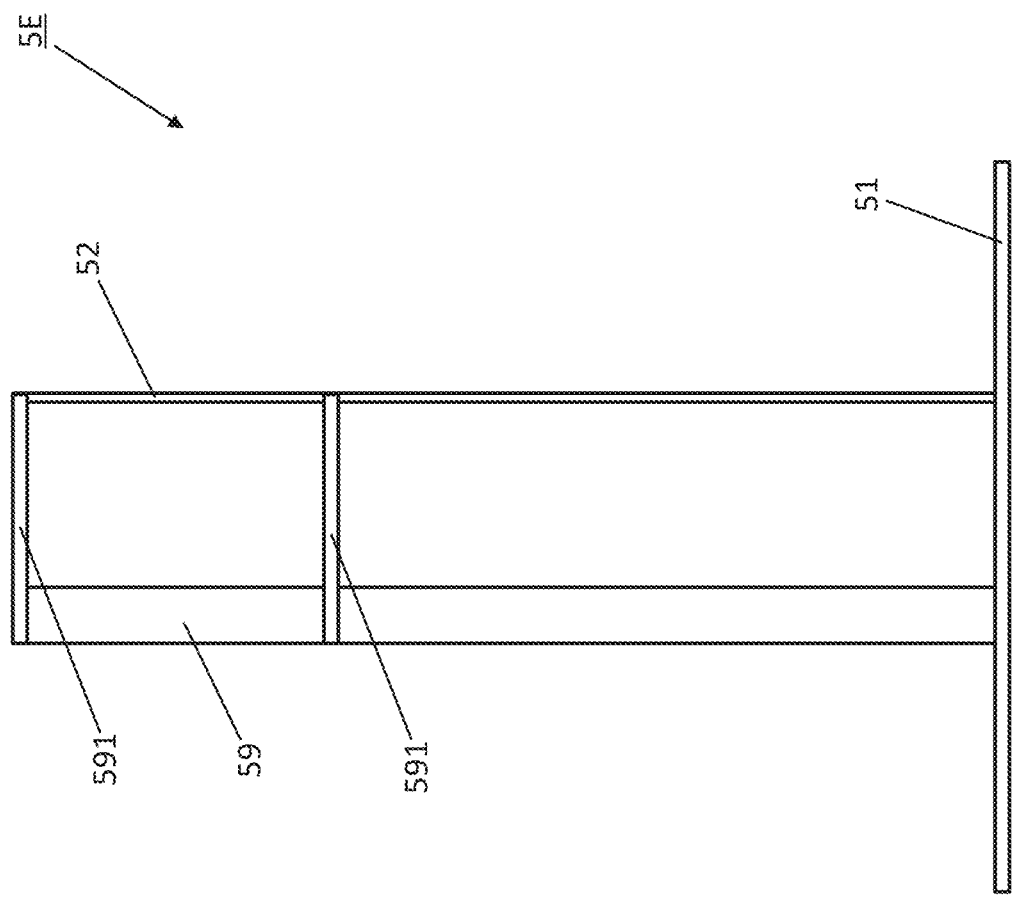

MULTICOPTER SYSTEM AND METHOD FOR TRANSFERRING GOODS

TECHNICAL FIELD

The present invention relates to a technology regarding a multicopter system and a method for delivering a package.

BACKGROUND ART

Recent years have seen widespread use of multicopters (hereinafter also referred to as "drones") for various purposes such as aerial photography, land surveying, and the transportation of goods. For example, Patent Literature 1 proposes a delivery system in which a drone is mounted on a delivery vehicle together with a package to be delivered. With this delivery system, the distance that the drone needs to fly to reach a delivery destination can be reduced as a result of the drone being carried to the vicinity of the delivery destination by the delivery vehicle. Therefore, the drone can be efficiently used in the delivery.

CITATION LIST

Patent Literature

Patent Literature 1: JP 2016-153337A

SUMMARY OF INVENTION

Technical Problem

There still remain various problems regarding the use of multicopters in a distribution system. One major problem of the various problems regarding multicopters is the concern about safety. For example, if a multicopter loses balance during its flight under the influence of external factors such as wind and deviates from a navigation route, there is a risk that the multicopter may come into contact with a building, a person, or the like in a surrounding area. Also, for example, a multicopter includes a plurality of propellers and produces a propelling force and a lifting force for flying by rotating the propellers, and although the propellers are surrounded by propeller guards, most portions of the propellers are exposed. In addition, the propeller guards have a simple structure from the standpoint of weight reduction, and therefore hardly serve to mitigate damage in the event of collision. Furthermore, a multicopter flies as a result of rotational speeds of a plurality of rotors respectively driving propellers being precisely controlled, and it is difficult to accurately control the navigation route of the multicopter. Therefore, when the multicopter arrives at a target position of the flight, a landing point may be shifted due to the influence of a control error, even if the error is small. This causes a risk that a building, a person, or the like in the vicinity of the target position may be caught in the rotating propellers.

In one aspect, the present invention was made in view of the above circumstances, and it is an object of the present invention to provide a technology for enhancing the safety of a multicopter when the multicopter is used to transport a package.

Solution to Problem

To solve the above-described problems, the present invention adopts the following configurations.

That is, a multicopter system according to one aspect of the present invention includes a multicopter configured to fly in a state of holding a package and a mooring device that is installed at a target position of a flight of the multicopter and includes a linear member that extends in a predetermined direction from the target position, wherein the multicopter includes a reception portion that has the shape of a recess including an opening that is open toward one direction, the reception portion being configured to receive the linear member via the opening in a direction intersecting with the predetermined direction.

With this configuration, the reception portion of the multicopter receives the linear member of the mooring device, and therefore it is possible to restrict the flight direction of the multicopter to the extension direction of the linear member. Accordingly, even if the flight of the multicopter is not precisely controlled, the multicopter can accurately arrive at the target position and the package can be delivered at the target position. Therefore, according to this configuration, the safety of the multicopter can be enhanced when the multicopter is used to transport a package, and it is possible to transport a package using the multicopter while ensuring safety even in a densely populated area such as an apartment building or a residential area.

Note that the "multicopter" means a helicopter in general that includes two or more propellers, and includes relatively small drones that include three or more propellers and are used for transportation of goods, aerial photography, and the like, as well as helicopters in general that include propellers respectively provided in a tail assembly and an upper portion of a main body. Also, the "linear member" is only required to be a linear object extending at least in one direction, and may be a cable, a wire, a rope, a pole, a shaft, a rod, or the like. The extension direction of the linear member may be appropriately selected according to the embodiment, and may be a vertical direction, for example. The linear member may also be inclined or curved. The package may be delivered from the multicopter to the mooring device or from the mooring device to the multicopter, or packages may also be delivered in both directions. In a case in which packages are delivered in both directions, the packages are exchanged between the multicopter and the mooring device. The "package" may include any type of package such as a tank containing gasoline, a battery of the multicopter, a power source for supplying electricity to another device, or a storage medium in which data is stored.

In the multicopter system according to the above-described aspect, the mooring device may further include a movable portion that moves along the linear member and is configured such that the package can be delivered between the movable portion and the multicopter. With this configuration, the package can be delivered between the multicopter and the mooring device even if the multicopter does not land on the target position. Accordingly, the multicopter need not approach a building, a person, or the like when the package is delivered, and therefore safety can be further enhanced when the multicopter is used to transport the package.

In the multicopter system according to the above-described aspect, the multicopter may further include a package holding portion that includes a housing space formed to be able to house the package, the housing space being in communication with the outside via an insertion hole that is formed on a side on which the movable portion is disposed, the package may include an opening in a surface that is exposed from the insertion hole, and the movable portion may include a hook member that is configured to be inserted into the opening of the package and lock the package. With this configuration, the package can be delivered through simple control.

In the multicopter system according to the above-described aspect, the movable portion may further include a support table including a support surface that supports the package, a back surface that is located opposite to the support surface, and a through hole that extends from the back surface to the support surface, and the hook member may be attached to a motor arranged on the back surface of the support table and be configured to take a first position at which the hook member protrudes toward the support surface side via the through hole and is inserted into the opening of the package and a second position at which the hook member does not protrude toward the support surface side and releases the package. With this configuration, the movable portion can stably support the package, and therefore safety can be further enhanced when the package is delivered.

In the multicopter system according to the above-described aspect, the mooring device may further include a base portion that supports the linear member, and the base portion may include an interior space that is formed to be able to house one or more packages, a turnable plate that is arranged adjacent to the interior space in the direction in which the linear member extends and is configured to rotate around the direction in which the linear member extends, and a reception opening that is provided in the turnable plate, through which the interior space is in communication with the outside, and that is formed such that the package can pass through the reception opening. With this configuration, it is possible to provide a multicopter system in which a package can be delivered between the multicopter and the mooring device as a result of the multicopter landing on the base portion.

In the multicopter system according to the above-described aspect, the base portion may further include a turntable that is housed in the interior space and is configured to rotate coaxially with the turnable plate, and a plurality of package holding portions that are arranged on a surface of the turntable facing the turnable plate so as to divide the surface in a direction of the rotation and are each configured to hold the package. With this configuration, the package can be appropriately delivered between the multicopter and the mooring device.

In the multicopter system according to the above-described aspect, the multicopter may further include a turn piece that is supported by an edge of the opening to be able to turn and take an open position at which the turn piece opens the opening and a closed position at which the turn piece closes the opening. With this configuration, the flight direction of the multicopter can be surely restricted using the linear member through simple control, and it is possible to further enhance safety when the multicopter is used to transport the package, while avoiding an increase in the weight of the multicopter.

In the multicopter system according to the above-described aspect, the mooring device may be installed on the ground or a ceiling, and the linear member may extend in a vertical direction from the ground or the ceiling. With this configuration, it is possible to provide a multicopter system in which a package can be delivered between the mooring device installed on the ground or the ceiling and the multicopter.

Note that the "ground" may include any type of surface that is open vertically upward, for example, still surfaces such as an outdoor ground surface, a floor surface of a building, and a rooftop surface, and surfaces of moving bodies such as a top plate of an automobile and a deck of a ship. Also, the "ceiling" may include any type of surface that is open vertically downward, for example, a ceiling surface of a building. Each surface is preferably flat, but may also be sloped or curved.

A method for delivering a package according to another aspect of the present invention is a method for delivering a package between a multicopter and a mooring device, the multicopter being configured to fly in a state of holding a package, the mooring device being installed at a target position of a flight of the multicopter and including a linear member that extends in a predetermined direction from the target position, wherein the multicopter includes a reception portion that has the shape of a recess including an opening that is open toward one direction, the reception portion being configured to receive the linear member via the opening in a direction intersecting with the predetermined direction, and the mooring device further includes a movable portion that moves along the linear member and is configured such that the package can be delivered between the movable portion and the multicopter, the method including: a first step of the multicopter approaching the linear member of the mooring device and receiving the linear member in the reception portion; a second step of the mooring device moving the movable portion close to the multicopter; a third step of at least one of the multicopter and the mooring device delivering the package between the movable portion and the multicopter that have come close to each other; a fourth step of, after the package has been delivered, the mooring device separating the movable portion from the multicopter; and a fifth step of the multicopter separating from the linear member of the mooring device. With this configuration, it is possible to enhance safety when the multicopter is used to transport a package.

A method for delivering a package according to another aspect of the present invention is a method for delivering a package between a multicopter and a mooring device, the multicopter being configured to fly in a state of holding a package, the mooring device being installed at a target position of a flight of the multicopter and including a linear member that extends in a predetermined direction from the target position, wherein the multicopter includes a reception portion that has the shape of a recess including an opening that is open toward one direction, the reception portion being configured to receive the linear member via the opening in a direction intersecting with the predetermined direction, the mooring device further includes a base portion that supports the linear member, and the base portion includes an interior space that is formed to be able to house one or more packages, a turnable plate that is arranged adjacent to the interior space in the direction in which the linear member extends and is configured to rotate around the direction in which the linear member extends, and a reception opening that is provided in the turnable plate, through which the interior space is in communication with the outside, and that is formed such that the package can pass through the reception opening, the method including: a first step of the multicopter approaching the linear member of the mooring device and receiving the linear member in the reception portion; a second step of the mooring device positioning the reception opening with respect to the multicopter by rotating the turnable plate; a third step of the multicopter moving along the linear member to approach the base portion; a fourth step of at least one of the multicopter and the mooring device delivering the package between the interior space of the base portion and the multicopter via the reception opening; a fifth step of, after the package has been delivered, the multicopter moving along the linear member to separate from the base portion; and a sixth step of the multicopter separating from the linear member of the mooring device. With this configuration, it is possible to enhance safety when the multicopter is used to transport a package.

Advantageous Effects of Invention

According to the present invention, it is possible to provide a technology for enhancing the safety of a multicopter when the multicopter is used to transport a package.

BRIEF DESCRIPTION OF DRAWINGS

FIG. 4A is a side view showing one example of a mooring device according to the embodiment;

FIG. 4C is a perspective view showing one example of a movable portion of the mooring device according to the embodiment;

FIG. 8A shows one example of a process for delivering a package according to the embodiment;

FIG. 8B shows one example of the process for delivering a package according to the embodiment;

FIG. 8C shows one example of the process for delivering a package according to the embodiment;

FIG. 8D shows one example of the process for delivering a package according to the embodiment;

FIG. 8E shows one example of the process for delivering a package according to the embodiment;

FIG. 9B shows a detailed example of a process for delivering a package between the package holding portion of the multicopter and the movable portion of the mooring device;

FIG. 11 is a side view showing one example of a mooring device according to the variation;

FIG. 14A shows one example of a process for delivering a package (battery replacement) according to the variation;

FIG. 14B shows one example of the process for delivering a package (battery replacement) according to the variation;

FIG. 14E shows one example of the process for delivering a package (battery replacement) according to the variation;

FIG. 15 shows one example of a situation in which a battery is detached from a battery holding portion of the multicopter according to the variation;

FIG. 17A is a side view showing one example of a mooring device according to the variation;

FIG. 18B shows one example of a relationship (locked state) between the movable portion of the mooring device according to the variation and the package;

FIG. 19A shows one example of a process for delivering a package according to the variation;

FIG. 19B shows one example of the process for delivering a package according to the variation;

FIG. 19C shows one example of the process for delivering a package according to the variation;

FIG. 19E shows one example of the process for delivering a package according to the variation;

FIG. 20B is a side view showing one example of the multicopter according to the variation;

FIG. 22A is a side view showing one example of a mooring device according to the variation;

FIG. 23A shows one example of a process for delivering a package (battery replacement) according to the variation;

FIG. 23B shows one example of the process for delivering a package (battery replacement) according to the variation;

FIG. 23E shows one example of the process for delivering a package (battery replacement) according to the variation;

FIG. 26A is a perspective view showing one example of a mooring device according to the variation;

FIG. 28A shows one example of a process for delivering a package (package replacement) according to the variation;

FIG. 28B shows one example of the process for delivering a package (package replacement) according to the variation;

FIG. 28D shows one example of the process for delivering a package (package replacement) according to the variation;

FIG. 28F shows one example of the process for delivering a package (package replacement) according to the variation;

FIG. 28G shows one example of the process for delivering a package (package replacement) according to the variation;

FIG. 29C is a side view showing one example of a movable portion of the second multicopter according to the variation;

FIG. 31B shows one example of the process for delivering a package according to the variation;

FIG. 31D shows one example of the process for delivering a package according to the variation;

FIG. 32 shows one example of a mooring device according to the variation.

DESCRIPTION OF EMBODIMENTS

Figure 1:
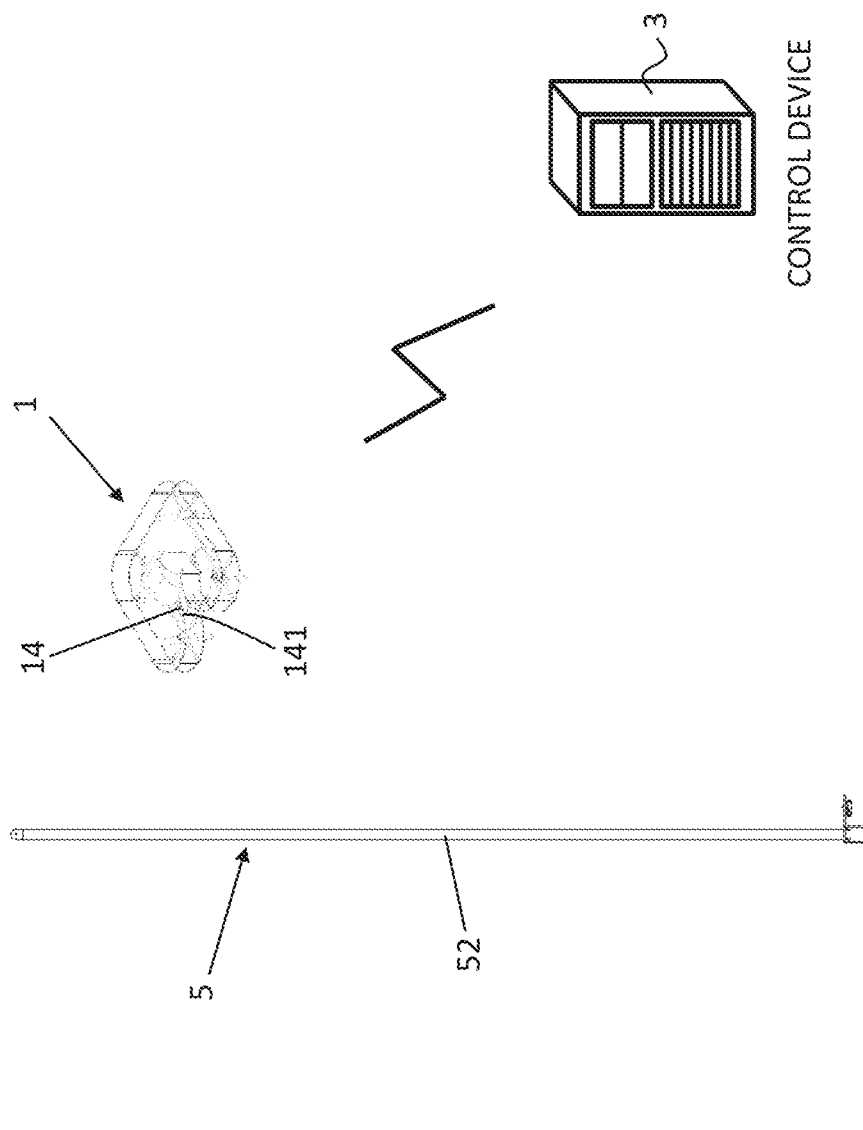
FIG. 1 schematically shows one example of a situation to which the present invention is applied.

The following describes an embodiment (hereinafter also referred to as "the present embodiment") according to one aspect of the present invention based on the drawings. However, the present embodiment described below is merely an example of the present invention in all aspects. Various modifications and alterations can be made without departing from the scope of the present invention. That is, specific configurations according to the embodiment can be appropriately adopted in the implementation of the present invention. Note that the following description is made based on directions shown in the drawings for convenience of description.

§ 1 Configuration Example

First, a situation to which the present invention is applied will be described using FIG. 1. FIG. 1 schematically shows one example of the situation to which the present invention is applied. As shown in FIG. 1, a multicopter system according to the present embodiment includes a multicopter 1 that is configured to fly in a state of holding a package and a mooring device 5 that is installed at a target position of a flight of the multicopter 1. Operations of the multicopter 1 and the mooring device 5 are controlled by a control device 3.

The mooring device 5 includes a linear member 52 that extends in a predetermined direction (in the example shown in FIG. 1, a vertical direction) from the target position. On the other hand, the multicopter 1 includes a reception portion 14 that has the shape of a recess including an opening 141 that is open toward one direction. The reception portion 14 is configured to receive the linear member 52 via the opening 141 in a direction intersecting with the predetermined direction. The "direction intersecting with the predetermined direction" is a direction that is not parallel to the extension direction of the linear member 52 and is inclined from the extension direction of the linear member 52 by a given angle. That is, the "direction intersecting with the predetermined direction" need not be specifically limited so long as it is possible to approach the linear member 52, which extends in the predetermined direction, from a side of the linear member 52 in the direction intersecting with the predetermined direction, and this direction may be appropriately selected according to the embodiment. In the example shown in FIG. 1, a horizontal direction, a direction inclined from the horizontal direction by an angle smaller than 90 degrees, or the like is one example of the "direction intersecting with the predetermined direction".

With this configuration, in the present embodiment, the reception portion 14 of the multicopter 1 receives the linear member 52 of the mooring device 5 in the direction intersecting with the extension direction of the linear member 52, and therefore it is possible to restrict the flight direction of the multicopter 1 to the extension direction of the linear member 52. Accordingly, even if the flight of the multicopter 1 is not precisely controlled, the multicopter 1 can accurately arrive at the target position and a package can be delivered at the target position. Therefore, according to the present embodiment, safety can be enhanced when the multicopter 1 is used to transport a package. The following describes configurations of respective devices.

Multicopter

First, a configuration of the multicopter 1 will be described using FIGS. 2A to 2D. FIGS. 2A to 2D are a perspective view, a rear perspective view, a plan view, and a front view showing one example of the multicopter 1 according to the present embodiment. As shown in the drawings, an airframe F1 of the multicopter 1 includes a rectangular main body portion 11 that is formed from a plurality of frame members and four propellers 12 that are respectively arranged at four corners of the main body portion 11.

Each propeller 12 is driven by a rotor 121, and the multicopter 1 is configured to fly as a result of the propellers 12 being driven by the rotors 121. The propellers 12 are protected by a pair of propeller guards 13 that are arranged in the up-down direction. The propeller guards 13 are each formed into a substantially rectangular shape to surround the outer periphery of the airframe F1 and protect the propellers 12. The propeller guards 13 may be constituted by resin frame members or the like.

In a front portion of the airframe F1, the propeller guards 13 surrounding the propellers 12 are arcuately curved toward the center of the airframe F1 in the inside of the airframe F1. Thus, the reception portion 14 having the shape of a recess including the opening 141 open toward one direction (in the present embodiment, the forward direction) is formed. The reception portion 14 and the opening 141 have a width that is wider than or equal to the width of the linear member 52, and thus the reception portion 14 is configured to receive the linear member 52 via the opening 141 in the direction intersecting with the extension direction of the linear member 52.

Figure 2A:
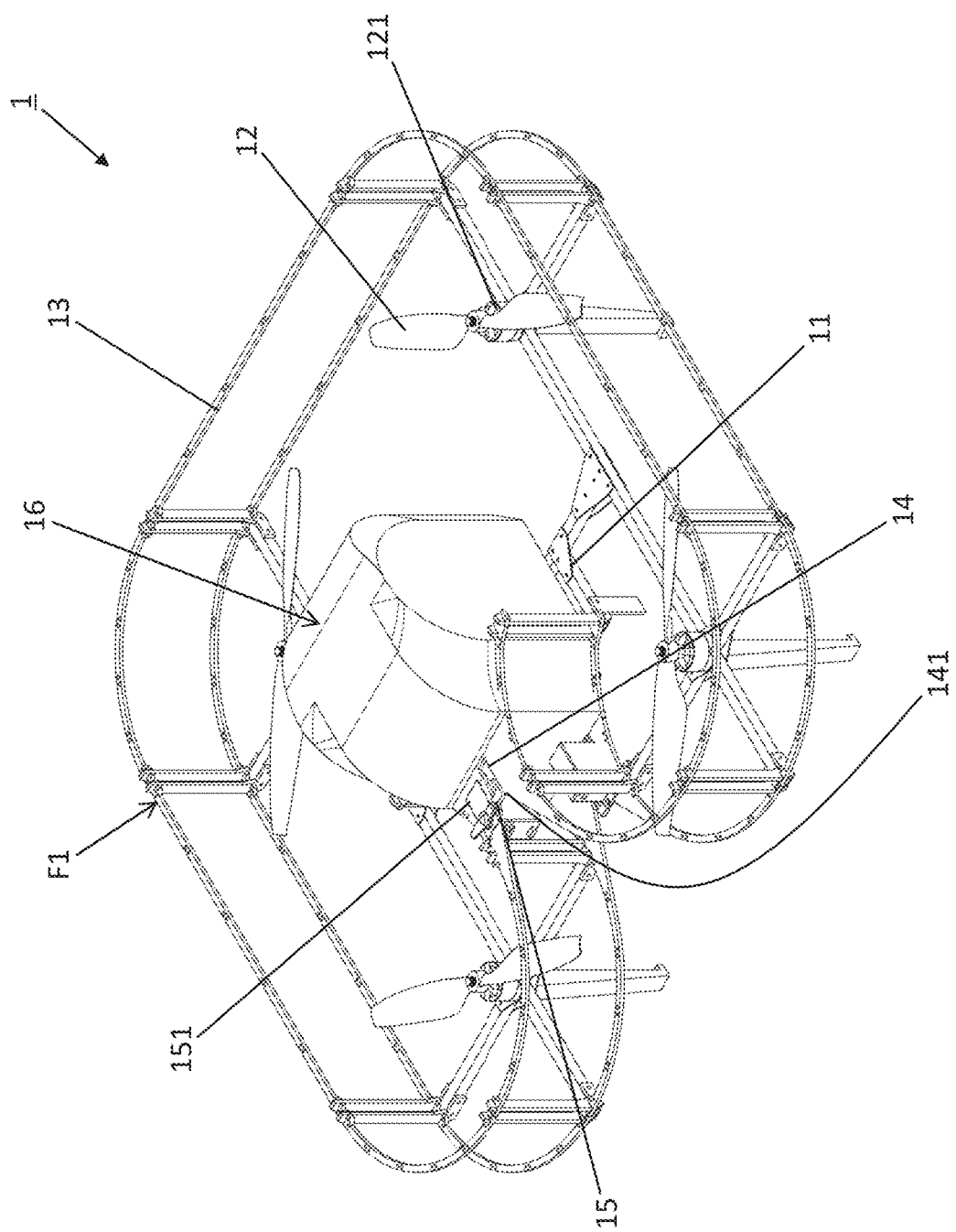
FIG. 2A is a perspective view showing one example of a multicopter according to an embodiment.
Figure 2B:
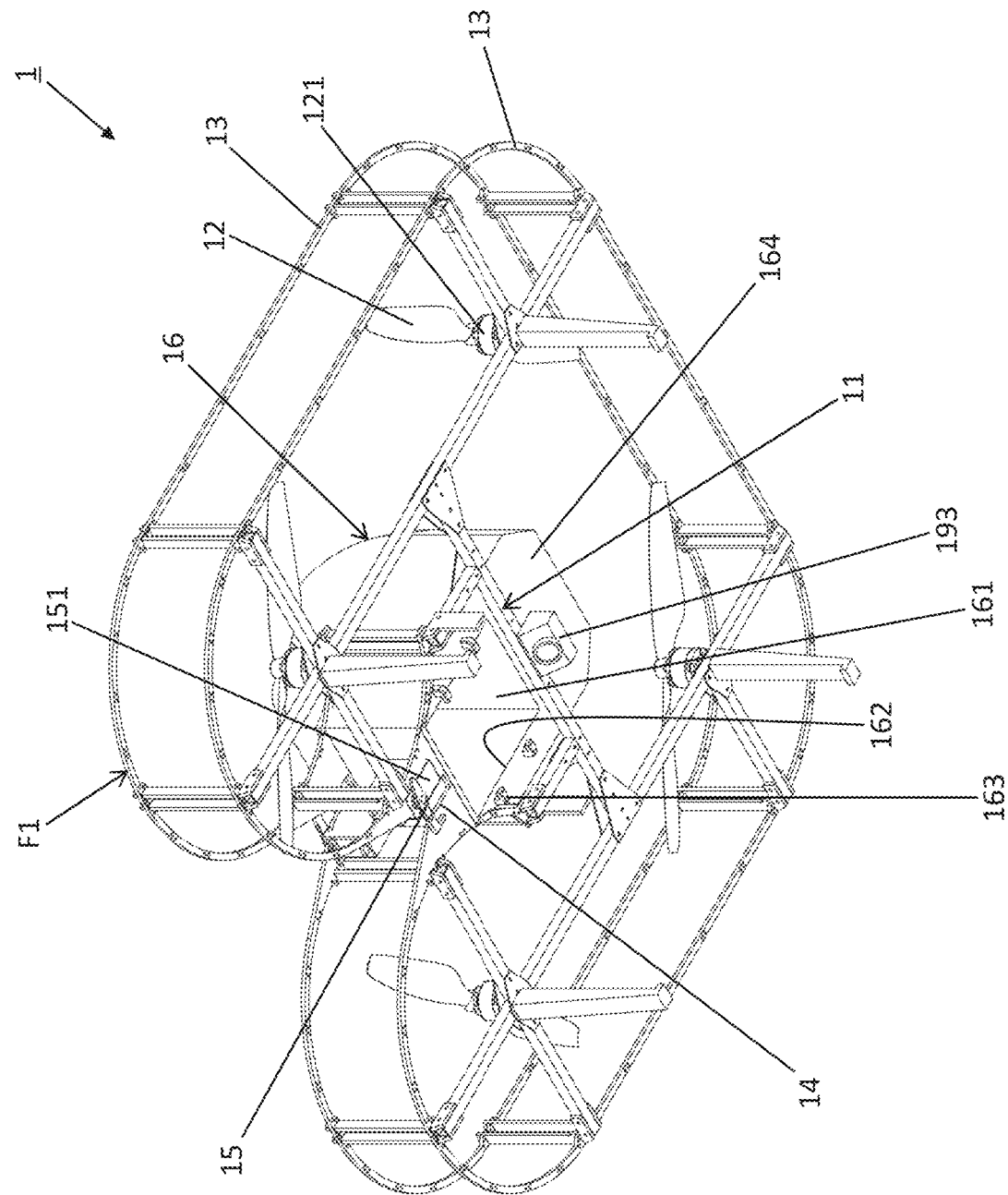
FIG. 2B is a rear perspective view showing one example of the multicopter according to the embodiment.
Figure 2C:
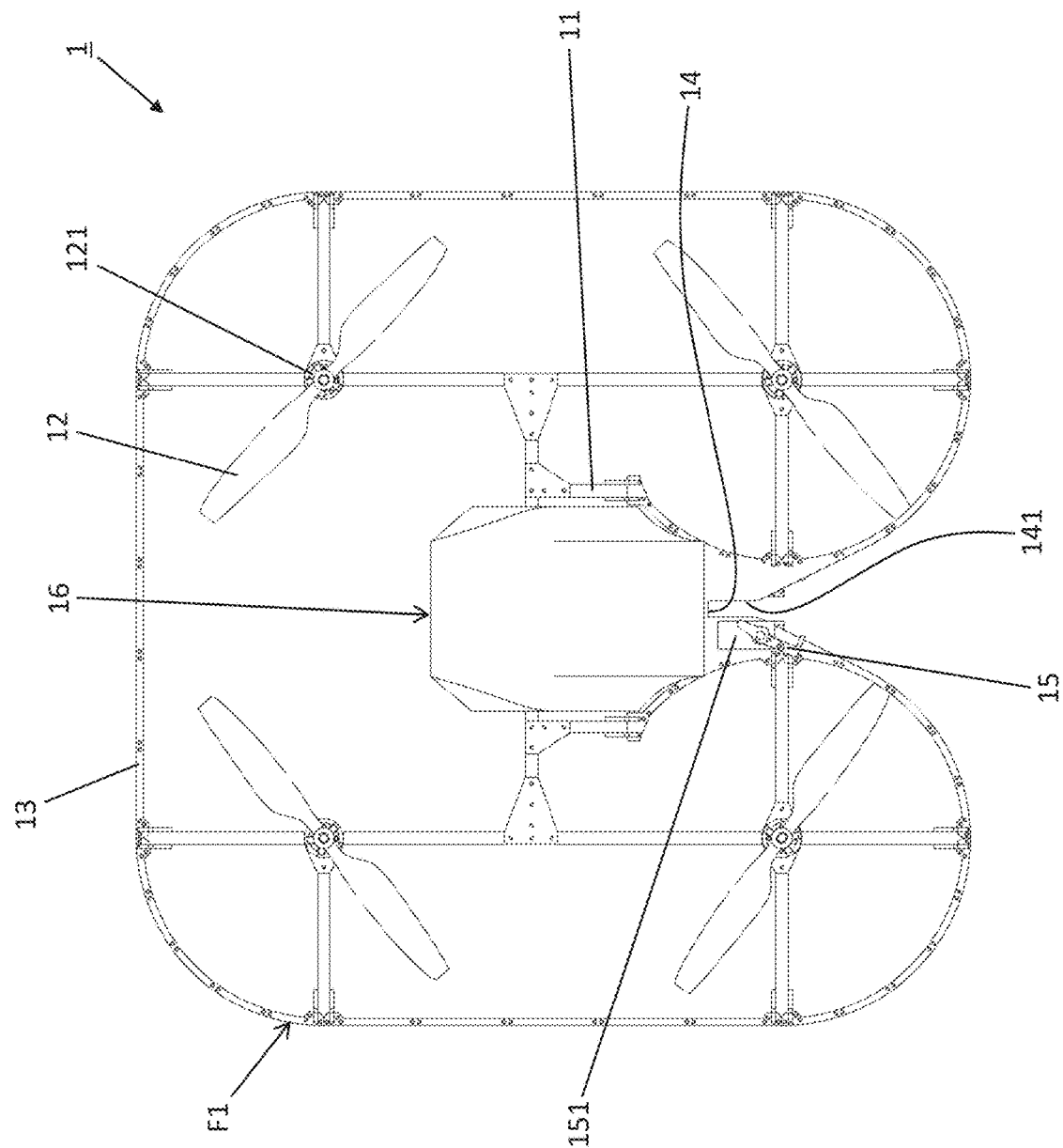
FIG. 2C is a plan view showing one example of the multicopter according to the embodiment.
Figure 2D:
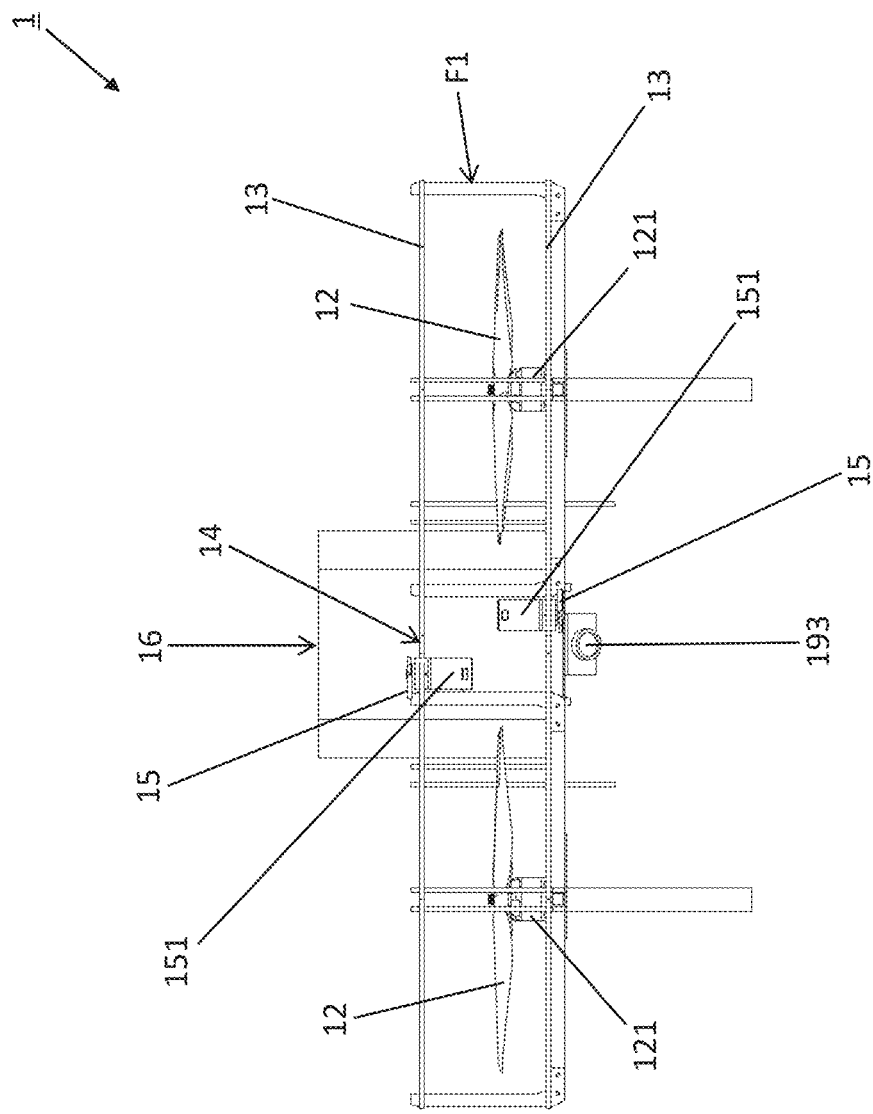
FIG. 2D is a front view showing one example of the multicopter according to the embodiment.

Furthermore, L-shaped turn pieces 15 are attached to edges of the opening 141 of the reception portion 14. As shown in FIGS. 2A and 2D, in the present embodiment, two turn pieces 15 are respectively provided at the propeller guards 13 arranged in the up-down direction. The turn pieces 15 are attached to an opening/closing servomotor 151 and are supported by the edges of the opening 141 to be able to turn and take an open position (FIG. 9E described later) at which the turn pieces 15 open the opening 141 and a closed position (FIG. 9A described later) at which the turn pieces 15 close the opening 141.

A substrate (not shown) that includes a control unit 190, which will be described later, for controlling each unit, a battery (not shown) for supplying electricity to each unit, and the like are mounted in the main body portion 11 to enable electronic control of the multicopter 1 in a state in which a package (package 4 described later) is held by the multicopter 1. Also, a package holding portion 16 for holding a package is provided at the center of the main body portion 11.

Figure 2E:
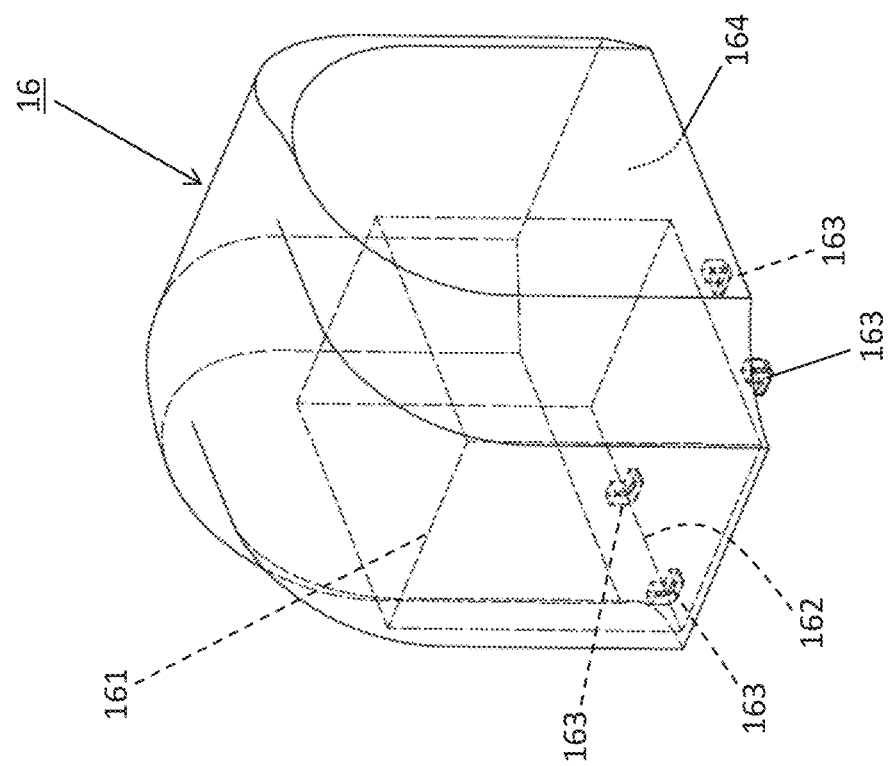
FIG. 2E shows one example of a package holding portion of the multicopter according to the embodiment.

Here, the package holding portion 16 will be described by further using FIG. 2E. FIG. 2E shows one example of the package holding portion 16 of the multicopter 1 according to the present embodiment. As shown in the drawings, the package holding portion 16 is constituted by a dome-shaped casing and includes a housing space 161 that is formed inside the package holding portion 16 to be able to house a package. The size and the shape of the housing space 161 may be appropriately determined according to the package to be housed. In the present embodiment, the housing space 161 is formed into a substantially rectangular parallelepiped shape.

A rectangular insertion hole 162 is formed on the lower side of the housing space 161, i.e., on a lower surface 164 side of the package holding portion 16, and the housing space 161 is in communication with the outside via the insertion hole 162. Note that when the linear member 52 of the mooring device 5 is received in the reception portion 14, a movable portion 53 of the mooring device 5, which will be described later, is disposed on the lower side of the multicopter 1. Accordingly, the lower side of the housing space 161 is one example of a "side on which the movable portion is disposed" in the present invention.

Also, four L-shaped protrusions 163 that extend toward the insertion hole 162 are provided at edges of the insertion hole 162 in the lower surface 164 of the package holding portion 16. The protrusions 163 are appropriately positioned to lock a package housed in the housing space 161. Thus, the package holding portion 16 according to the present embodiment is configured to hold a package. However, the configuration for holding a package in the package holding portion 16 need not be limited to this example, and may be appropriately determined according to the embodiment.

System Configuration

Figure 3:
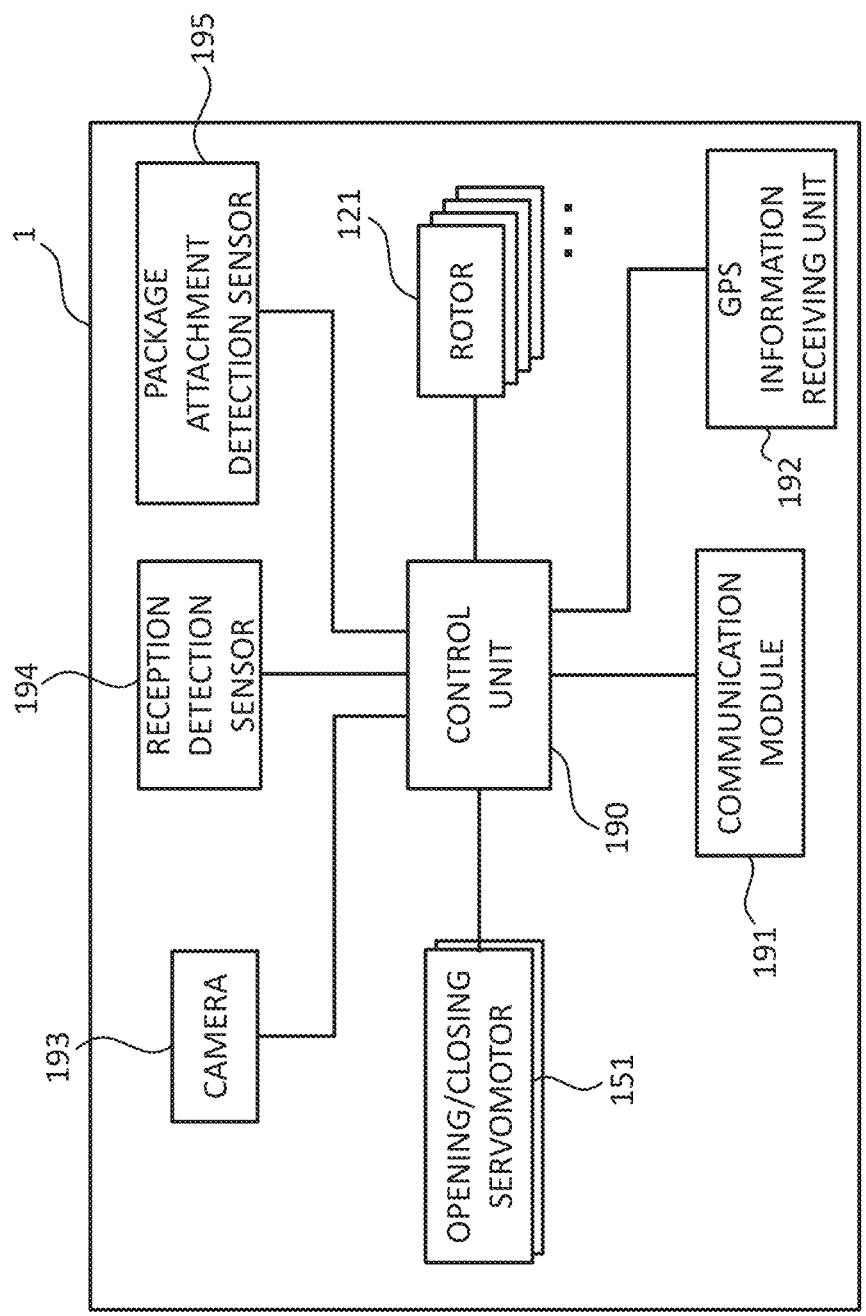
FIG. 3 schematically shows one example of a system configuration of the multicopter according to the embodiment.

Next, a system configuration of the multicopter 1 will be described by further using FIG. 3. FIG. 3 schematically shows one example of the system configuration of the multicopter 1 according to the present embodiment. As shown in FIG. 3, the multicopter 1 according to the present embodiment includes the control unit 190 and a communication module 191.

The control unit 190 is constituted by a CPU (Central Processing Unit), a RAM (Random Access Memory), a ROM (Read Only Memory), and the like to be able to control each unit. The control unit 190 may be constituted by one or more microcomputers. The communication module 191 is configured to perform wireless data communication with the control device 3. A known wireless communication module may be used as the communication module 191.

The control unit 190 performs data communication with the control device 3 via the communication module 191 and controls each unit based on data received from the control device 3. In the present embodiment, the control unit 190 is connected to the rotors 121, the opening/closing servomotor 151, a GPS (Global Positioning System) information receiving unit 192, a camera 193, a reception detection sensor 194, and a package attachment detection sensor 195.

The GPS information receiving unit 192 is configured to detect the position of the multicopter based on a GPS signal received from a GPS satellite. The control unit 190 transmits a result of measurement of the position (position information) performed by the GPS information receiving unit 192 to the control device 3. The control device 3 creates navigation information regarding a flight to a desired position based on position information received from the multicopter 1 and transmits the created navigation information to the multicopter 1. The control unit 190 appropriately controls the rotors 121 of the propellers 12 based on the received navigation information. Thus, the multicopter 1 is controlled to fly to the desired position.

The camera 193 is appropriately arranged to be able to capture a flight state of the multicopter 1. In the present embodiment, the camera 193 is arranged on the lower surface 164 of the package holding portion 16 so as to face the reception portion 14. Therefore, a positional relationship between the linear member 52 and the reception portion 14 can be monitored using an image captured by the camera 193. The type of the camera 193 need not be specifically limited, and may be appropriately selected according to the embodiment.

The reception detection sensor 194 is configured to detect whether or not the linear member 52 has been received in the reception portion 14. The type of the reception detection sensor 194 need not be specifically limited, and may be appropriately selected according to the embodiment. The reception detection sensor 194 may be an infrared sensor, for example.

The control unit 190 can cause the multicopter to approach the linear member 52 of the mooring device 5 and receive the linear member 52 in the reception portion 14 while referring to an image captured by the camera 193 and a result of detection performed by the reception detection sensor 194. Then, the control unit 190 can drive the opening/closing servomotor 151 to turn the turn pieces 15 to the closed position and confine the linear member 52 in the reception portion 14 by using the turn pieces 15.

The package attachment detection sensor 195 is configured to detect whether or not a package is held in the package holding portion 16. The type of the package attachment detection sensor 195 need not be specifically limited, and may be appropriately selected according to the embodiment. The package attachment detection sensor 195 may be a micro switch, a limit switch, or the like. The control unit 190 can recognize whether or not a package is appropriately attached to the package holding portion 16 based on a result of detection performed by the package attachment detection sensor 195.

Figure 4B:
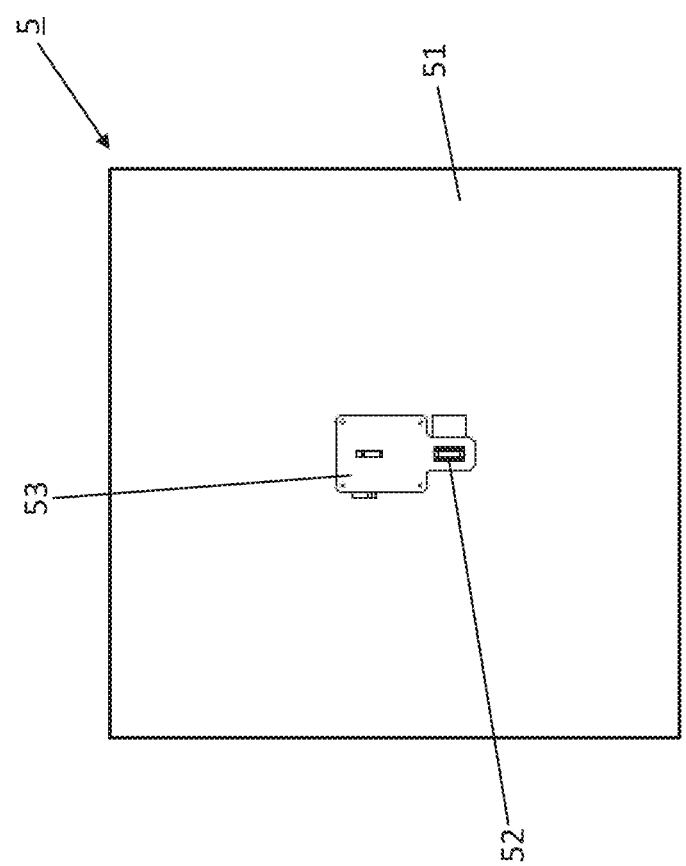
FIG. 4B is a plan view showing one example of the mooring device according to the embodiment.

Mooring Device Next, a configuration of the mooring device 5 will be described using FIGS. 4A and 4B. FIGS. 4A and 4B are a side view and a plan view showing one example of the mooring device 5 according to the present embodiment. As shown in the drawings, the mooring device 5 according to the present embodiment includes a flat plate-shaped base portion 51, the linear member 52 that extends from the base portion 51, and the movable portion 53 that moves along the linear member 52 and is configured such that a package can be delivered between the movable portion 53 and the multicopter 1.

A substrate (not shown) that includes a control unit 540, which will be described later, for controlling each unit, a battery (not shown) for supplying electricity to each unit, and the like are mounted in the base portion 51 to enable electronic control of the mooring device 5. However, the configuration of the mooring device 5 need not be limited to this example. The mooring device 5 may also be configured to be supplied with electricity via a wire.

The installation site of the base portion 51 may be appropriately selected according to the embodiment. In a case in which the mooring device 5 is used in a veranda of an apartment, for example, the base portion 51 may be attached to a fence of the veranda. In the present embodiment, the base portion 51 is fixed on the ground, and thus the mooring device 5 is installed on the ground. Note that the "ground" may include any type of surface that is open vertically upward, for example, still surfaces such as an outdoor ground surface, a floor surface of a building, and a rooftop surface, and surfaces of moving bodies such as a top plate of an automobile and a deck of a ship. The surface of the ground is preferably flat, but may also be sloped or curved.

The linear member 52 is only required to be a linear object extending at least in one direction, and may be a cable, a wire, a rope, a pole, a shaft, a rod, or the like. The extension direction of the linear member 52 may be appropriately selected according to the embodiment. In the example shown in FIGS. 1 and 4A, the linear member 52 extends in the vertical direction from the ground. Note that the linear member 52 preferably has rigidity similarly to a pole, a shaft, a rod, or the like so that the linear member 52 can maintain the extending state by itself. However, the linear member 52 need not be limited to these examples, and does not necessarily have to have rigidity. If the linear member 52 does not have rigidity, both ends of the linear member 52 may also be fixed so that a tensile force with which the extending state can be maintained acts on the linear member 52. Dimensions of the linear member 52 may be appropriately determined according to the embodiment.

Figure 4D:
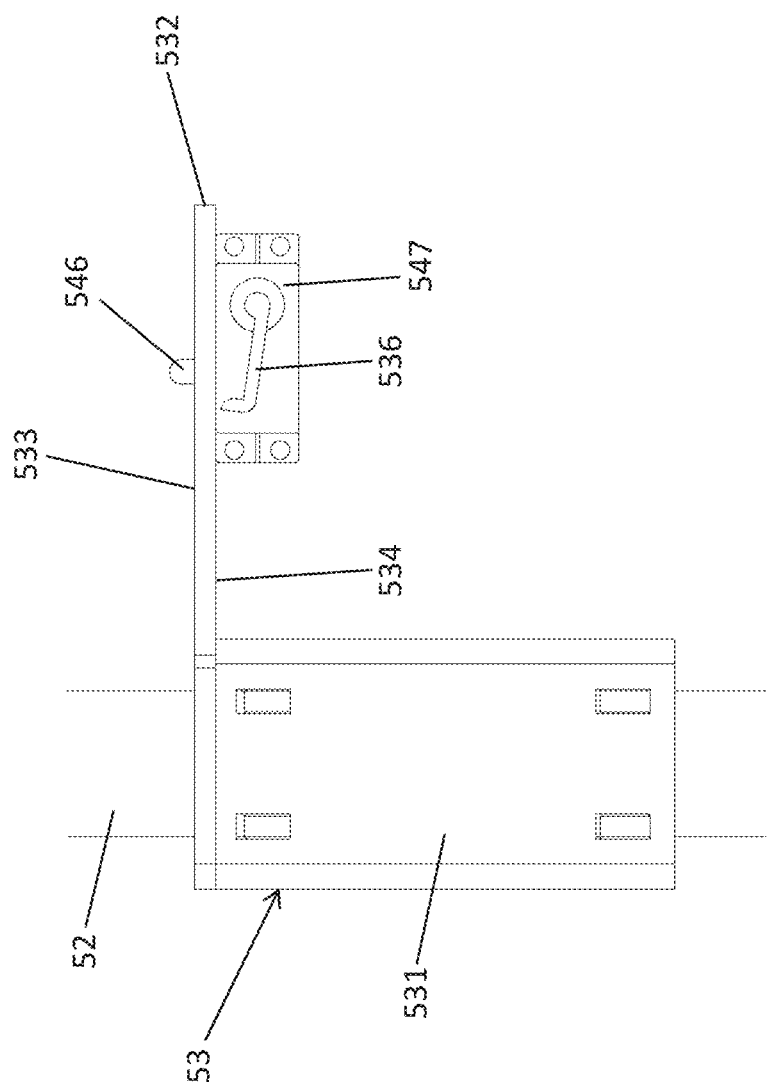
FIG. 4D is a side view showing one example of the movable portion of the mooring device according to the embodiment.
Figure 4E:
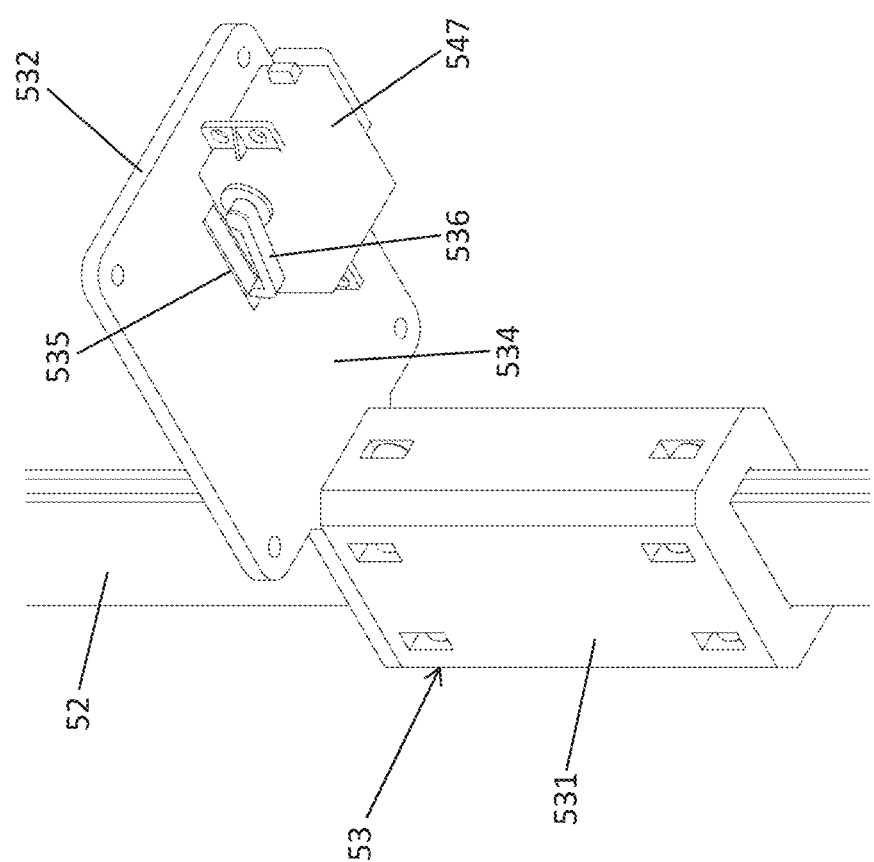
FIG. 4E is a rear perspective view showing one example of the movable portion of the mooring device according to the embodiment.

Next, the movable portion 53 according to the present embodiment will be described by further using FIGS. 4C to 4E. FIGS. 4C to 4E are a perspective view, a side view, and a rear perspective view showing one example of the movable portion 53 of the mooring device 5 according to the present embodiment. The configuration of the movable portion 53 need not be specifically limited so long as the movable portion 53 moves along the linear member 52 and a package can be delivered between the movable portion 53 and the multicopter 1. The movable portion 53 according to the present embodiment includes a tubular member 531 through which the linear member 52 passes, a flat plate-shaped support table 532 that is coupled to an upper end of the tubular member 531, and an L-shaped hook member 536 that is configured to be inserted into an opening of a package (opening 43 of a package 4 described later) to lock the package.

The support table 532 includes a support surface 533 that supports a package, a back surface 534 that is located opposite to the support surface 533, and a through hole 535 that extends from the back surface 534 to the support surface 533 and has a rectangular cross sectional shape. In the present embodiment, the support table 532 supports the package 4, which will be described later, from below, and accordingly, the support surface 533 is an upper surface of the support table 532 and the back surface 534 is a lower surface of the support table 532.

A package lock servomotor 547 is arranged on the back surface 534 in the vicinity of the through hole 535, and the hook member 536 is attached to the package lock servomotor 547. Dimensions of the through hole 535 are appropriately set so that the hook member 536 can be inserted into the through hole 535. With this configuration, the hook member 536 is configured to take a first position (FIG. 9C described later) at which the hook member 536 protrudes toward the support surface 533 side via the through hole 535 and is inserted into the opening of the package and a second position (FIG. 9B described later) at which the hook member 536 does not protrude toward the support surface 533 side and releases the package. Note that in the present embodiment, the servomotor (package lock servomotor 547) is used as the motor for driving the hook member 536. However, the type of the motor for driving the hook member 536 need not be limited to this example, and may be appropriately selected according to the embodiment.

System Configuration

Figure 5:
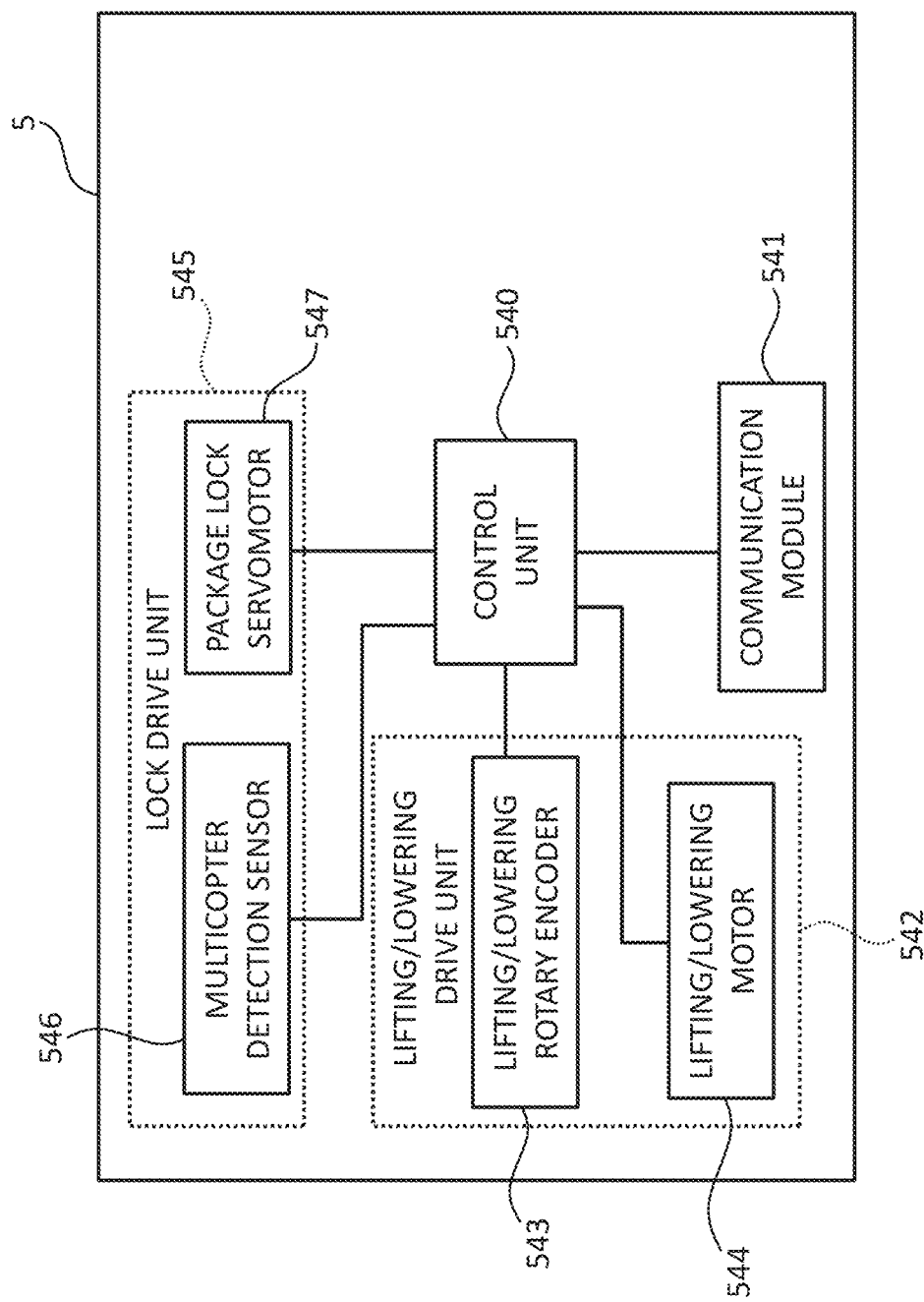
FIG. 5 schematically shows one example of a system configuration of the mooring device according to the embodiment.

Next, a system configuration of the mooring device 5 will be described by further using FIG. 5. FIG. 5 schematically shows one example of the system configuration of the mooring device 5 according to the present embodiment. As shown in FIG. 5, the mooring device 5 according to the present embodiment includes the control unit 540 and a communication module 541.

The control unit 540 is constituted by a CPU, a RAM, a ROM, and the like to be able to control each unit. The control unit 540 may be constituted by one or more microcomputers. The communication module 541 is configured to perform wireless data communication with the control device 3. A known wireless communication module may be used as the communication module 541.

The control unit 540 performs data communication with the control device 3 via the communication module 541 and controls each unit based on data received from the control device 3. In the present embodiment, the control unit 540 is connected to a lifting/lowering drive unit 542 for lifting and lowering the movable portion 53 and a lock drive unit 545 for controlling locking of a package performed using the hook member 536.

The lifting/lowering drive unit 542 is constituted by a lifting/lowering rotary encoder 543 and a lifting/lowering motor 544. A known rotary encoder may be used as the lifting/lowering rotary encoder 543. The lifting/lowering rotary encoder 543 is used to monitor a driving amount of the lifting/lowering motor 544. The control unit 540 may drive the lifting/lowering motor 544 while referring to a result of detection performed by the lifting/lowering rotary encoder 543, in response to an instruction given from the control device 3 to lift or lower the movable portion 53. Thus, the control unit 540 can move the movable portion 53 to a desired position (height) of the linear member 52.

The lock drive unit 545 is constituted by a multicopter detection sensor 546 and a package lock servomotor 547. The multicopter detection sensor 546 is configured to detect whether or not the support surface 533 of the support table 532 has approached (or is in contact with) the lower surface 164 of the package holding portion 16 of the multicopter 1. The type of the multicopter detection sensor 546 need not be specifically limited, and may be appropriately selected according to the embodiment. The multicopter detection sensor 546 may be a switch such as a micro switch or a limit switch. In the present embodiment, the multicopter detection sensor 546 is arranged on a side surface of the support table 532 and a switch portion protrudes toward the support surface 533 side. With this configuration, the multicopter detection sensor 546 can detect whether or not the support surface 533 of the support table 532 is in contact with the lower surface 164 of the package holding portion 16. That is, the control unit 540 can determine whether or not the multicopter 1 is present on the support surface 533 of the support table 532 based on a result of detection performed by the multicopter detection sensor 546. Upon determining that the multicopter 1 is present on the support surface 533 of the support table 532, the control unit 540 can drive the package lock servomotor 547 to move the hook member 536 to the first position and lock the package on the support surface 533 with the hook member 536.

Package

Figure 6:
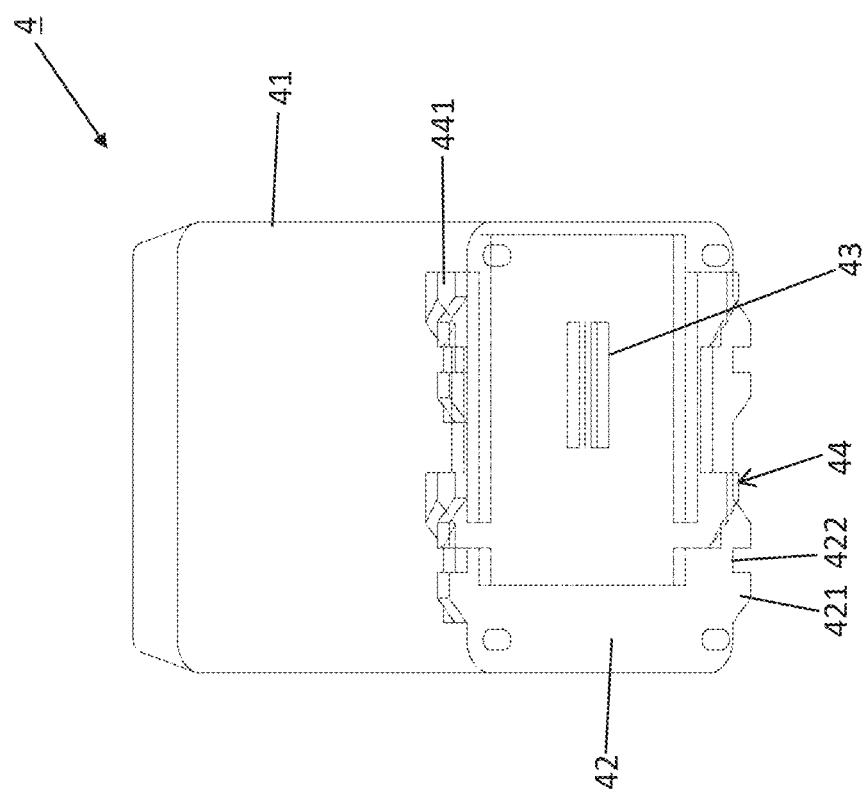
FIG. 6 shows one example of a package according to the embodiment.

Next, the package 4, which is delivered between the multicopter 1 and the mooring device 5, will be described using FIG. 6. FIG. 6 shows one example of the package 4 according to the present embodiment. The type of the package 4 may be appropriately selected according to the embodiment. The package 4 may be a tank containing gasoline, a battery of the multicopter, a power source for supplying electricity to another device, or a storage medium in which data is stored, for example. As shown in FIG. 6, the package 4 according to the present embodiment includes a main body portion 41 that is formed into a substantially rectangular parallelepiped shape to be able to be housed in the housing space 161 of the package holding portion 16 of the multicopter 1. A housing space (not shown) may be provided in the main body portion 41, and goods or the like to be transported may be housed in the housing space.

The package 4 is housed in the housing space 161 from an upper end side of the main body portion 41. Accordingly, when the package 4 is housed in the housing space 161, a bottom surface 42 of the main body portion 41 is exposed from the insertion hole 162. The bottom surface 42 includes an opening 43 into which the hook member 536 of the mooring device 5 can be inserted. An interior space that is in communication with the opening 43 is wider than the opening 43. With this configuration, the hook member 536 can be hooked on an inner wall of the interior space to lock the package 4.

Also, the bottom surface 42 is provided with protruding portions 421 that protrude in the horizontal direction at positions corresponding to positions of the protrusions 163 of the package holding portion 16, and each protruding portion 421 includes a groove portion 422 that extends in the up-down direction. The groove portions 422 are used to pass the protrusions 163 therethrough when housing the package 4 in the housing space 161.

Furthermore, a slide plate 44 that is slidable in the front-rear direction is attached to the inside of the package 4. The slide plate 44 is provided with protrusions 441 at positions corresponding to positions of the groove portions 422. The slide plate 44 also includes an opening at a position corresponding to the position of the opening 43. Thus, the slide plate 44 is configured to take a first position (FIG. 9C described later) at which the hook member 536 is inserted into the opening 43 and the protrusions 441 do not close the groove portions 422 and a second position (FIG. 9B described later) at which the hook member 536 is not inserted into the opening 43 and the protrusions 441 close the groove portions 422 in the up-down direction.

Control Device

Figure 7:
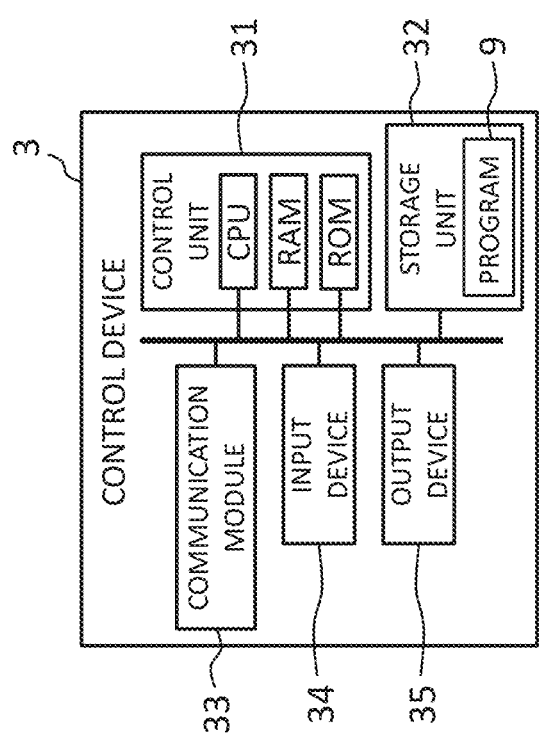
FIG. 7 schematically shows one example of a configuration of a control device according to the embodiment.

Next, a configuration of the control device 3 will be described using FIG. 7. FIG. 7 schematically shows one example of the configuration of the control device 3 according to the present embodiment. As shown in FIG. 7, the control device 3 is a computer that is electrically connected to a control unit 31 including a CPU, a RAM, a ROM, and the like, a storage unit 32 in which a program 9 to be executed by the control unit 31 and the like are stored, a communication module 33 for performing wireless communication with the multicopter 1 and the mooring device 5, an input device 34 for performing input, such as a mouse or a keyboard, and an output device 35 for performing output, such as a display or a speaker. The control device 3 controls operations of the multicopter 1 and the mooring device 5 by executing the program 9 using the control unit 31 and performing wireless data communication with the multicopter 1 and the mooring device 5.

Note that constitutional elements of the specific hardware configuration of the control device 3 can be appropriately omitted, replaced, or added according to the embodiment. For example, the control unit 31 may also include a plurality of processors. Also, the input device 34 and the output device 35 may also be replaced with a touch panel display, for example. It is possible to use, as the control device 3, a mobile phone including a smartphone, a tablet terminal, a PC (Personal Computer), or the like, as well as a dedicated terminal designed for a service to be provided.

§ 2 Operation Example

Next, a process for delivering the package 4 between the multicopter 1 and the mooring device 5 according to the present embodiment will be described using FIGS. 8A to 8F. FIGS. 8A to 8F show one example of the process for delivering the package 4. The following procedure for delivering a package is one example of a "method for delivering a package" according to the present invention. However, the following procedure is merely one example, and steps may be changed where possible. Also, steps of the following procedure can be appropriately omitted, replaced, or added according to the embodiment. Furthermore, the following describes a situation in which the package 4 is delivered from the multicopter 1 to the mooring device 5. However, the package 4 does not necessarily have to be delivered as in this example, and may also be delivered from the mooring device 5 to the multicopter 1, or packages 4 may also be delivered in both directions where possible. Note that the multicopter 1 and the mooring device 5 execute operations in the following steps as a result of being controlled by the control device 3.

First Step

As shown in FIGS. 8A and 8B, in a first step, the multicopter 1 approaches the linear member 52 of the mooring device 5 and receives the linear member 52 in the reception portion 14 via the opening 141 in a direction intersecting with the extension direction of the linear member 52. The multicopter 1 flies toward the mooring device 5 based on a result of measurement performed by the GPS information receiving unit 192, for example. Also, the multicopter 1 approaches the linear member 52 of the mooring device 5 while referring to an image captured by the camera 193 and a result of detection performed by the reception detection sensor 194. In the vicinity of the linear member 52, the multicopter 1 moves so as to approach the linear member 52 from a side of the linear member 52, and thus receives the linear member 52 in the reception portion 14. Then, the multicopter 1 drives the opening/closing servomotor 151 to turn the turn pieces 15 to the closed position.

Figure 9A:
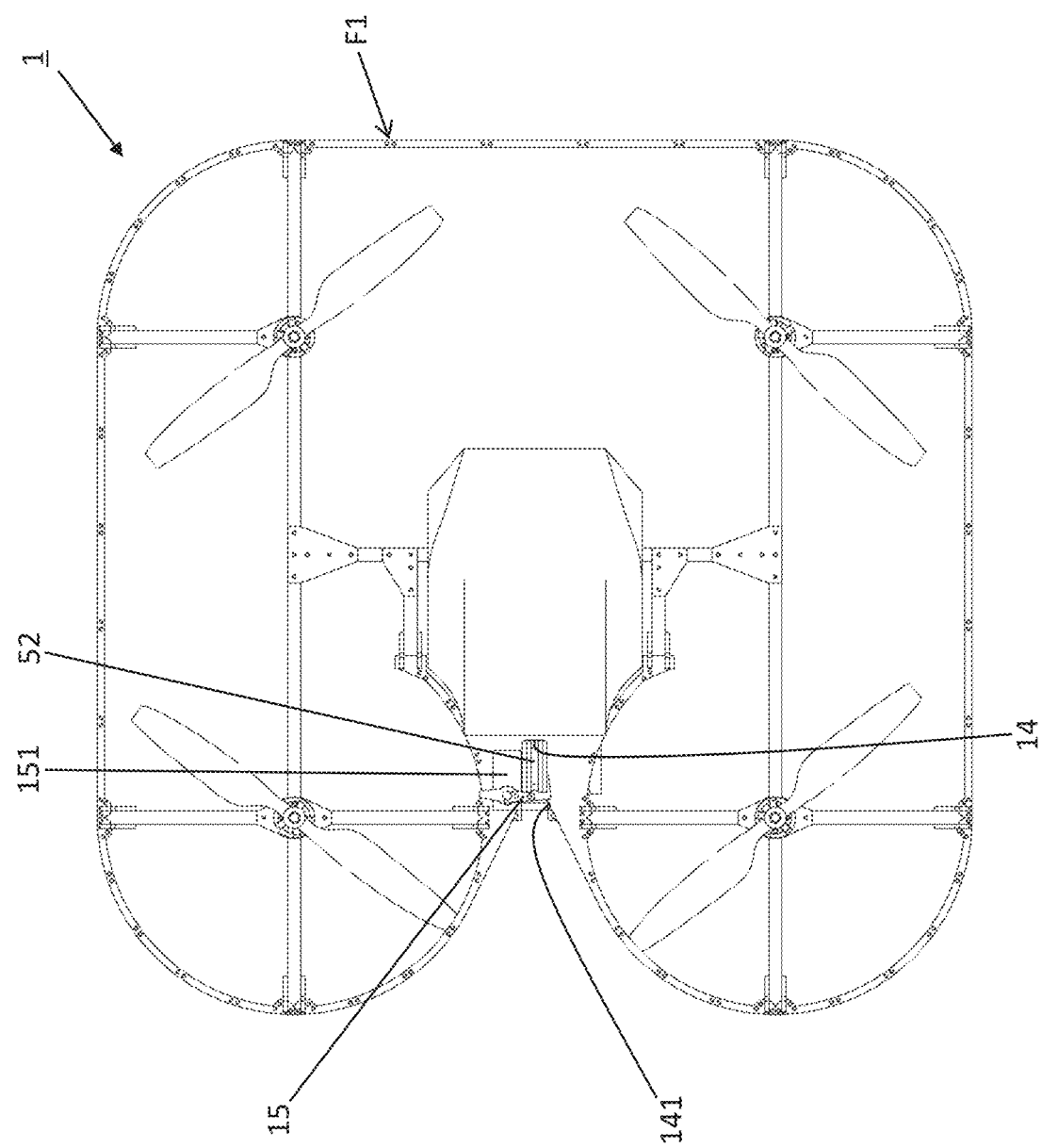
FIG. 9A shows one example of a situation in which a reception portion of the multicopter has received a linear member of the mooring device.

FIG. 9A shows one example of a situation in which the linear member 52 of the mooring device 5 is received in the reception portion 14 of the multicopter 1 and the turn pieces 15 are turned to the closed position. The opening 141 can be closed to confine the linear member 52 in the reception portion 14 with the turn pieces 15 by turning the turn pieces 15 to the closed position in a state in which the linear member 52 is received in the reception portion 14. Thus, the multicopter 1 can be kept from moving in a direction perpendicular to the linear member 52. That is, it is possible to restrict the flight direction of the multicopter 1 to the extension direction of the linear member 52.

Second Step

As shown in FIG. 8C, in a second step, the mooring device 5 moves the movable portion 53 close to the multicopter 1. In the present embodiment, the base portion 51 is installed on the ground. Therefore, the mooring device 5 lifts the movable portion 53 located in the vicinity of the base portion 51 to the position of the multicopter 1 by driving the lifting/lowering motor 544 while referring to a result of detection performed by the lifting/lowering rotary encoder 543.

Third Step

As shown in FIG. 8D, in a third step, at least one of the multicopter 1 and the mooring device 5 delivers the package 4 between the movable portion 53 and the multicopter 1, which have come close to each other. In this operation example, the package 4 is held in the package holding portion 16 of the multicopter 1 and the mooring device 5 receives the package 4 from the multicopter 1 as a result of the hook member 536 of the movable portion 53 being driven.

Figure 9C:
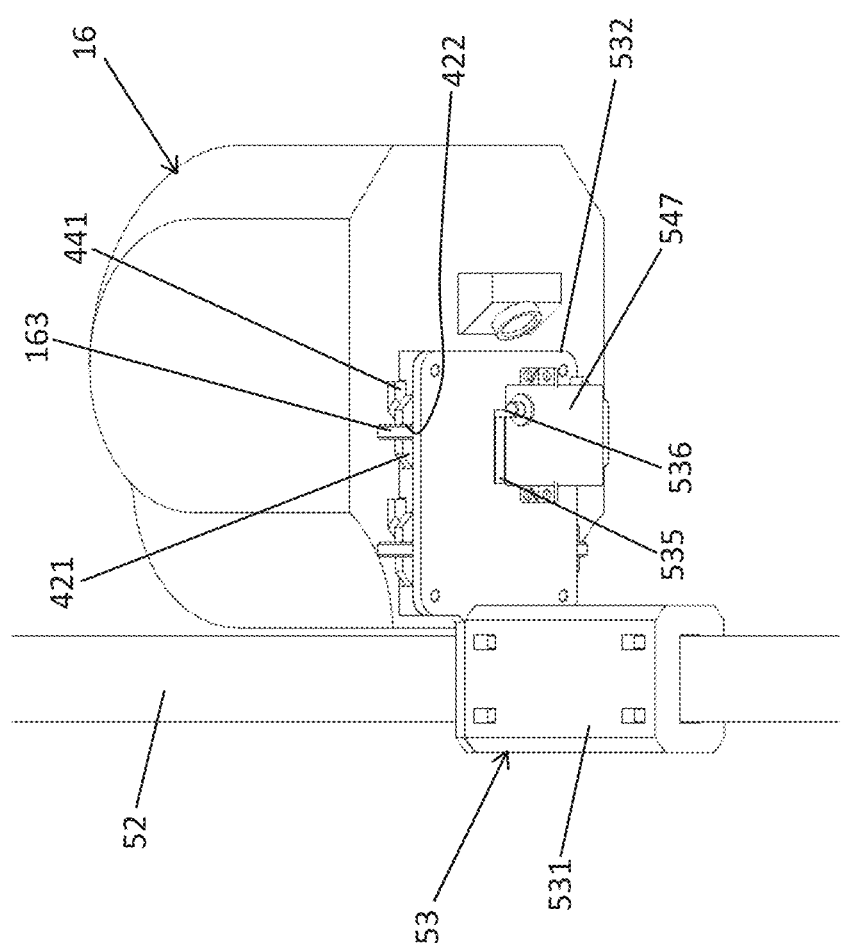
FIG. 9C shows a detailed example of the process for delivering a package between the package holding portion of the multicopter and the movable portion of the mooring device.
Figure 9D:
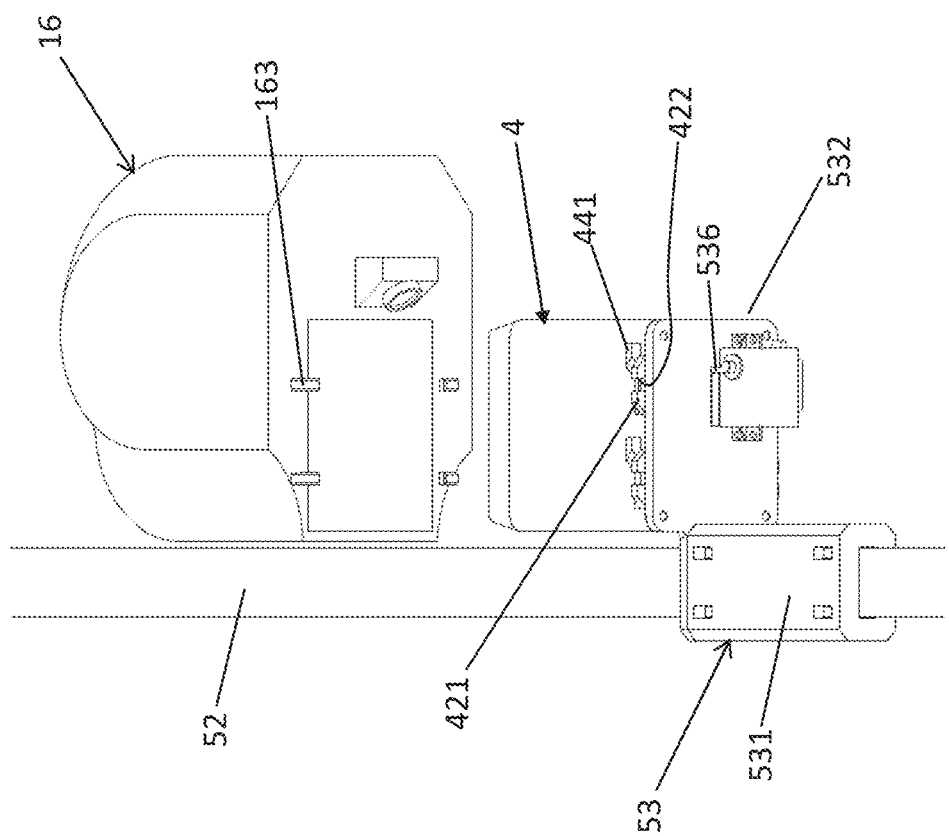
FIG. 9D shows a detailed example of the process for delivering a package between the package holding portion of the multicopter and the movable portion of the mooring device.

FIGS. 9B to 9D show a detailed example of a process for delivering the package 4 between the package holding portion 16 of the multicopter 1 and the movable portion 53 of the mooring device 5. First, as shown in FIG. 9B, in a state in which the hook member 536 takes the second position, the mooring device 5 moves the support table 532 of the movable portion 53 close to the package holding portion 16 of the multicopter 1. In this state, the hook member 536 is not inserted into the opening 43, and accordingly, the slide plate 44 takes the second position at which the protrusions 441 close the groove portions 422. Therefore, the protrusions 441 closing the groove portions 422 are caught on the protrusions 163 of the package holding portion 16 and thus the package 4 is held in the package holding portion 16 in a state of being housed in the housing space 161.

The mooring device 5 can recognize whether or not the multicopter 1 is present on the support surface 533 of the support table 532, in other words, whether or not the support surface 533 of the support table 532 has approached (or is in contact with) the package 4 held in the package holding portion 16, based on a result of detection performed by the multicopter detection sensor 546. After recognizing that the package 4 has approached the support surface 533 of the support table 532, the mooring device 5 drives the package lock servomotor 547 to move the hook member 536 to the first position as shown in FIG. 9C. As a result, a leading end portion of the hook member 536 protrudes toward the support surface 533 side via the through hole 535 and is inserted into the opening 43 of the package 4, and thus the package 4 on the support surface 533 can be fixed in the up-down direction with the hook member 536.

In addition, in this state, the slide plate 44 takes the first position at which the protrusions 441 do not close the groove portions 422, as a result of the hook member 536 being inserted into the opening 43. Therefore, the protrusions 441 of the slide plate 44 are not caught on the protrusions 163 of the package holding portion 16, and the protrusions 163 of the package holding portion 16 can pass through the groove portions 422, and accordingly, the package 4 can be downwardly pulled out from the housing space 161. That is, in the present embodiment, the package 4 can be delivered from the package holding portion 16 of the multicopter 1 to the movable portion 53 of the mooring device 5 by bringing the support table 532 of the movable portion 53 into contact with the package 4 and driving the package lock servomotor 547 to lock the package 4 with the hook member 536.

Thereafter, as shown in FIG. 9D, the mooring device 5 can take out the package 4 from the housing space 161 of the package holding portion 16 by separating the movable portion 53 from the multicopter 1 with the package 4 locked with the hook member 536. Note that a package 4 supported by the support table 532 of the movable portion 53 can be delivered to the package holding portion 16 of the multicopter 1 by executing the above-described series of operations in a reverse manner.

Fourth Step

In a fourth step, after the package 4 has been delivered, the mooring device 5 separates the movable portion 53 from the multicopter 1 as shown in FIG. 8E. In the present embodiment, the mooring device 5 lowers the movable portion 53 toward the base portion 51 by driving the lifting/lowering motor 544 while referring to a result of detection performed by the lifting/lowering rotary encoder 543. Thus, the mooring device 5 separates the movable portion 53 from the multicopter 1.

Figure 9E:
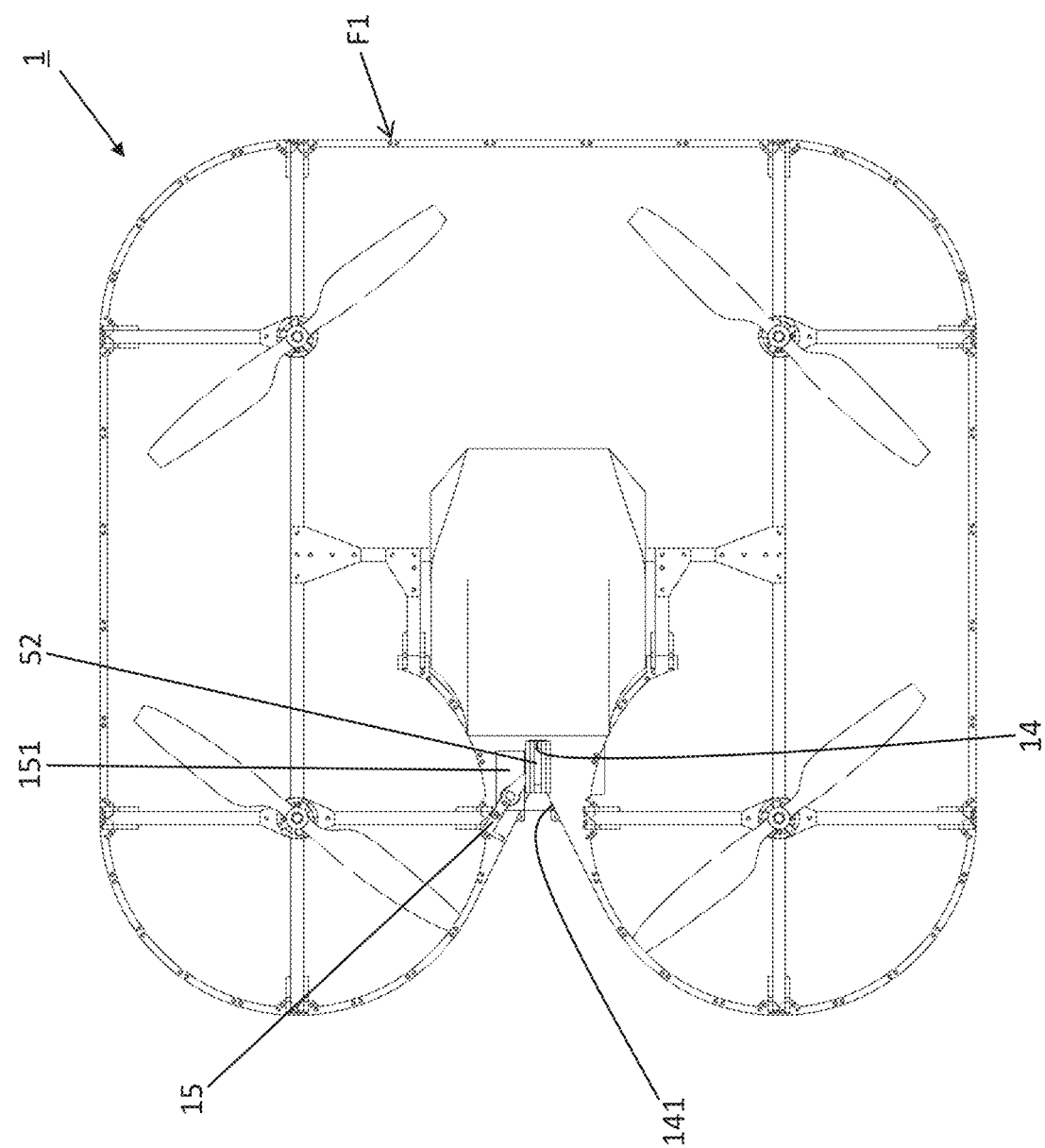
FIG. 9E shows one example of a situation in which the linear member of the mooring device has been released from the reception portion of the multicopter.

Also, as shown in FIG. 9E, the multicopter 1 drives the opening/closing servomotor 151 to turn the turn pieces 15 to the open position before executing the following fifth step. FIG. 9E shows one example of a situation in which the turn pieces 15 are turned to the open position so that the linear member 52 of the mooring device 5 can be released from the reception portion 14 of the multicopter 1. As shown in FIG. 9E, as a result of the turn pieces 15 being turned to the open position, the opening 141 is opened. Thus, the multicopter 1 enters a state of being able to separate from the linear member 52 by releasing the linear member 52 from the opening 141.

Fifth Step

Figure 8F:
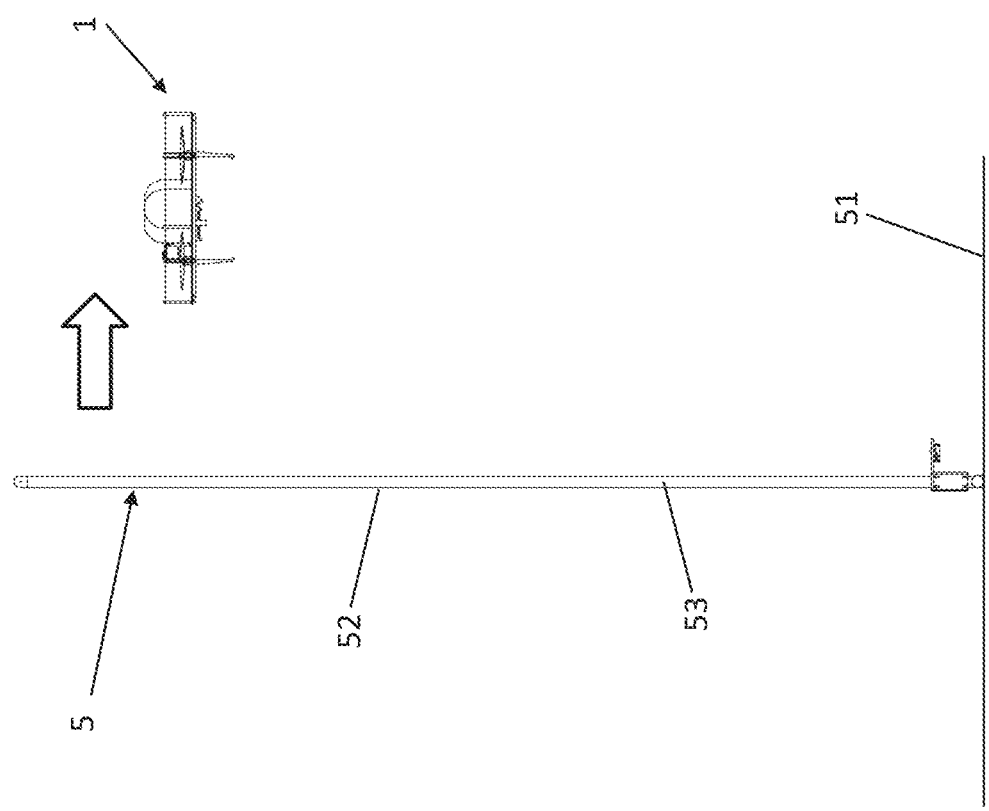
FIG. 8F shows one example of the process for delivering a package according to the embodiment.

As shown in FIG. 8F, in the fifth step, the multicopter 1 separates from the linear member 52 of the mooring device 5. Thus, operations for delivering the package 4 according to this operation example end. Thereafter, the multicopter 1 may continuously execute operations for collecting another package, for example. Also, the package 4 delivered to the mooring device 5 may be appropriately collected using a robot or by a person, for example.

Features

As described above, in the present embodiment, as a result of the reception portion 14 of the multicopter 1 receiving the linear member 52 of the mooring device 5 in a direction intersecting with the extension direction of the linear member 52 in the first step, the flight direction of the multicopter 1 can be restricted to the extension direction of the linear member 52 in the operations performed in the second and following steps. Accordingly, the multicopter 1 can accurately arrive at the target position even if the flight of the multicopter 1 is not precisely controlled, and the package 4 can be delivered at the target position. Therefore, according to the present embodiment, safety can be enhanced when the multicopter 1 is used to transport the package 4, and it is possible to transport the package 4 using the multicopter 1 while ensuring safety even in a densely populated area such as an apartment building or a residential area.

Furthermore, in the present embodiment, the movable portion 53 of the mooring device 5 approaches the multicopter 1 and the package 4 is delivered between the movable portion 53 and the package holding portion 16 of the multicopter 1 as described about the operations performed in the second to fourth steps. Accordingly, the multicopter 1 need not land on the base portion 51 or the like to deliver the package 4. Therefore, according to the present embodiment, the multicopter 1 need not approach a building, a person, or the like when the package 4 is delivered, and therefore safety can be further enhanced when the multicopter 1 is used to transport the package 4.

§ 3 Variations

Although the embodiment of the present invention has been described in detail, the foregoing is merely an example of the present invention in all aspects. It goes without saying that various modifications and alterations can be made without departing from the scope of the present invention. The following changes can be made, for example. Note that in the following description, constitutional elements similar to those in the above-described embodiment are denoted with the same reference numerals as those used in the above-described embodiment, and descriptions of matter similar to that in the above-described embodiment are appropriately omitted. The following variations can be appropriately combined.

<3.1>

In the above-described embodiment, the multicopter 1 includes the four propellers 12. However, the number of propellers included in the multicopter 1 need not be limited to this example, and may be appropriately selected according to the embodiment. The multicopter 1 may also include a sensor, such as a gyroscope sensor for measuring the posture, other than those described above. Furthermore, the configuration and the shape of the airframe F1 of the multicopter 1 need not be limited to the examples in the above-described embodiment, and may be appropriately changed according to the embodiment. The "multicopter" according to the present embodiment means a helicopter in general that includes two or more propellers, and may include relatively small drones that include three or more propellers and are used for transportation of goods, aerial photography, and the like, as well as helicopters in general that include propellers respectively provided in a tail assembly and an upper portion of a main body. Also, the propellers 12 are driven by the rotors 121 in the multicopter 1 according to the above-described embodiment. However, the method for driving the propellers 12 of the multicopter 1 need not be limited to this example. A driving mechanism other than the rotors may also be used to drive the propellers 12 of the multicopter 1.

<3.2>

In the above-described embodiment, operations of the multicopter 1 and the mooring device 5 are controlled by the single control device 3. However, the configuration for controlling operations of the multicopter 1 and the mooring device 5 need not be limited to this example, and may be appropriately determined according to the embodiment. For example, the multicopter 1 and the mooring device 5 may also be controlled by different computers. Also, the multicopter 1 and the mooring device 5 may also be controlled by a built-in computer rather than being controlled by a computer that wirelessly communicates with the multicopter 1 and the mooring device 5. Furthermore, the multicopter land the mooring device 5 may be configured to be directly controlled by a user by using a radio controller or the like.

<3.3>

In the above-described embodiment, the linear member 52 extends in the vertical direction. The vertical direction is one example of the "predetermined direction" in the present invention. However, the extension direction of the linear member 52 (i.e., the predetermined direction) need not be limited to this example, and may be appropriately determined according to the embodiment. For example, the linear member 52 may also extend in the horizontal direction. Furthermore, the linear member 52 may also be inclined with respect to a certain direction or may be curved.

<3.4>

In the above-described embodiment, the pair of turn pieces 15 arranged in the up-down direction are attached to the vicinity of the opening 141 of the reception portion 14. However, the number of turn pieces 15 need not be limited to this example. The number of turn pieces 15 may also be one, or three or more. The turn pieces 15 may also be omitted.

The mechanism for confining the linear member 52 in the reception portion 14 need not be limited to the mechanism of the above-described embodiment in which the turn pieces 15 are used, and may be appropriately determined according to the embodiment. For example, the multicopter 1 may be configured to open and close the opening 141 by using a rack and pinion mechanism instead of the turn pieces 15.

<3.5>

In the above-described embodiment, the hook member 536 is attached to the package lock servomotor 547 arranged on the back surface 534. However, the arrangement of the hook member 536 need not be limited to this example, and may be appropriately determined according to the embodiment. For example, the hook member 536 may also be housed in the through hole 535. The hook member 536 may also be omitted. Furthermore, the movable portion 53 of the mooring device 5 may also include a mechanism that can support the package 4, instead of the hook member 536.

<3.6>

In the above-described embodiment, the multicopter 1 holds the package 4 in the package holding portion 16. However, the mechanism for holding a package need not be limited to this example, and may be appropriately determined according to the embodiment. For example, the multicopter 1 may also include another mechanism, such as a robot arm, that can hold a package, instead of the package holding portion 16. In this case, the multicopter 1 may also deliver the package 4 to the approached movable portion 53 in the above-described third step. Furthermore, the multicopter 1 and the mooring device 5 may also be configured to deliver a package in cooperation with each other.

<3.7>

In the above-described embodiment, the type of the package 4 need not be specifically limited, and may be appropriately selected according to the embodiment. For example, the package 4 may also be a battery of the multicopter 1. In this case, the multicopter 1 and the mooring device 5 may also be changed as described below.

Multicopter

Figure 10:
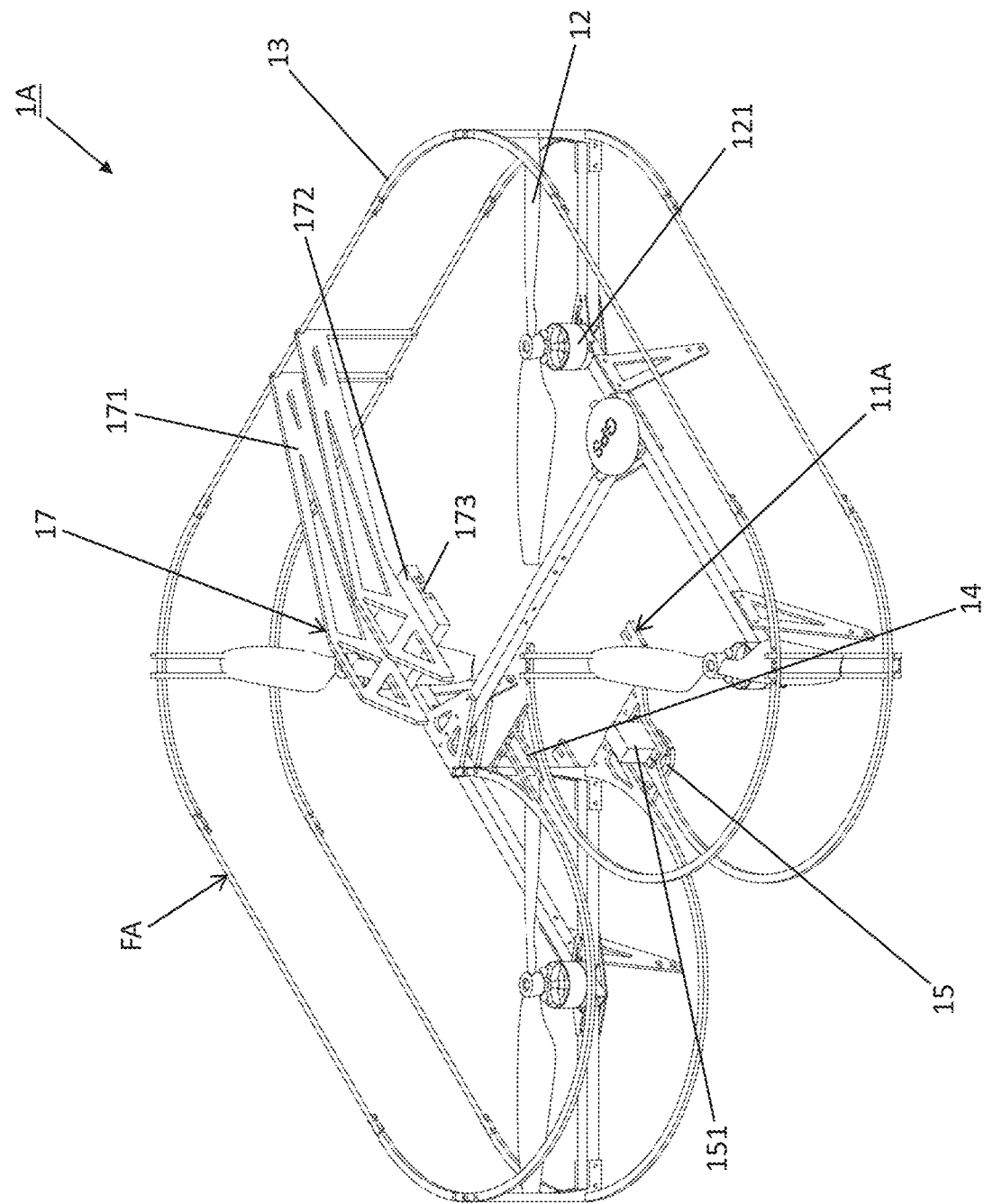
FIG. 10 is a perspective view showing one example of a multicopter according to a variation.

First, a multicopter 1A according to this variation will be described using FIG. 10. FIG. 10 is a perspective view showing one example of the multicopter 1A according to this variation. The multicopter 1A according to this variation includes a battery holding portion 17 for holding a battery instead of the above-described package holding portion 16.

The battery holding portion 17 includes an arm portion 171 that extends from a rear portion of the propeller guard 13 toward the center of a main body portion 11A and a flat plate-shaped holding member 172 that is attached to a lower side of a leading end portion of the arm portion 171. In this variation, the arm portion 171 is constituted by a pair of frame members. An arcuately curved groove portion 173 extends through side surfaces of the holding member 172, and a lower side of the groove portion 173 is open with a width that is narrower than the width of the groove portion 173. Thus, the battery holding portion 17 is configured to hold a battery (61, 62), which will be described later.

An airframe FA of the multicopter 1A includes the main body portion 11A of which a center portion is open. Thus, the multicopter 1A is configured such that a movable portion 55 of a mooring device 5A, which will be described later, can enter the center of the airframe FA. Except for these points, the multicopter 1A may be configured similarly to the above-described multicopter 1. Also, the system configuration of the multicopter 1A may be similar to that of the above-described multicopter 1. Note that the package attachment detection sensor 195 is used to detect whether or not a battery is appropriately attached to the battery holding portion 17.

Mooring Device

Next, the mooring device 5A according to this variation will be described using FIG. 11. FIG. 11 is a side view showing one example of the mooring device 5A according to this variation. The mooring device 5A according to this variation includes, instead of the above-described movable portion 53, the movable portion 55 that moves along the linear member 52 and is configured such that a battery can be replaced between the movable portion 55 and the multicopter 1A. Except for these points, the mooring device 5A may be configured similarly to the above-described mooring device 5.

Figure 12A:
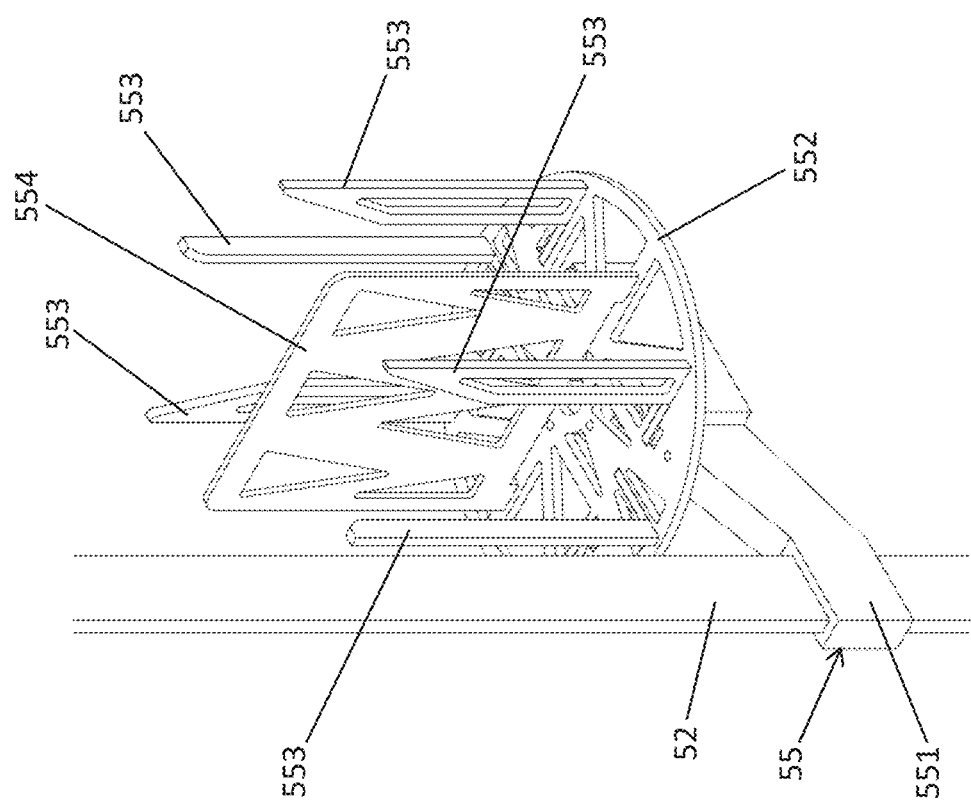
FIG. 12A is a perspective view showing one example of a movable portion of the mooring device according to the variation.
Figure 12B:
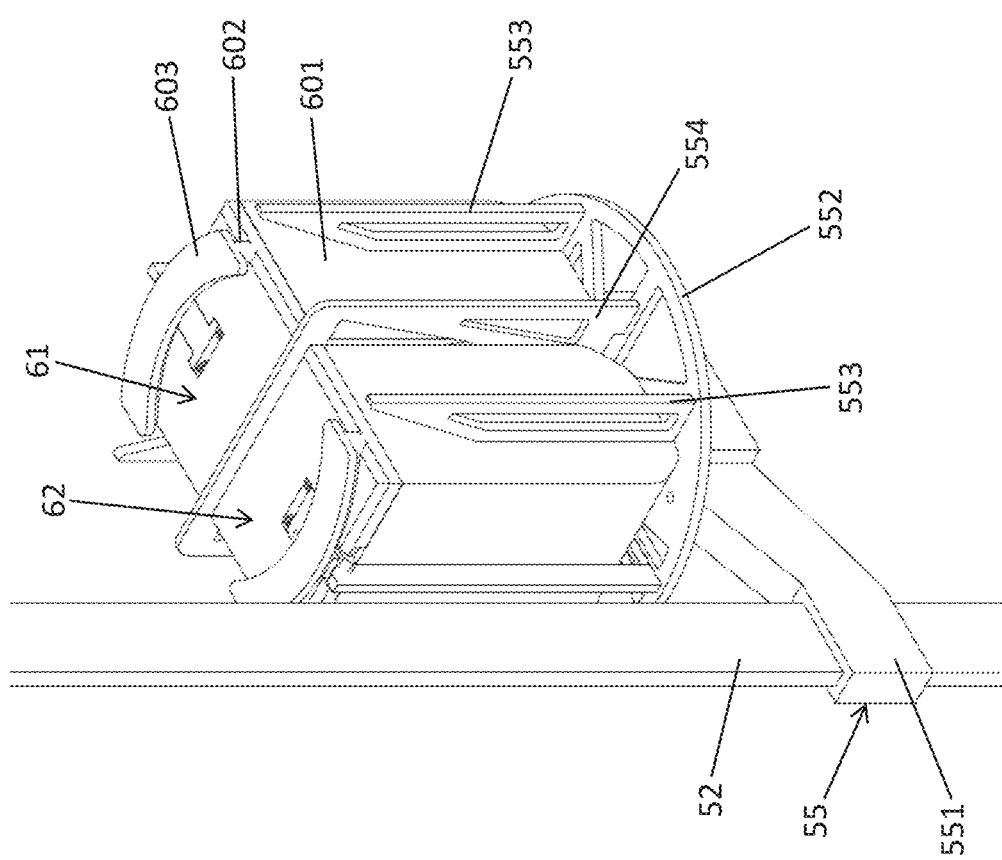
FIG. 12B is a perspective view showing one example of a state in which batteries are held in the movable portion of the mooring device according to the variation.

Here, the movable portion 55 will be described using FIGS. 12A and 12B. FIG. 12A is a perspective view showing one example of the movable portion 55 of the mooring device 5A according to this variation. FIG. 12B is a perspective view showing one example of a state in which batteries (61, 62) are held in the movable portion 55 according to this variation. As shown in the drawings, the movable portion 55 according to this variation includes a tubular member 551 through which the linear member 52 passes and a circular turntable 552 that is configured to support two batteries (61, 62). The tubular member 551 may be configured similarly to the tubular member 531 of the movable portion 53 according to the above-described embodiment.

A plurality of column portions 553 are arranged so as to be spaced apart from each other in a circumferential direction on an upper surface of the turntable 552. The column portions 553 may be constituted by frame members or the like. Also, a flat plate-shaped partition plate 554 is arranged at the center of the upper surface of the turntable 552. With this configuration, a pair of housing spaces each surrounded by the partition plate 554 and the column portions 553 are formed in the front-rear direction above the turntable 552. As shown in FIG. 12B, batteries (61, 62) are respectively held in the housing spaces.

Note that in this variation, each battery (61, 62) includes a casing portion 601 that has a substantially rectangular parallelepiped shape, and a protrusion 603 is coupled to an upper portion of the casing portion 601 via a neck portion 602. The protrusion 603 has an arcuately curved shape to conform to the shape of the groove portion 173 of the holding member 172. The neck portion 602 has a width that is narrower than the width of the opening on the lower side of the groove portion 173 so that the neck portion 602 can pass through the opening on the lower side of the groove portion 173.

With this configuration, the groove portion 173 of the holding member 172 receives the protrusion 603 of one of the batteries (61, 62) from a side surface side and keeps the received protrusion 603 from falling downward. That is, the battery holding portion 17 of the multicopter 1A can hold one of the batteries (61, 62) by coupling the holding member 172 and the one battery (61, 62) so as not to become separated in the up-down direction, in a state in which the protrusion 603 is received in the groove portion 173. In this state, the multicopter 1A can be supplied with electricity from the held battery (61, 62).

Figure 13:
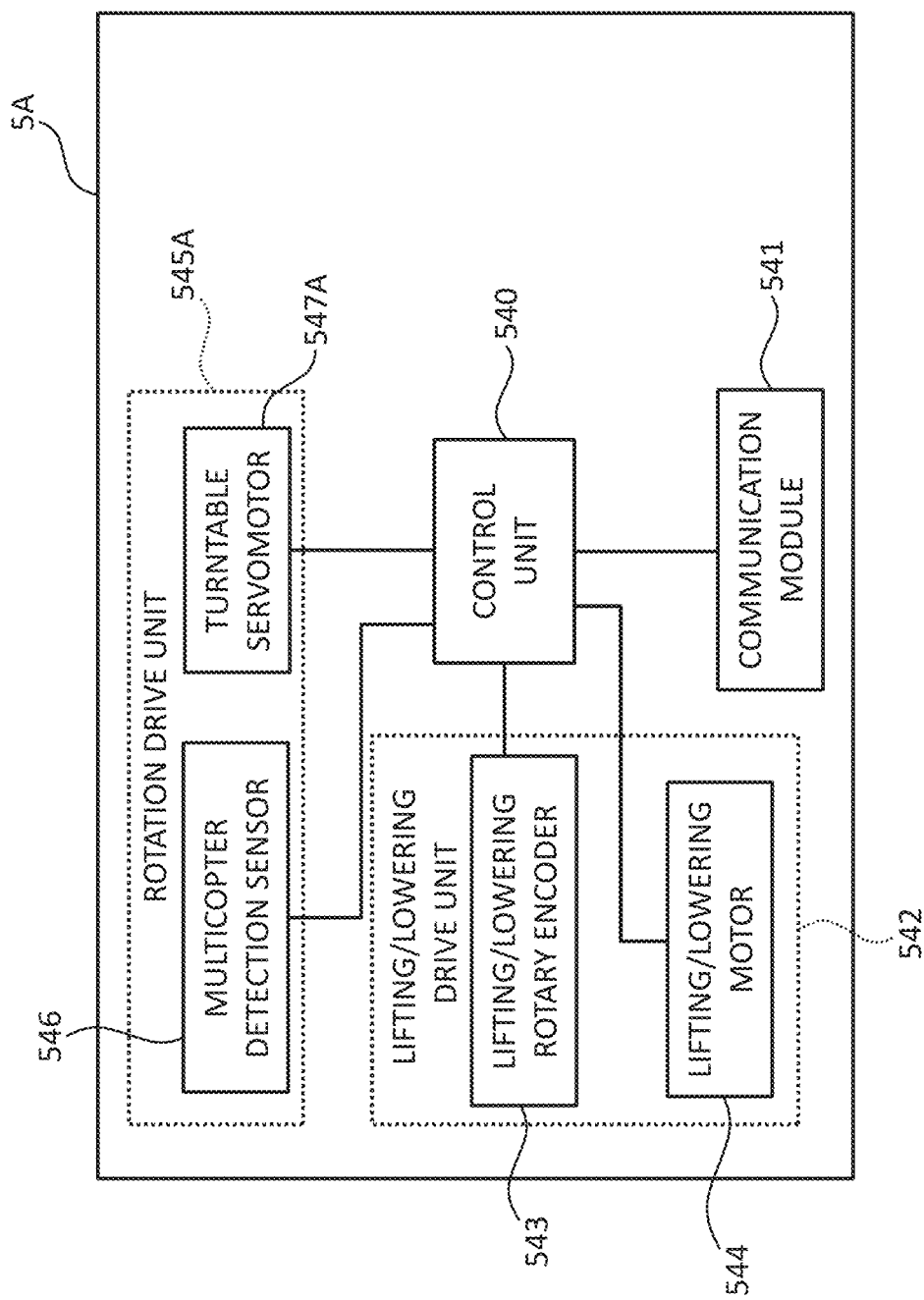
FIG. 13 schematically shows one example of a system configuration of the mooring device according to the variation.

Next, a system configuration of the mooring device 5A according to this variation will be described using FIG. 13. FIG. 13 schematically shows one example of the system configuration of the mooring device 5A according to this variation. As shown in FIG. 13, the mooring device 5A includes a rotation drive unit 545A instead of the lock drive unit 545. The rotation drive unit 545A is constituted by a multicopter detection sensor 546 and a turntable servomotor 547A. In this variation, with this configuration, the control unit 540 can determine whether or not the multicopter 1A is present on the turntable 552, i.e., whether or not a battery held by the multicopter 1A is housed in one of the housing spaces on the turntable 552, based on a result of detection performed by the multicopter detection sensor 546. Upon determining that the battery held by the multicopter 1A has been housed in one of the housing spaces on the turntable 552, the control unit 540 can drive the turntable servomotor 547A to rotate the turntable 552 and replace the battery held by the multicopter 1A with a battery held on the turntable 552 as described below. Except for these points, the system configuration of the mooring device 5A may be similar to that of the above-described mooring device 5.

Operation Example

Next, a process for delivering a battery between the multicopter 1A and the mooring device 5A according to this variation will be described using FIGS. 14A to 14F. FIGS. 14A to 14F show one example of the process for delivering a battery. The following describes a process for replacing a battery 61 held by the multicopter 1A with a battery 62 held by the mooring device 5A. However, the following procedure is merely one example, and steps may be changed where possible. Also, steps of the following procedure can be appropriately omitted, replaced, or added according to the embodiment. Note that similarly to the above-described embodiment, the multicopter 1A and the mooring device 5A may execute operations in the following steps as a result of being controlled by the control device 3.

Figure 14C:
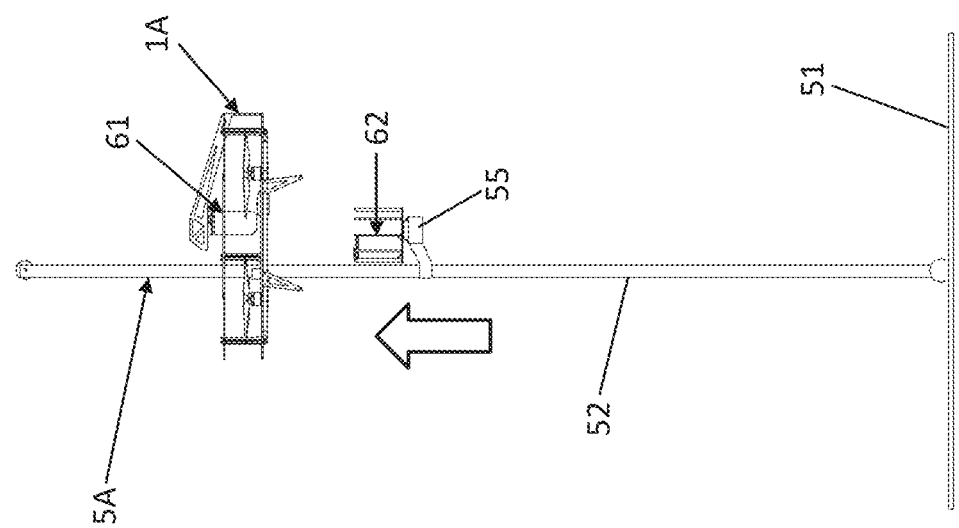
FIG. 14C shows one example of the process for delivering a package (battery replacement) according to the variation.

As shown in FIGS. 14A and 14B, in a first step, the multicopter 1A approaches the linear member 52 of the mooring device 5A and receives the linear member 52 in the reception portion 14 in a direction intersecting with the extension direction of the linear member 52. As shown in FIG. 14C, in a second step, the mooring device 5A moves the movable portion 55 close to the multicopter 1A. The first step and the second step according to this variation can be executed similarly to those in the above-described embodiment. The battery 61 is held by the battery holding portion 17 of the multicopter 1A, and the multicopter 1A can operate using electricity supplied from the battery 61. Also, the movable portion 55 of the mooring device 5A holds the battery 62. The battery 62 is preferably an unused or charged battery.

Figure 14D:
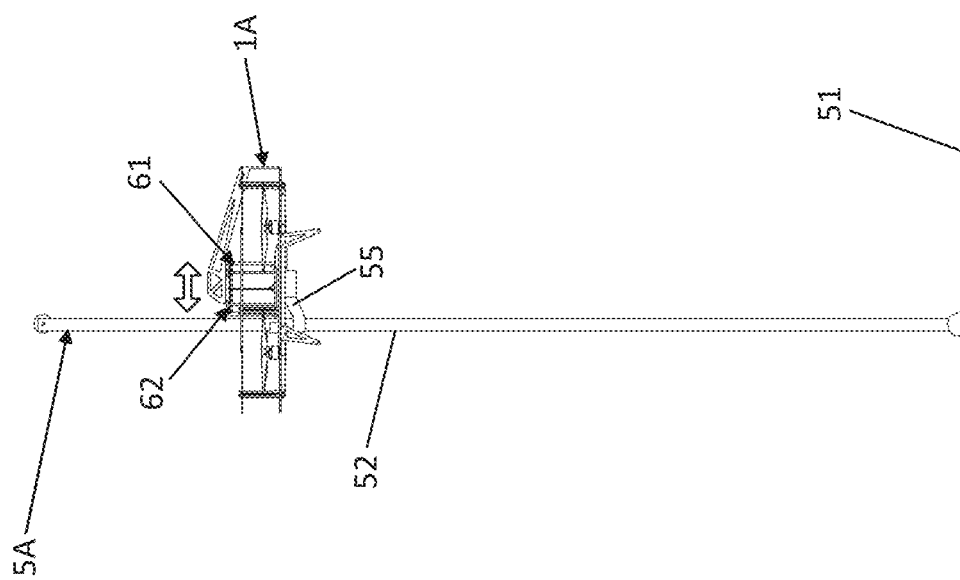
FIG. 14D shows one example of the process for delivering a package (battery replacement) according to the variation.

As shown in FIG. 14D, in a third step, at least one of the multicopter 1A and the mooring device 5A delivers the battery between the movable portion 55 and the multicopter 1A, which have come close to each other. In this variation, the battery 62 is held in a front side housing space that is close to the linear member 52, out of the pair of housing spaces formed on the upper surface of the turntable 552. Therefore, in the above-described second step, the mooring device 5A lifts the movable portion 55 toward the multicopter 1A such that the battery 61 will be housed in the other housing space. Upon recognizing that the battery 61 has been housed in the other housing space based on a result of detection performed by the multicopter detection sensor 546, the mooring device 5A stops driving the lifting/lowering motor 544 to stop lifting the movable portion 55. Then, the mooring device 5A drives the turntable servomotor 547A to rotate the turntable 552 by 180 degrees and interchange positions of the pair of housing spaces.

FIG. 15 shows one example of a situation in which the battery 61 is detached from the battery holding portion 17 of the multicopter 1A according to this variation. When the turntable 552 is rotated, the battery 61 held by the battery holding portion 17 moves in the circumferential direction together with the column portions 553 and the partition plate 554 forming the housing space. As a result, the protrusion 603 of the battery 61 comes out from the groove portion 173 of the battery holding portion 17 and the battery 61 can be released from the battery holding portion 17. On the other hand, the battery 62 held by the movable portion 55 moves in the circumferential direction together with the column portions 553 and the partition plate 554 forming the housing space. As a result, the protrusion 603 of the battery 62 enters the groove portion 173 of the battery holding portion 17 from the side opposite to the side from which the protrusion 603 of the battery 61 comes out, and the battery holding portion 17 can hold the battery 62.

That is, in this variation, the battery 61 held by the multicopter 1A can be replaced with the battery 62 held by the mooring device 5A by rotating the turntable 552 by 180 degrees. Thus, the new battery 62 can be attached to the multicopter 1A in place of the battery 61 that has been used. Note that after the battery 61 is detached, electricity may not be supplied to the multicopter 1A until the battery 62 is attached. During this period, the turntable 552 of the movable portion 55 supports the multicopter 1A to prevent the multicopter 1A from falling.

Figure 14F:
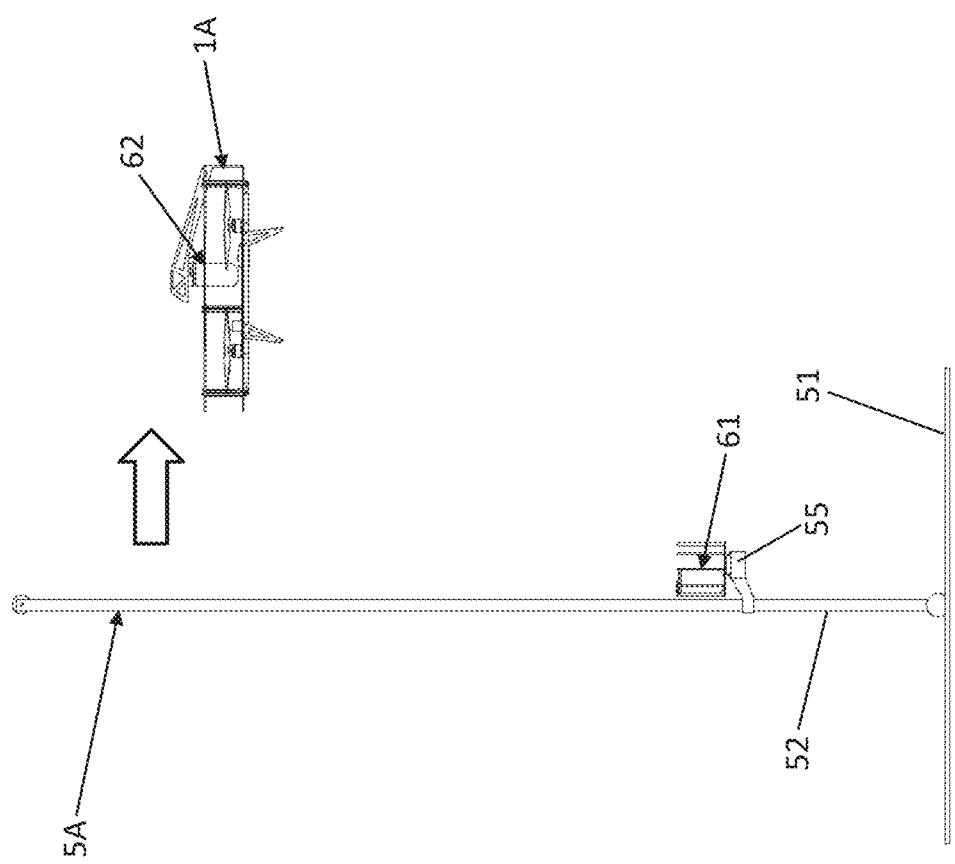
FIG. 14F shows one example of the process for delivering a package (battery replacement) according to the variation.

In a fourth step, after the batteries (61, 62) have been delivered, the mooring device 5A separates the movable portion 55 from the multicopter 1A as shown in FIG. 14E. In a fifth step, the multicopter 1A separates from the linear member 52 of the mooring device 5A as shown in FIG. 14F. The fourth step and the fifth step according to this variation can be executed similarly to those in the above-described embodiment.

Through the above, operations for delivering the batteries (61, 62) according to this operation example are complete. Thereafter, the multicopter 1A may continuously execute operations for collecting another package, for example. Also, the used battery 61 delivered to the mooring device 5A may be appropriately collected using a robot or by a person, for example. According to this variation, the battery of the multicopter 1A can be replaced using the mooring device 5A. Therefore, the battery can be safely replaced and the duration of a flight of the multicopter 1A can be extended.

Note that configurations of the multicopter 1A and the mooring device 5A need not be limited to the above-described examples, and may be appropriately changed according to the embodiment. For example, the multicopter 1A may also be configured to hold a plurality of batteries. Also, three or more housing spaces may also be formed on the turntable 552 of the mooring device 5A.

<3.8>

In the above-described embodiment, the mooring device 5 (base portion 51) is installed on the ground. However, the installation site of the mooring device 5 need not be limited to the ground, and may be appropriately determined according to the embodiment. For example, the mooring device 5 may be installed on a ceiling of a building. The "ceiling" may include any type of surface that is open vertically downward, for example, a ceiling surface of a building. The surface of the ceiling is preferably flat, but may also be sloped or curved. In a case in which the mooring device 5 is installed on the ceiling, the multicopter 1 and the mooring device 5 may also be changed as described below.

Multicopter

Figure 16:
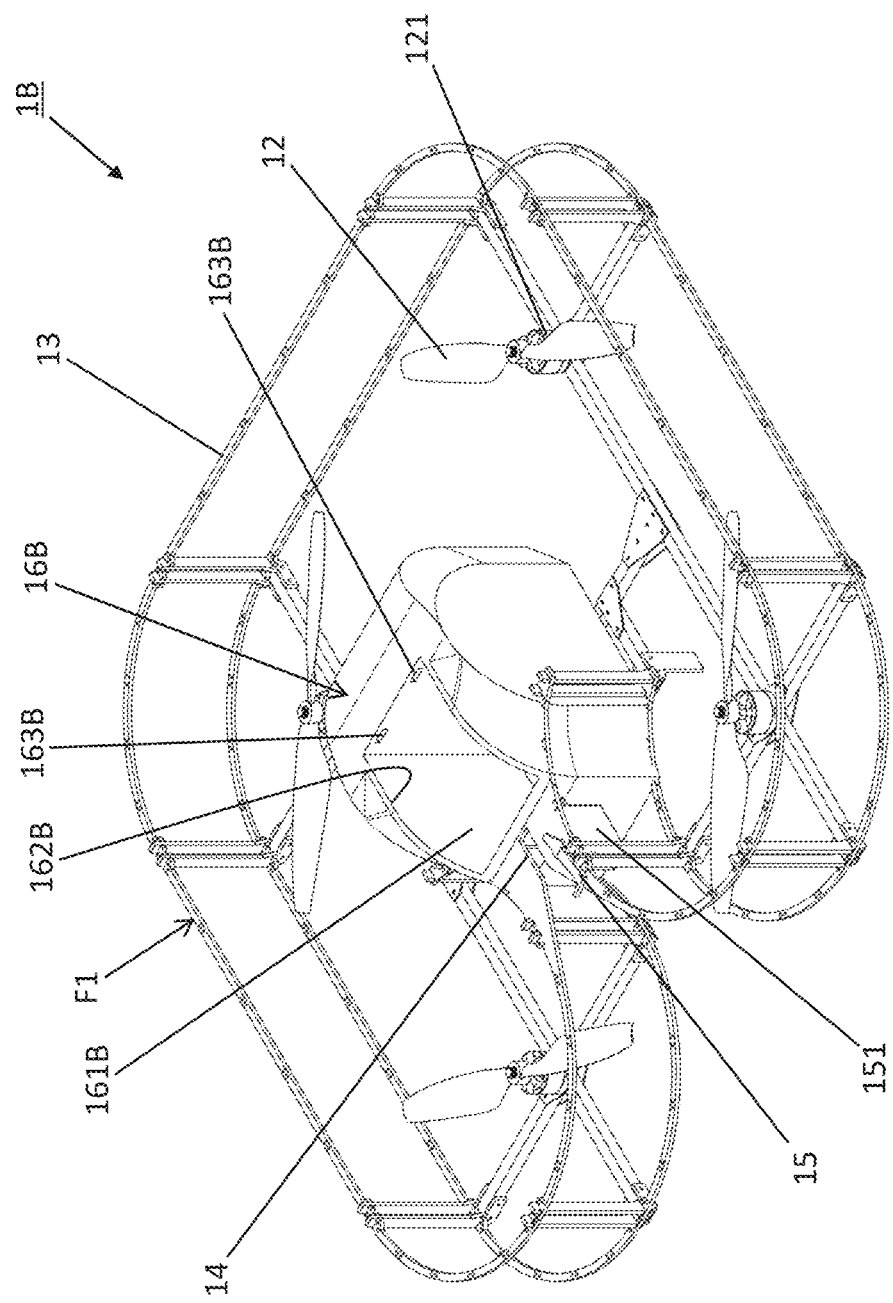
FIG. 16 is a perspective view showing one example of a multicopter according to a variation.

First, a multicopter 1B according to this variation will be described using FIG. 16. FIG. 16 is a perspective view showing one example of the multicopter 1B according to this variation. The multicopter 1B according to this variation includes a package holding portion 16B instead of the above-described package holding portion 16.

In this variation, a mooring device 5B, which will be described later, is installed on the ceiling, and therefore the package holding portion 16B has a configuration that is obtained by inverting the package holding portion 16 according to the above-described embodiment upside down. Specifically, the package holding portion 16B is constituted by a dome-shaped casing and includes a housing space 161B that is formed to be able to house a package. The housing space 161B is similar to the housing space 161 according to the above-described embodiment.

A rectangular insertion hole 162B is formed on the upper side of the housing space 161B, i.e., on an upper surface side of the package holding portion 16B, and the housing space 161B is in communication with the outside via the insertion hole 162B. Note that in this variation, when the linear member 52 of the mooring device 5B, which will be described later, is received in the reception portion 14, a movable portion 53B of the mooring device 5B is disposed on the upper side of the multicopter 1B. Accordingly, the upper side of the housing space 161B is one example of the "side on which the movable portion is disposed" in the present invention.

Furthermore, in this variation, a pair of recesses 163B are provided in an inner wall surface of the housing space 161B, instead of the above-described protrusions 163. The recesses 163B are appropriately positioned to lock protrusions 441B of a package 4B, which will be described later. Thus, the package holding portion 16B according to this variation is configured to hold a package. Note that in other aspects, the multicopter 1B may be configured similarly to the above-described multicopter 1. Also, the system configuration of the multicopter 1B may be similar to that of the above-described multicopter 1.

Mooring Device

Figure 17B:
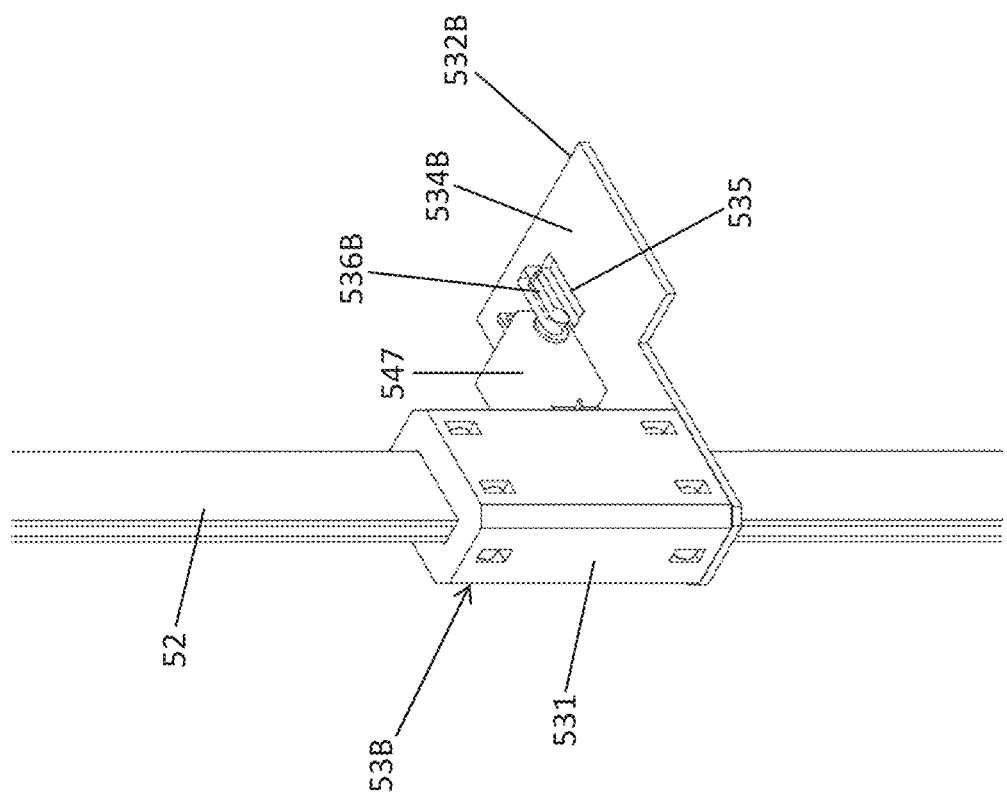
FIG. 17B is a perspective view showing one example of a movable portion of the mooring device according to the variation.

Next, the mooring device 5B according to this variation will be described using FIGS. 17A and 17B. FIG. 17A is a side view showing one example of the mooring device 5B according to this variation. FIG. 17B is a perspective view showing one example of the movable portion 53 of the mooring device 5B according to this variation. The mooring device 5B basically has a configuration that is obtained by inverting the mooring device 5 according to the above-described embodiment upside down.

Specifically, the mooring device 5B includes a base portion 51B that is installed on the ceiling, the linear member 52 that extends from the base portion 51B, and the movable portion 53B that moves along the linear member 52 and is configured such that a package can be delivered between the movable portion 53B and the multicopter 1B. The base portion 51B may be configured similarly to the above-described base portion 51 except that the base portion 51B is installed on the ceiling. Since the base portion 51B is installed on the ceiling, the linear member 52 according to this variation extends in the vertical direction from the ceiling.

Figure 18A:
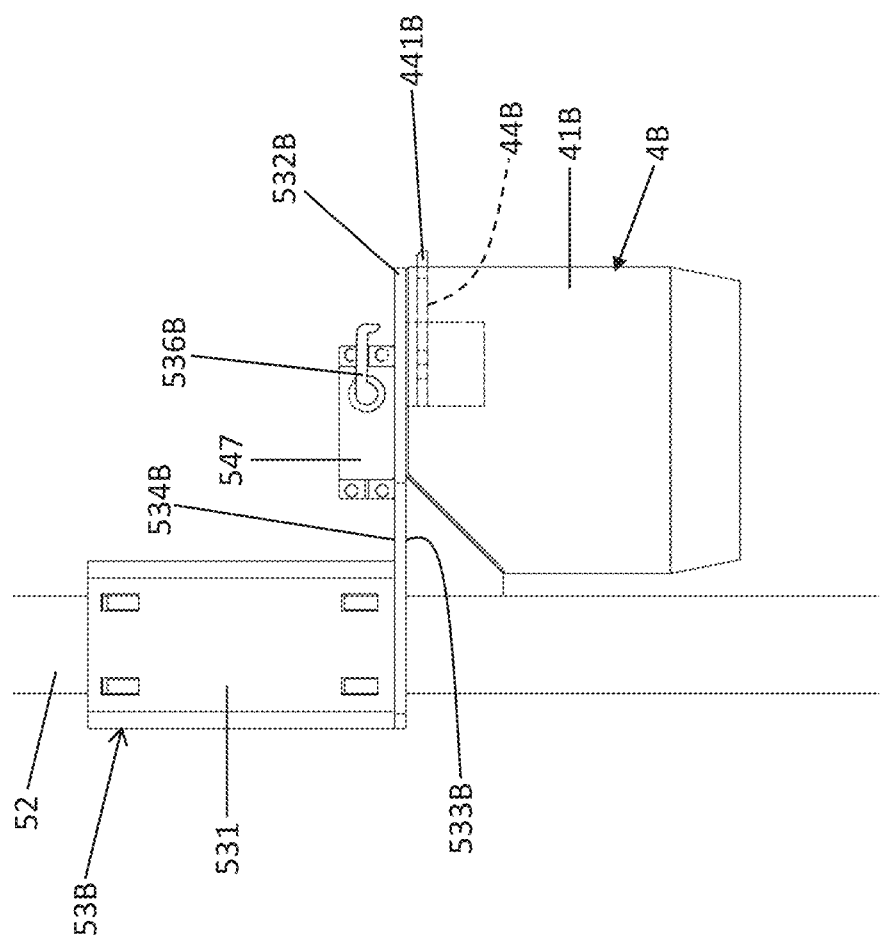
FIG. 18A shows one example of a relationship (released state) between the movable portion of the mooring device according to the variation and a package.

Next, a relationship between the movable portion 53B according to this variation and the package 4B will be described by further using FIGS. 18A and 18B. The movable portion 53B according to this variation has a configuration that is obtained by inverting the above-described movable portion 53 upside down. Specifically, in the movable portion 53B according to this variation, a support table 532B is coupled to a lower end of the tubular member 531, a lower surface of the support table 532B is a support surface 533B that supports the package 4B, and an upper surface of the support table 532B is a back surface 534B. An L-shaped hook member 536B is attached to the package lock servomotor 547 on the back surface 534B to be able to take a first position (FIG. 18B) at which the hook member 536B protrudes toward the support surface 533B side via the through hole 535 and is inserted into an opening of the package 4B and a second position (FIG. 18A) at which the hook member 536B does not protrude toward the support surface 533B side and releases the package 4B. Note that in other aspects, the mooring device 5B may be configured similarly to the above-described mooring device 5. The system configuration of the mooring device 5B may also be similar to that of the above-described mooring device 5.

Also, the package 4B basically has a configuration that is obtained by inverting the above-described package 4 upside down. Specifically, the package 4B according to this variation includes a main body portion 41B that has a substantially rectangular parallelepiped shape. The main body portion 41B may be configured similarly to the above-described main body portion 41. The package 4B is housed in the housing space 161B from a lower end side of the main body portion 41B. When the package 4B is housed in the housing space 161B, an upper surface of the main body portion 41B is exposed from the insertion hole 162B. Therefore, in this variation, an opening into which the hook member 536B can be inserted is provided in the upper surface of the main body portion 41B. Similarly to the above-described embodiment, a leading end portion of the hook member 536B can be hooked on an inner wall of an interior space that is in communication with the opening.

Furthermore, similarly to the above-described embodiment, a slide plate 44B that is slidable in the front-rear direction is attached to the inside of the package 4B. The slide plate 44B is provided with a pair of protrusions 441B that are configured to protrude from a side surface of the main body portion 41B as a result of the slide plate 44B sliding and are provided at positions corresponding to positions of the recesses 163B of the package holding portion 16B. Also, similarly to the above-described embodiment, the slide plate 44B includes an opening at a position corresponding to the position of the opening of the package 4B. Thus, the slide plate 44B is configured to take a first position (FIG. 18B) at which the hook member 536B is inserted into the opening and the protrusions 441B do not protrude from the side surface of the main body portion 41B and a second position (FIG. 18A) at which the hook member 536B is not inserted into the opening and the protrusions 441B protrude from the side surface of the main body portion 41B.

Operation Example

Next, a process for delivering the package 4B between the multicopter 1B and the mooring device 5B according to this variation will be described using FIGS. 19A to 19E. FIGS. 19A to 19E show one example of the process for delivering the package 4B. However, the following procedure is merely one example, and steps may be changed where possible. Also, steps of the following procedure can be appropriately omitted, replaced, or added according to the embodiment. Furthermore, the following describes a situation in which the package 4B is delivered from the multicopter 1B to the mooring device 5B. However, the package 4B does not necessarily have to be delivered as in this example, and may also be delivered from the mooring device 5B to the multicopter 1B, or packages 4B may also be delivered in both directions where possible. Note that similarly to the above-described embodiment, the multicopter 1B and the mooring device 5B may execute operations in the following steps as a result of being controlled by the control device 3.

As shown in FIGS. 19A and 19B, in a first step, the multicopter 1B approaches the linear member 52 of the mooring device 5B and receives the linear member 52 in the reception portion 14 in a direction intersecting with the extension direction of the linear member 52. The first step according to this variation can be executed similarly to that in the above-described embodiment.

As shown in FIG. 19C, in a second step, the mooring device 5B moves the movable portion 53B close to the multicopter 1B. In this variation, the base portion 51B is installed on the ceiling. Therefore, the mooring device 5B lowers the movable portion 53B located in the vicinity of the base portion 51B to the position of the multicopter 1B by driving the lifting/lowering motor 544 while referring to a result of detection performed by the lifting/lowering rotary encoder 543. Upon recognizing that the support surface 533B of the support table 532B has approached (or is in contact with) the package holding portion 16B of the multicopter 1B based on a result of detection performed by the multicopter detection sensor 546, the mooring device 5B stops driving the lifting/lowering motor 544 to stop lowering the movable portion 53B.

Figure 19D:
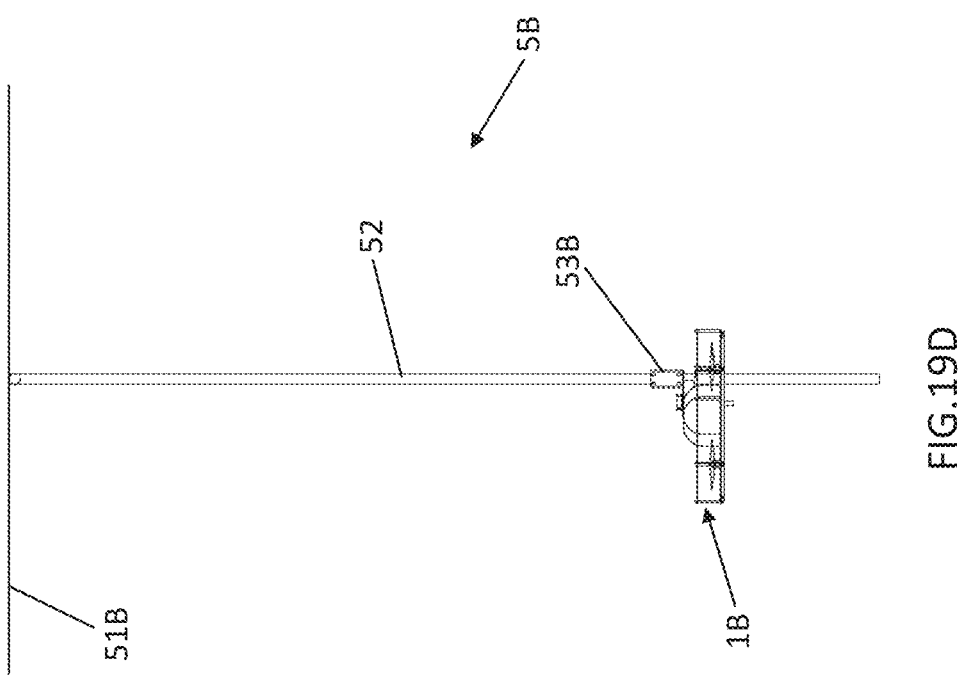
FIG. 19D shows one example of the process for delivering a package according to the variation.

As shown in FIG. 19D, in a third step, at least one of the multicopter 1B and the mooring device 5B delivers the package 4B between the movable portion 53B and the multicopter 1B, which have come close to each other. In this operation example, similarly to the third step in the above-described embodiment, the mooring device 5B recognizes that the support surface 533B of the support table 532B has approached (or is in contact with) the package holding portion 16B of the multicopter 1B, based on a result of detection performed by the multicopter detection sensor 546. Then, based on this recognition, the mooring device 5B drives the package lock servomotor 547 to move the hook member 536B to the first position. As a result, the leading end portion of the hook member 536B protrudes toward the support surface 533B side via the through hole 535 and is inserted into the opening of the package 4B, and thus the package 4B can be fixed on the support surface 533B in the up-down direction with the hook member 536B.

Before the hook member 536B is inserted, the slide plate 44B takes the second position and the protrusions 441B of the slide plate 44B are inserted into the recesses 163B provided in the housing space 161B of the package holding portion 16B. Thus, the package 4B is fixed to the housing space 161B of the multicopter 1B. In contrast, when the hook member 536B is inserted, the slide plate 44B takes the first position at which the protrusions 441B do not protrude from the side surface of the main body portion 41B. Accordingly, engagement between the protrusions 441B and the recesses 163B is canceled, and the package 4B can be upwardly pulled out from the housing space 161B.

Therefore, similarly to the above-described embodiment, in this variation, the package 4B is delivered from the package holding portion 16B of the multicopter 1B to the movable portion 53B of the mooring device 5B by bringing the support table 532B of the movable portion 53B into contact with the package 4B and driving the package lock servomotor 547 to lock the package 4B with the hook member 536B. Note that a package 4B supported by the support table 532B of the movable portion 53B can be delivered to the package holding portion 16B of the multicopter 1B by executing the above-described series of operations in a reverse manner.

In a fourth step, after the package 4B has been delivered, the mooring device 5B separates the movable portion 53B from the multicopter 1B as shown in FIG. 19E. In this variation, the mooring device 5B lifts the movable portion 53B toward the base portion 51B by driving the lifting/lowering motor 544 while referring to a result of detection performed by the lifting/lowering rotary encoder 543. Also, similarly to the above-described embodiment, before executing the following fifth step, the multicopter 1B opens the opening 141 by driving the opening/closing servomotor 151 to turn the turn pieces 15 to the open position.

In the fifth step, the multicopter 1B separates from the linear member 52 of the mooring device 5B. Thus, operations for delivering the package 4B according to this operation example end. Thereafter, the multicopter 1B may continuously execute operations for collecting another package, for example. Also, the package 4B delivered to the mooring device 5B may be appropriately collected using a robot or by a person, for example. Note that configurations of the multicopter 1B and the mooring device 5B need not be limited to the above-described examples, and may be appropriately changed according to the embodiment.

<3.9>

In the above-described variation <3.7>, the mooring device 5A is installed on the ground similarly to the above-described embodiment. However, the installation site of the mooring device 5A need not be limited to the ground, and may be appropriately determined according to the embodiment. For example, the mooring device 5A may be installed on a ceiling of a building similarly to the above-described variation <3.8>. In a case in which the mooring device 5A is installed on the ceiling, the multicopter 1A and the mooring device 5A may also be changed as described below.

Multicopter

Figure 20A:
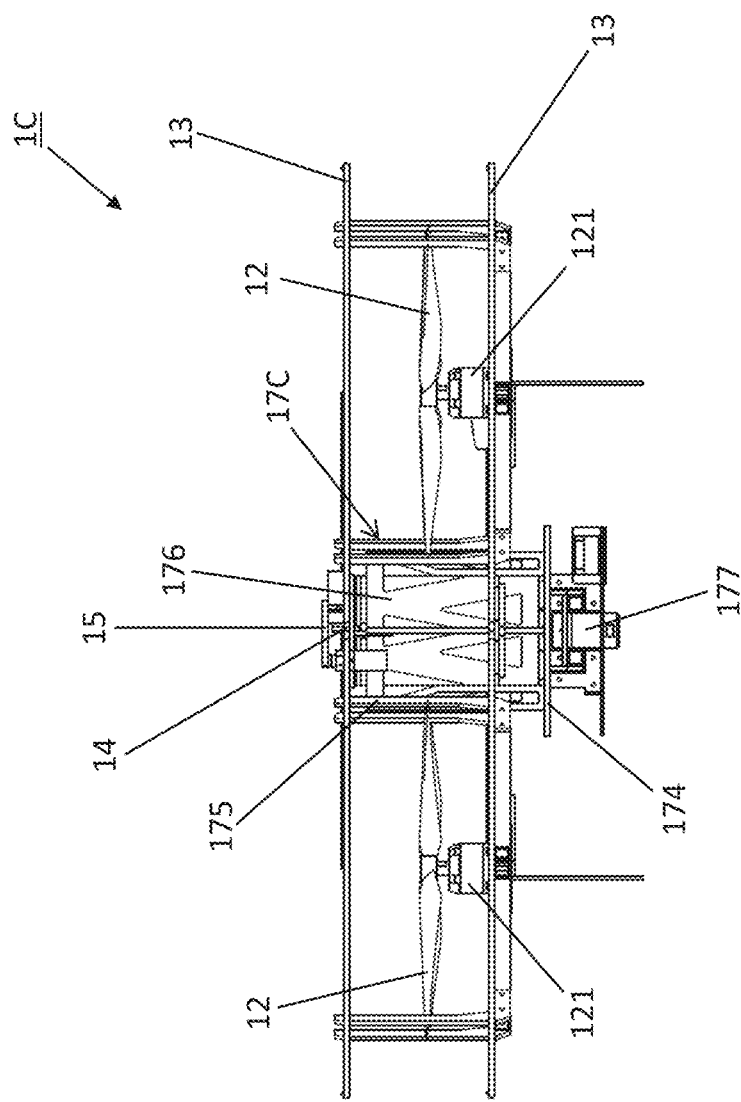
FIG. 20A is a front view showing one example of a multicopter according to a variation.

First, a multicopter 1C according to this variation will be described using FIGS. 20A and 20B. FIGS. 20A and 20B are a front view and a side view showing one example of the multicopter 1C according to this variation. The multicopter 1C according to this variation includes a battery holding portion 17C instead of the above-described battery holding portion 17.

The battery holding portion 17C is configured to be mostly the same as the turntable 552 in the movable portion 55 of the above-described mooring device 5A. Specifically, the battery holding portion 17C includes a circular turntable 174. The turntable 174 is driven to rotate by a turntable servomotor 177. A plurality of column portions 175 are arranged so as to be spaced apart from each other in a circumferential direction on an upper surface of the turntable 174. Also, a flat plate-shaped partition plate 176 is arranged at the center of the upper surface of the turntable 174. With this configuration, a pair of housing spaces each surrounded by the partition plate 176 and the column portions 175 are formed in the front-rear direction above the turntable 174. The housing spaces are configured to be interchangeable through rotation of the turntable 174. Battery holding portions (241, 243) are respectively provided in the housing spaces.

In the example shown in FIG. 20B, a first battery support portion 241 is provided in a rear housing space and a second battery support portion 243 is provided in a front housing space. A battery 61 that supplies electricity for driving the multicopter 1C is housed in the rear housing space and is supported by the first battery support portion 241. An L-shaped pressing member 179 that is attached to a pressing servomotor 178 is arranged above the rear housing space. As a result of the pressing member 179 being driven by the pressing servomotor 178, the battery 61 can be pressed from above to ensure contact between the battery 61 and the first battery support portion 241.

Note that except for these points, the multicopter 1C may be configured similarly to the above-described multicopter 1A. Also, the system configuration of the multicopter 1C may be similar to that of the above-described multicopter 1A. In a case in which a system configuration similar to that of the above-described multicopter 1A is adopted, the turntable servomotor 177 and the pressing servomotor 178 may be connected to the control unit 190.

Figure 21:
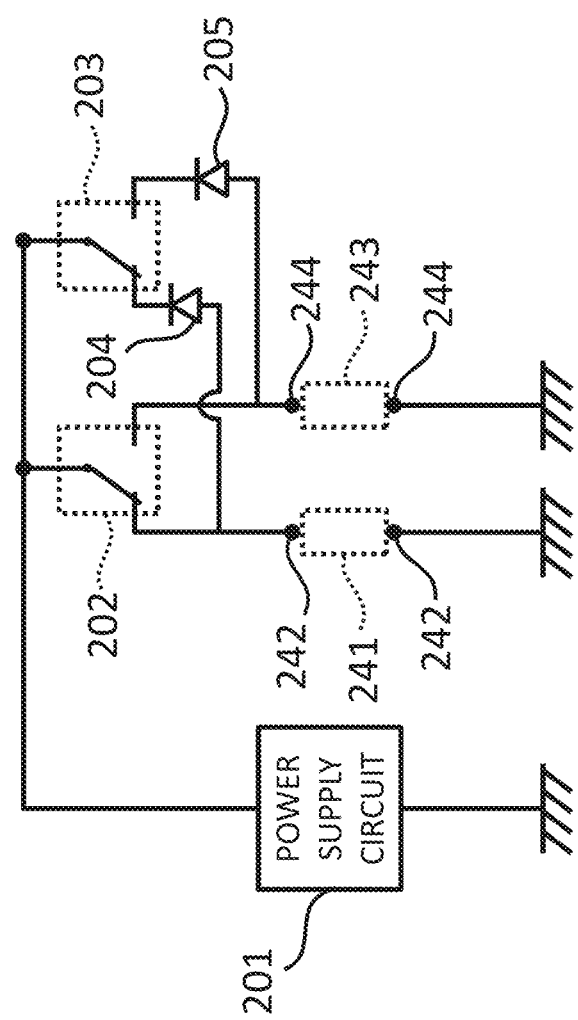
FIG. 21 schematically shows one example of a configuration of an electronic circuit of the multicopter according to the variation.

Next, an electronic circuit of the multicopter 1C according to this variation will be described using FIG. 21. FIG. 21 schematically shows one example of the configuration of the electronic circuit of the multicopter 1C according to this variation. Each battery support portion (241, 243) includes a pair of terminal portions (242, 244), and a power supply circuit 201 of the multicopter 1C is electrically connected to the terminal portions (242, 244). Thus, the power supply circuit 201 is configured to supply electricity from batteries attached to the battery support portions (241, 243) to each unit of the multicopter 1C.

In this variation, the terminal portions (242, 244) are connected in parallel, and two relay switches (202, 203) are arranged between the power supply circuit 201 and the terminal portions (242, 244). A first relay switch 202 is directly connected to the terminal portions (242, 244). On the other hand, diodes (204, 205) are arranged between a second relay switch 203 and the terminal portions (242, 244). The diodes (204, 205) are connected such that directions from the terminal portions (242, 244) toward the power supply circuit 201 are forward directions. Operations of the electronic circuit will be described later in detail.

Mooring Device

Figure 22B:
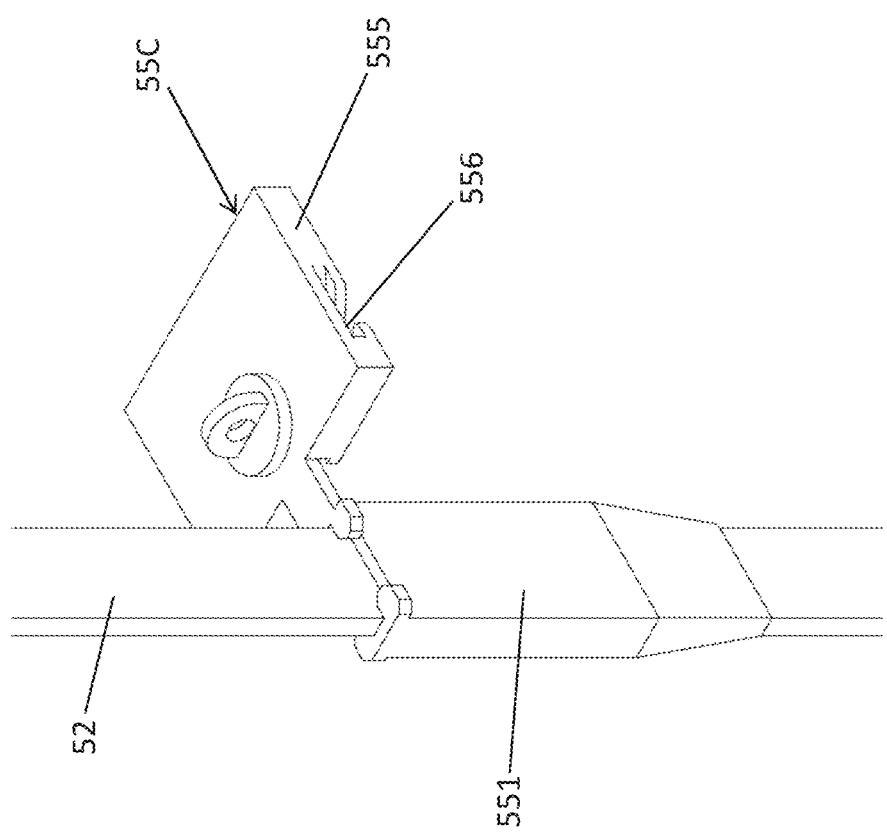
FIG. 22B is a perspective view showing one example of a movable portion of the mooring device according to the variation.

Next, a mooring device 5C according to this variation will be described using FIGS. 22A and 22B. FIG. 22A is a side view showing one example of the mooring device 5C according to this variation. FIG. 22B is a perspective view showing one example of a movable portion 55C of the mooring device 5C according to this variation. The mooring device 5C includes a base portion 51C that is installed on the ceiling, the linear member 52 that extends from the base portion 51C, and the movable portion 55C that moves along the linear member 52 and is configured such that a battery can be replaced between the movable portion 55C and the multicopter 1C. The base portion 51C may be configured similarly to the above-described base portion 51B.

The movable portion 55C according to this variation includes the tubular member 551 through which the linear member 52 passes and a flat plate-shaped holding member 555 that is coupled to an upper end of the tubular member 551. The holding member 555 is configured similarly to the holding member 172 of the multicopter 1A. That is, an arcuately curved groove portion 556 extends through side surfaces of the holding member 555, and a lower side of the groove portion 556 is open with a width that is narrower than the width of the groove portion 556. Thus, the holding member 555 is configured to hold a battery (61, 62).

Note that except for these points, the mooring device 5C may be configured similarly to the above-described mooring device 5A. Also, the system configuration of the mooring device 5C may be similar to that of the above-described mooring device 5A. In a case in which a system configuration similar to that of the above-described mooring device 5A is adopted, the turntable servomotor 547A of the rotation drive unit 545A may be omitted.

Operation Example

Next, a process for delivering a battery between the multicopter 1C and the mooring device 5C according to this variation will be described using FIGS. 23A to 23E. FIGS. 23A to 23E show one example of the process for delivering a battery. The following describes a process for replacing the battery 61 held by the multicopter 1C with the battery 62 held by the mooring device 5C. However, the following procedure is merely one example, and steps may be changed where possible. Also, steps of the following procedure can be appropriately omitted, replaced, or added according to the embodiment. Note that similarly to the above-described variation <3.7>, the multicopter 1C and the mooring device 5C may execute operations in the following steps as a result of being controlled by the control device 3.

As shown in FIGS. 23A and 23B, in a first step, the multicopter 1C approaches the linear member 52 of the mooring device 5C and receives the linear member 52 in the reception portion 14 in a direction intersecting with the extension direction of the linear member 52. The first step in this variation can be executed similarly to that in the above-described variation <3.7>. Note that the battery 61 is held in the battery holding portion 17C of the multicopter 1C, and the multicopter 1C can operate using electricity supplied from the battery 61. Also, the movable portion 55C of the mooring device 5C holds the battery 62. The battery 62 is preferably an unused or charged battery.

Figure 23C:
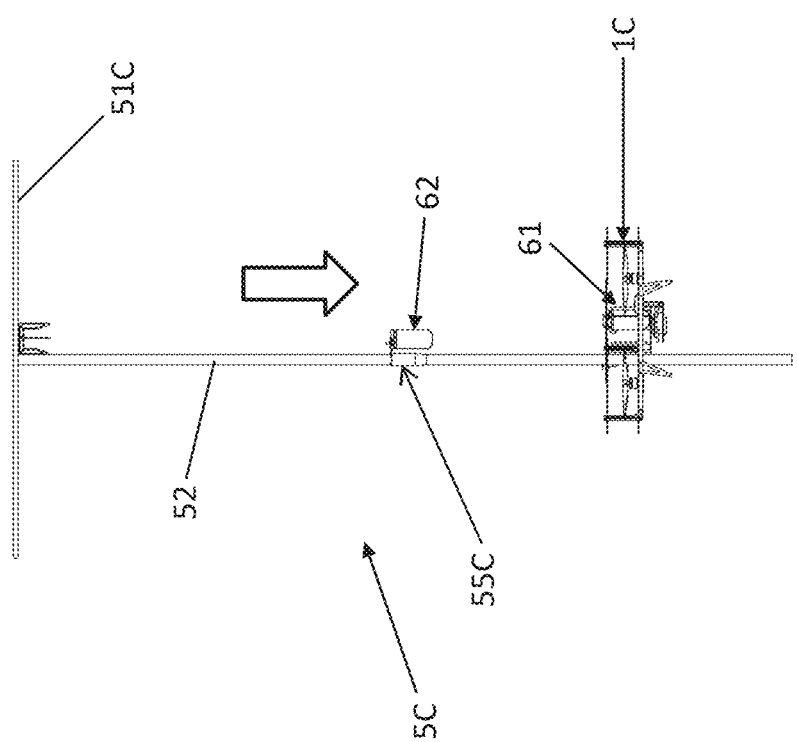
FIG. 23C shows one example of the process for delivering a package (battery replacement) according to the variation.

As shown in FIG. 23C, in a second step, the mooring device 5C moves the movable portion 55C close to the multicopter 1C. The second step can be executed similarly to that in the above-described variation <3.8>. That is, the mooring device 5C lowers the movable portion 55C located in the vicinity of the base portion 51C to the position of the multicopter 1C by driving the lifting/lowering motor 544. Upon recognizing that the battery 62 held by the holding member 555 has been housed in the front housing space on the turntable 174 of the multicopter 1C based on a result of detection performed by the multicopter detection sensor 546, the mooring device 5C stops driving the lifting/lowering motor 544 to stop lowering the movable portion 55C.

Figure 23D:
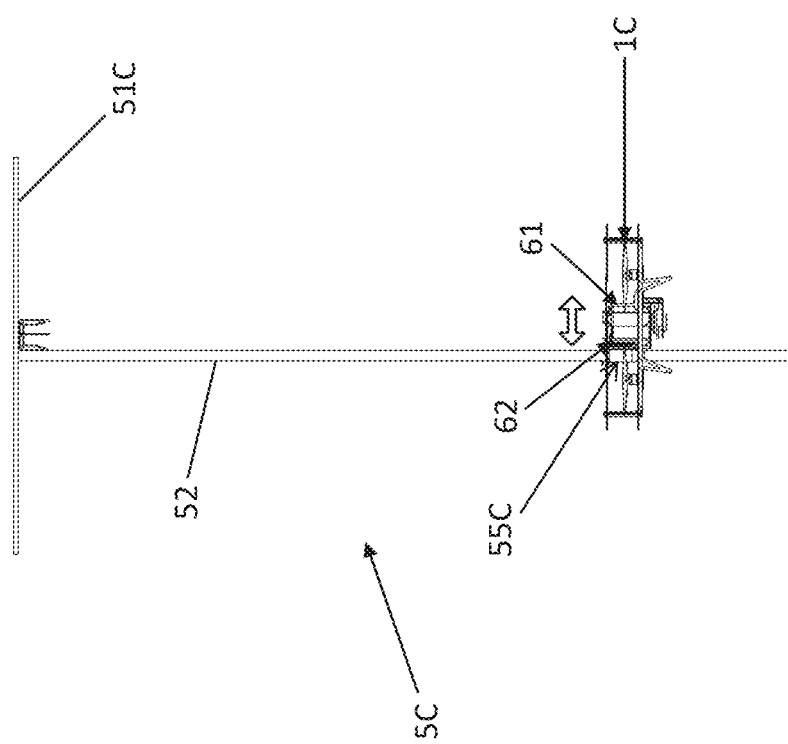
FIG. 23D shows one example of the process for delivering a package (battery replacement) according to the variation.

As shown in FIG. 23D, in a third step, at least one of the multicopter 1C and the mooring device 5C delivers the battery between the movable portion 55C and the multicopter 1C, which have come close to each other. In this variation, the battery 62 held by the holding member 555 of the mooring device 5C is housed in the front housing space on the turntable 174 of the multicopter 1C in the above-described second step, and the battery 61 used to drive the multicopter 1C is housed in the rear housing space on the turntable 174. Therefore, the multicopter 1C drives the turntable servomotor 177 to rotate the turntable 174 by 180 degrees and interchange positions of the pair of housing spaces. As a result, similarly to the above-described variation <3.7>, the battery 61 held by the multicopter 1C can be replaced with the battery 62 held by the mooring device 5C. Note that the state of the electronic circuit of the multicopter 1C during the replacement will be described later.

In a fourth step, after the batteries (61, 62) have been delivered, the mooring device 5C separates the movable portion 55C from the multicopter 1C as shown in FIG. 23E.

In a fifth step, the multicopter 1C separates from the linear member 52 of the mooring device 5C. The fourth step and the fifth step according to this variation can be executed similarly to those in the above-described variation <3.8>.

When the battery 62 is received through rotation of the turntable 174, the housing space in which the received battery 62 is housed is arranged on the rear side. Therefore, the multicopter 1C may drive the pressing servomotor 178 to press the battery 62 from above using the pressing member 179. Thus, connection between the battery 62 and the second battery support portion 243 can be ensured.

Through the above, operations for delivering the batteries (61, 62) according to this operation example are complete. Thereafter, the multicopter 1C may continuously execute operations for collecting another package, for example. Also, the used battery 61 delivered to the mooring device 5C may be appropriately collected using a robot or by a person, for example. Similarly to the above-described variation <3.7>, according to this variation, the battery of the multicopter 1C can be replaced using the mooring device 5C. Therefore, the battery can be safely replaced and the duration of a flight of the multicopter 1C can be extended.

Figure 24A:
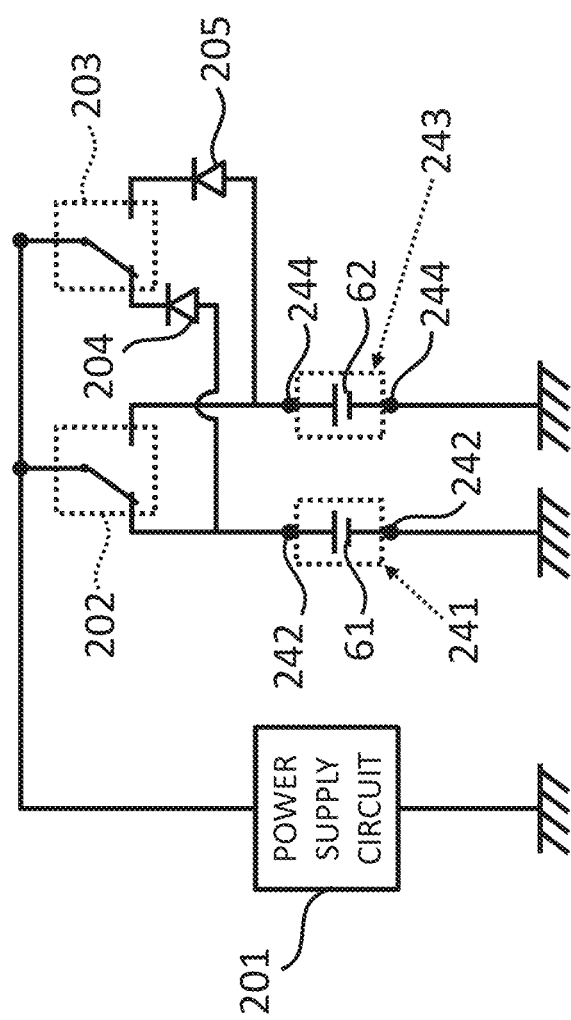
FIG. 24A schematically shows one example of a state of the electronic circuit of the multicopter in the process for battery replacement according to the variation.
Figure 24B:
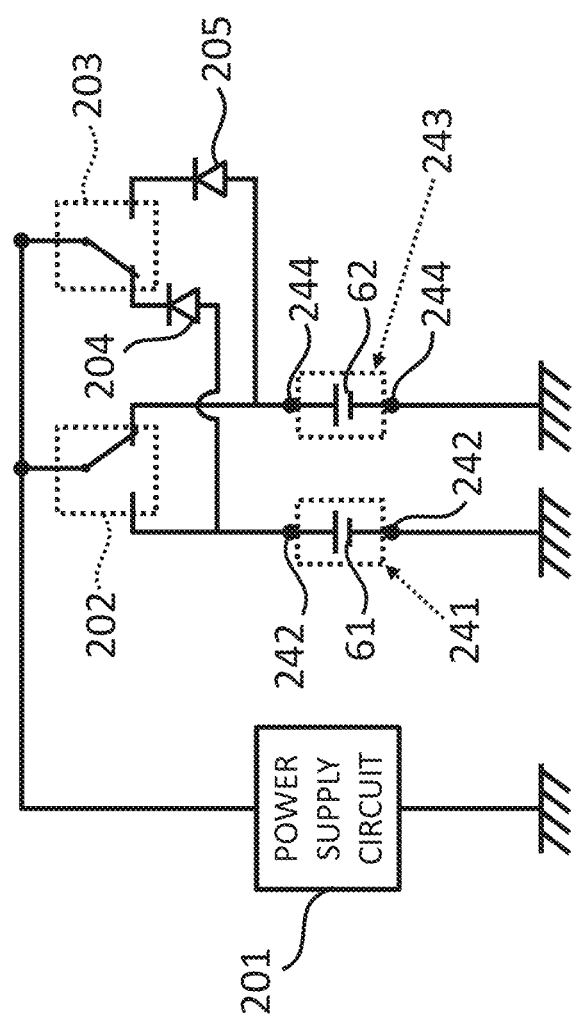
FIG. 24B schematically shows one example of a state of the electronic circuit of the multicopter in the process for battery replacement according to the variation.
Figure 24C:
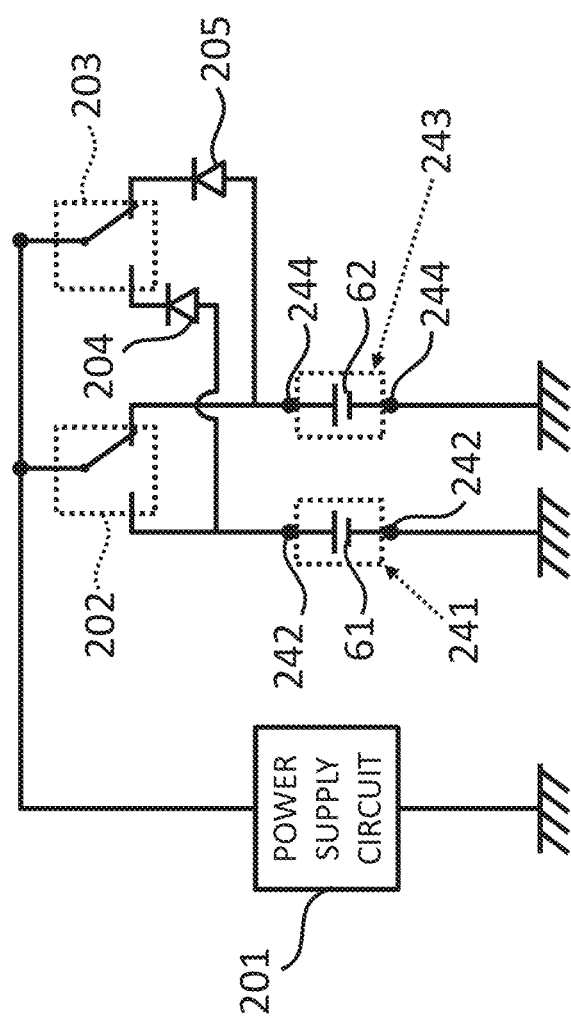
FIG. 24C schematically shows one example of a state of the electronic circuit of the multicopter in the process for battery replacement according to the variation.

Next, the state of the electronic circuit when the battery 61 held by the multicopter 1C is replaced with the battery 62 held by the mooring device 5C will be described using FIGS. 24A to 24C. FIGS. 24A to 24C schematically show examples of the state of the electronic circuit of the multicopter 1C during the process for battery replacement. First, in a stage in which the movable portion 55C has arrived at the position of the multicopter 1C and the battery 62 has been attached to the second battery support portion 243 but the battery 61 is not replaced with the battery 62, the relay switches (202, 203) are cut off from the wiring of the second battery support portion 243 and are connected to the wiring of the first battery support portion 241 as shown in FIG. 24A. Therefore, in this stage, electricity is supplied from the battery 61 to the power supply circuit 201.

Subsequently, when battery replacement is performed in the above-described third step, the multicopter 1C switches the first relay switch 202 from the state of being connected to the wiring of the first battery support portion 241 to a state of being connected to the wiring of the second battery support portion 243 as shown in FIG. 24B. As a result, electricity is supplied from the battery 62 via the first relay switch 202 to the power supply circuit 201.

At this time, the battery 61 that has been mounted and the battery 62 supplied from the mooring device 5C are connected to each other via the relay switches (202, 203). Since the mounted battery 61 has been consumed, the voltage of the battery 61 is normally lower than the voltage of the battery 62 that is just supplied. Therefore, if the supplied battery 62 and the mounted battery 61 are directly connected to each other, a current flows from the supplied battery 62 to the mounted battery 61 and a short circuit occurs in the electronic circuit.

In contrast, in this variation, the diode 204 is arranged such that the direction from the first battery support portion 241 toward the power supply circuit 201 is the forward direction. That is, the direction from the second battery support portion 243 to which the supplied battery 62 is attached to the first battery support portion 241 to which the mounted battery 61 is attached is the backward direction of the diode 204. Therefore, a current can be kept from flowing from the supplied battery 62 to the mounted battery 61 and the above-described short circuit can be prevented.

Note that while the first relay switch 202 is being switched as described above, there is a period during which the first relay switch 202 is not connected to the wirings of the first battery support portion 241 and the second battery support portion 243. During this period, electricity is supplied from the battery 61 via the diode 204 and the second relay switch 203 to the power supply circuit 201.

Then, after supply of electricity from the battery 62 is started, the multicopter 1C switches the second relay switch 203 from the state of being connected to the wiring of the first battery support portion 241 to a state of being connected to the wiring of the second battery support portion 243 as shown in FIG. 24C. As a result, the mounted battery 61 is completely cut off from the power supply circuit 201 and can be detached from the multicopter 1C. After entering this state, the mooring device 5C drives the movable portion 55C in the fourth step to collect the used battery 61. Thus, in the above-described process, the multicopter 1C can replace the battery without interrupting supply of electricity.

Note that configurations of the multicopter 1C and the mooring device 5C need not be limited to the above-described examples, and may be appropriately changed according to the embodiment. For example, three or more housing spaces may also be formed on the turntable 174 of the multicopter 1C. Also, the movable portion 55C of the mooring device 5C may also be configured to hold a plurality of batteries.

<3.10>

In the above-described embodiment and variations, each mooring device (5, 5A, 5B, 5C) includes a movable portion (53, 55, 53B, 55C) and a package is delivered between the movable portion (53, 55, 53B, 55C) and the multicopter (1, 1A, 1B, 1C). However, the movable portion (53, 55, 53B, 55C) may also be omitted. In this case, the multicopter (1, 1A, 1B, 1C) may also land on a predetermined position by moving along the linear member 52. In a case in which the movable portion (53, 55, 53B, 55C) is omitted, the multicopter (1, 1A, 1B, 1C) and the mooring device (5, 5A, 5B, 5C) may also be changed as described below.

Figure 25A:
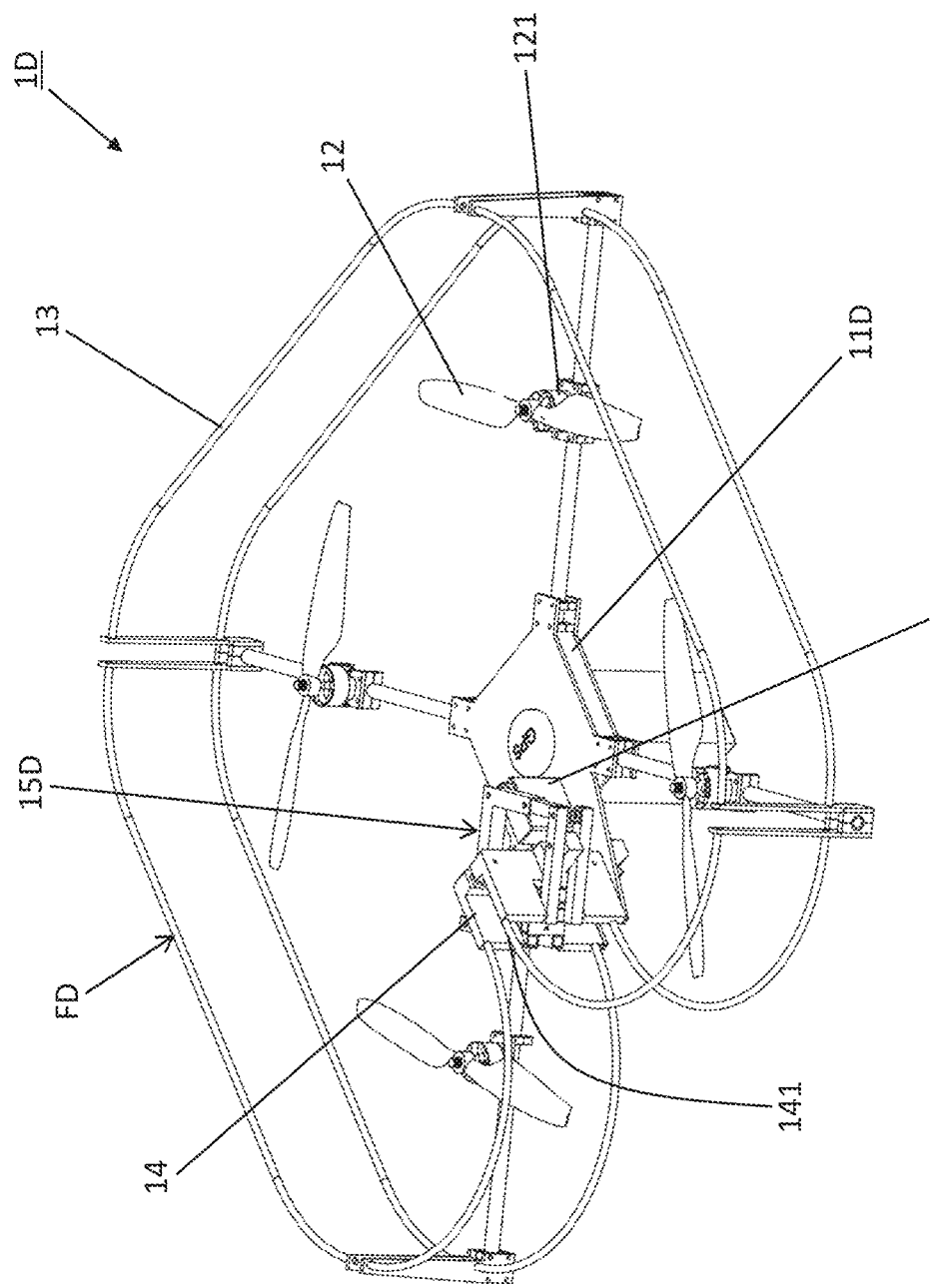
FIG. 25A is a perspective view showing one example of a multicopter according to a variation.
Figure 25B:
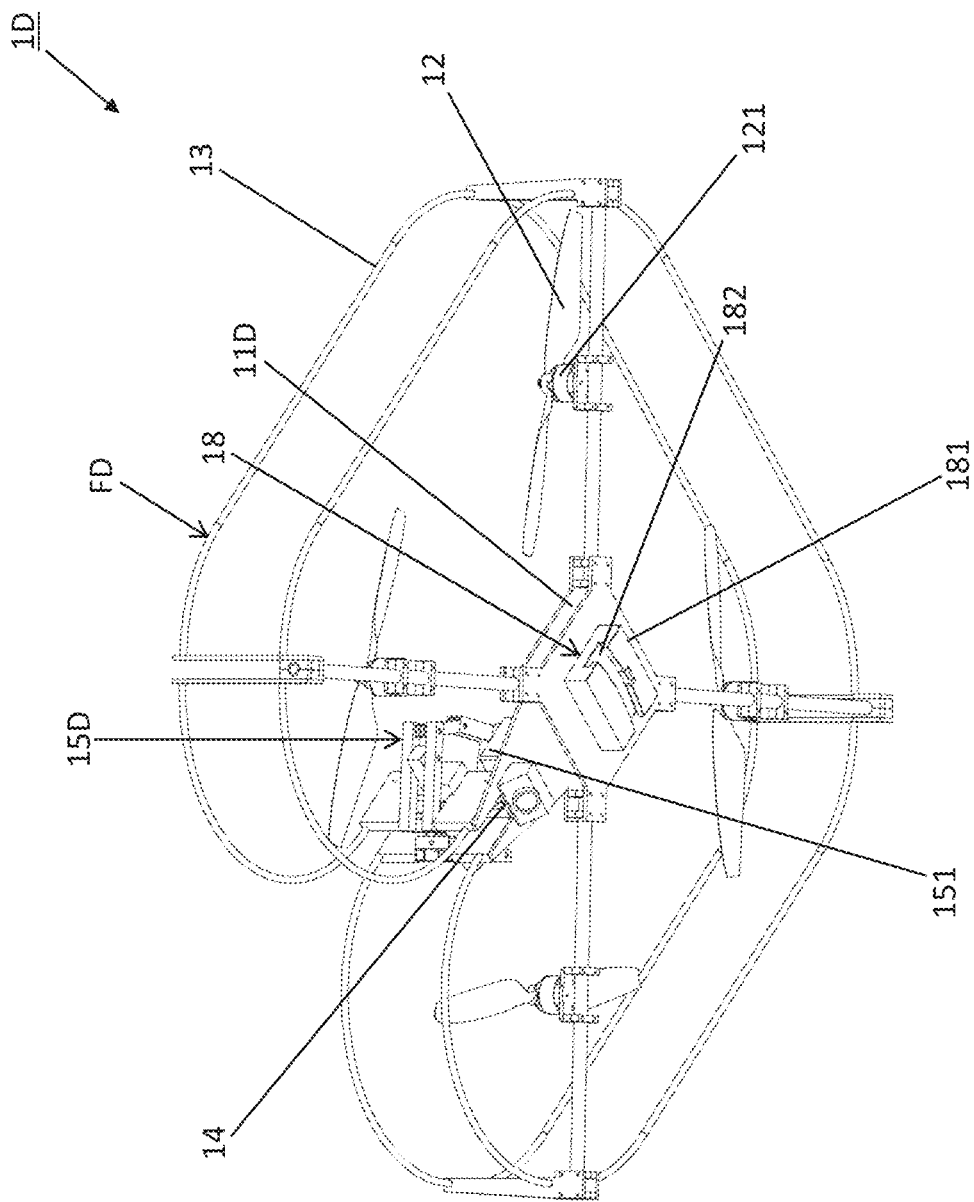
FIG. 25B is a rear perspective view showing one example of the multicopter according to the variation.
Figure 25C:
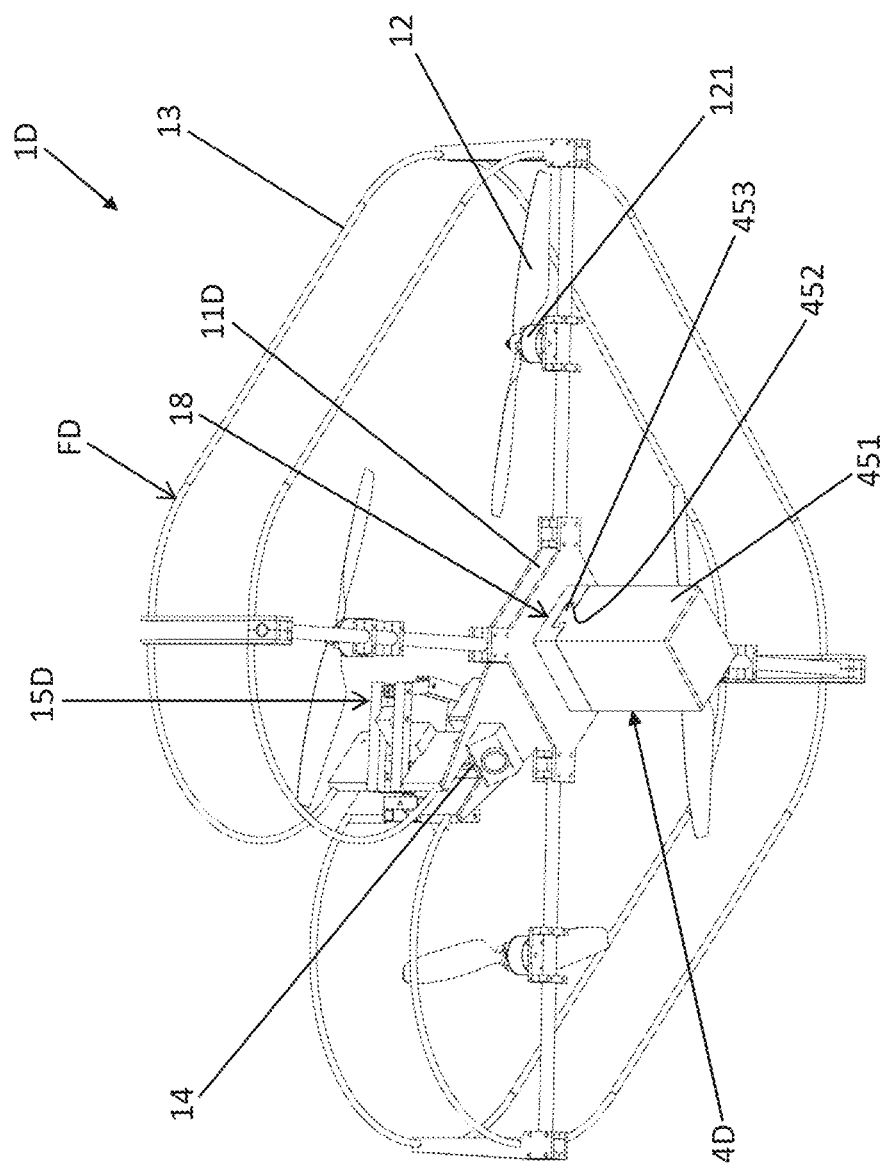
FIG. 25C shows one example of a state in which the multicopter according to the variation holds a package.

Multicopter First, a multicopter 1D according to this variation will be described using FIGS. 25A to 25C. FIGS. 25A and 25B are a perspective view and a rear perspective view showing one example of the multicopter 1D according to this variation. FIG. 25C shows one example of a state in which the multicopter 1D according to this variation holds a package 4D.

An airframe FD of the multicopter 1D according to this variation includes a main body portion 11D that is constituted by a pair of frame members that extend so as to intersect with each other at the center and a flat plate-shaped base that is arranged at the center. A package holding portion 18 for holding the package 4D is provided on a lower surface of a center portion of the main body portion 11D. The package holding portion 18 includes a flat plate-shaped holding member 181 that is arranged on the lower surface of the center portion of the main body portion 11D. The holding member 181 is configured similarly to the holding member 172 of the above-described battery holding portion 17 and the holding member 555 of the movable portion 55C. That is, an arcuately curved groove portion 182 extends through side surfaces of the holding member 181, and a lower side of the groove portion 182 is open with a width that is narrower than the width of the groove portion 182.

On the other hand, as shown in FIG. 25C, the package 4D according to this variation is configured similarly to the above-described batteries (61, 62). That is, the package 4D includes a casing portion 451 that has a substantially rectangular parallelepiped shape, and a protrusion 453 is coupled to an upper portion of the casing portion 451 via a neck portion 452. The protrusion 453 has an arcuately curved shape to conform to the shape of the groove portion 182 of the holding member 181. The neck portion 452 has a width that is narrower than the width of the opening on the lower side of the groove portion 182 so that the neck portion 452 can pass through the opening on the lower side of the groove portion 182.

With this configuration, the groove portion 182 of the package holding portion 18 receives the protrusion 453 of the package 4D from a side surface side and keeps the received protrusion 453 from falling downward. Thus, the package holding portion 18 can hold the package 4D by coupling the holding member 181 and the package 4D so as not to become separated in the up-down direction, in a state in which the protrusion 453 is received in the groove portion 182. This package 4D may be a battery.

Also, the multicopter 1D according to this variation includes an opening/closing portion 15D that is constituted by a plurality of links, instead of the above-described turn pieces 15. The opening/closing portion 15D includes a toggle mechanism and is configured such that a leading end portion of the opening/closing portion 15D can be opened or closed by driving an opening/closing servomotor 151. Owing to the toggle mechanism, even if a force acts on the leading end portion of the opening/closing portion 15D when the leading end portion is closed, the leading end portion will not open unless the opening/closing servomotor 151 is driven. Except for these points, the multicopter 1D may be configured similarly to the above-described multicopter 1. Also, the system configuration of the multicopter 1D may be similar to that of the above-described multicopter 1.

Mooring Device

Figure 26B:
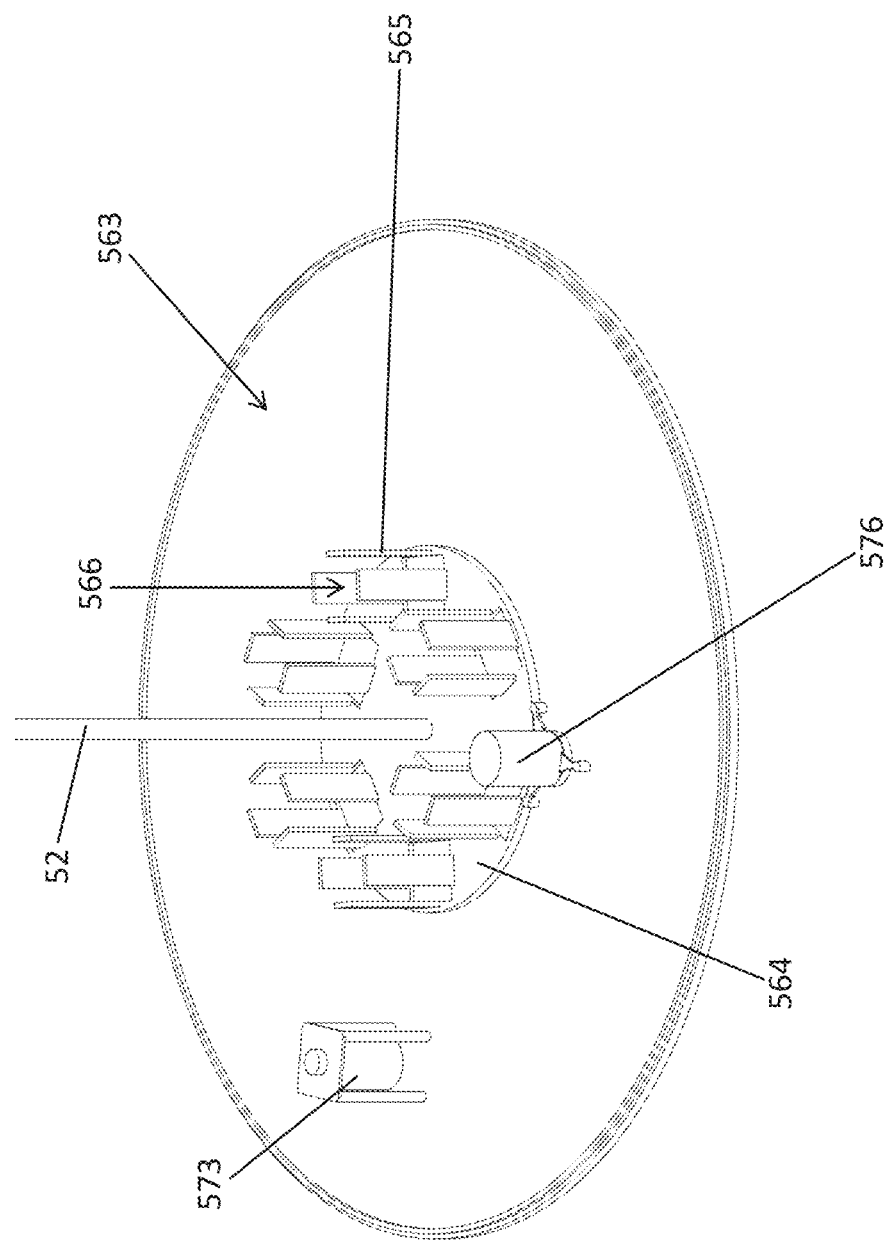
FIG. 26B is a perspective view showing one example of the inside of a base portion of the mooring device according to the variation.

Next, a mooring device 5D according to this variation will be described using FIGS. 26A and 26B. FIG. 26A is a perspective view showing one example of the mooring device 5D according to this variation. FIG. 26B is a perspective view showing one example of the inside of a base portion 56 of the mooring device 5D according to this variation. In the mooring device 5D according to this variation, the above-described movable portion (53, 55, 53B, 55C) is omitted. Specifically, the mooring device 5D includes the linear member 52 and the dome-shaped base portion 56 that supports the linear member 52.

The base portion 56 includes an interior space 563 that is formed to be able to house the package 4D, a circular turnable plate 561 that is arranged adjacent to the interior space 563 in the extension direction of the linear member 52 (upward in the drawings), and a rectangular reception opening 562 that is provided in the turnable plate 561 and through which the interior space 563 is in communication with the outside. The turnable plate 561 is configured to rotate around the extension direction of the linear member 52 as a result of a reception opening turning motor 573 being driven. Also, the reception opening 562 has a size that is large enough for the package 4D to pass therethrough.

Note that the number of packages 4D that can be housed in the interior space 563 may be appropriately determined according to the embodiment. The number of packages 4D that can be housed in the interior space 563 may be one, or two or more. In this variation, the interior space 563 has an internal configuration described below to be able to house a plurality of packages 4D. The mechanism for driving the turnable plate 561 need not be limited to the example shown in the drawings, and may be appropriately determined according to the embodiment. Furthermore, shapes of the turnable plate 561 and the reception opening 562 need not be limited to the examples shown in the drawings, and may be appropriately determined according to the embodiment. The reception opening 562 may be appropriately formed such that the package 4D can pass through the reception opening 562.

The configuration for housing the package 4D in the interior space 563 may be appropriately determined according to the embodiment. In this variation, the base portion 56 further includes a circular turntable 564 that is housed in the interior space 563 and is configured to rotate coaxially with the turnable plate 561 and a plurality of package holding portions 566 that are arranged on a surface of the turntable 564 facing the turnable plate 561 so as to divide the surface in the direction of rotation and are each configured to hold the package 4D.

In this variation, the turntable 564 is configured to rotate around the extension direction of the linear member 52 similarly to the turnable plate 561 as a result of a replacement motor 576 being driven. Each package holding portion 566 is constituted by four flat side plates 565. Specifically, each package holding portion 566 is constituted by the four flat side plates 565 that are arranged on four sides, and is configured to hold the package 4D by surrounding the package 4D in the horizontal direction with the four side plates 565. Each package holding portion 566 is appropriately positioned to be able to be arranged directly under the reception opening 562. In the example shown in FIG. 26B, six package holding portions 566 are provided on the turntable 564. However, the shape of the turntable 564, the mechanism for driving the turntable 564, the configuration of the package holding portions 566, and the number of package holding portions 566 need not be limited to the examples shown in FIG. 26B, and may be appropriately determined according to the embodiment. Except for these points, the mooring device 5D according to this variation may be configured similarly to the above-described mooring device 5.

Figure 27:
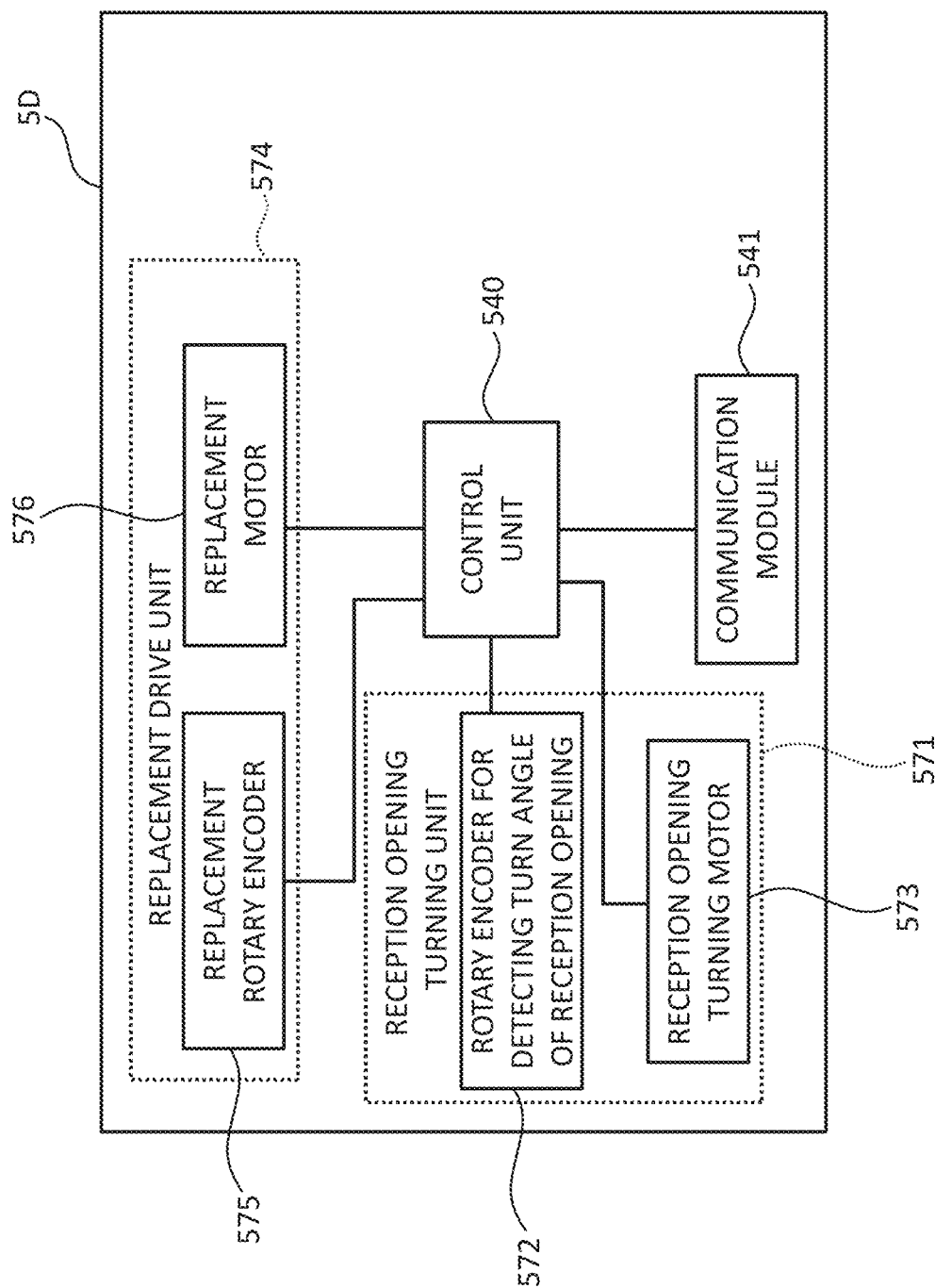
FIG. 27 schematically shows one example of a system configuration of the mooring device according to the variation.

Next, a system configuration of the mooring device 5D according to this variation will be described using FIG. 27. FIG. 27 schematically shows one example of the system configuration of the mooring device 5D according to this variation. As shown in FIG. 27, the mooring device 5D according to this variation includes the control unit 540 and the communication module 541 similarly to the above-described mooring device 5. On the other hand, unlike the above-described mooring device 5, the control unit 540 in this variation is connected to a reception opening turning unit 571 for changing the position of the reception opening 562 by rotating the turnable plate 561 and a replacement drive unit 574 for changing the package holding portion 566 arranged directly under the reception opening 562 by rotating the turntable 564.

The reception opening turning unit 571 is constituted by a rotary encoder 572 for detecting a turn angle of the reception opening and the reception opening turning motor 573. A known rotary encoder may be used as the rotary encoder 572 for detecting a turn angle of the reception opening. The rotary encoder 572 for detecting a turn angle of the reception opening is used to monitor a driving amount of the reception opening turning motor 573. The control unit 540 may drive the reception opening turning motor 573 while referring to a result of detection performed by the rotary encoder 572 for detecting a turn angle of the reception opening, in response to an instruction given from the control device 3 to change the position of the reception opening 562. Thus, the control unit 540 can move the reception opening 562 to a desired position by rotating the turnable plate 561.

The replacement drive unit 574 is constituted by a replacement rotary encoder 575 and the replacement motor 576. A known rotary encoder may be used as the replacement rotary encoder 575. The replacement rotary encoder 575 is used to monitor a driving amount of the replacement motor 576. The control unit 540 may drive the replacement motor 576 while referring to a result of detection performed by the replacement rotary encoder 575, in response to an instruction given from the control device 3 to change the package holding portion 566 arranged directly under the reception opening 562. Thus, the control unit 540 can arrange a desired package holding portion 566 directly under the reception opening 562 by rotating the turntable 564.

Next, a process for delivering a package between the multicopter 1D and the mooring device 5D according to this variation will be described using FIGS. 28A to 28G. FIGS. 28A to 28G show one example of the process for delivering the package 4D. The following procedure for delivering a package is one example of the "method for delivering a package" according to the present invention. However, the following procedure is merely one example, and steps may be changed where possible. Also, steps of the following procedure can be appropriately omitted, replaced, or added according to the embodiment. Furthermore, the following describes a situation in which the package 4D is delivered from the multicopter 1D to the mooring device 5D and a package 4DA that has the same configuration as the package 4D is delivered from the mooring device 5D to the multicopter 1D. However, packages do not necessarily have to be delivered as in this example, and the delivery of either one of the packages may be omitted. Note that similarly to the above-described embodiment, the multicopter 1D and the mooring device 5D may execute operations in the following steps as a result of being controlled by the control device 3.

As shown in FIGS. 28A and 28, in a first step, the multicopter 1D approaches the linear member 52 of the mooring device 5D and receives the linear member 52 in the reception portion 14 in a direction intersecting with the extension direction of the linear member 52. The first step according to this variation can be executed similarly to that in the above-described embodiment. After receiving the linear member 52 in the reception portion 14, the multicopter 1D can drive the opening/closing servomotor 151 to close the leading end portion of the opening/closing portion 15D and confine the linear member 52 with the opening/closing portion 15D and the reception portion 14. Thus, similarly to the above-described embodiment, the flight direction of the multicopter 1D can be restricted to the extension direction of the linear member 52.

Figure 28C:
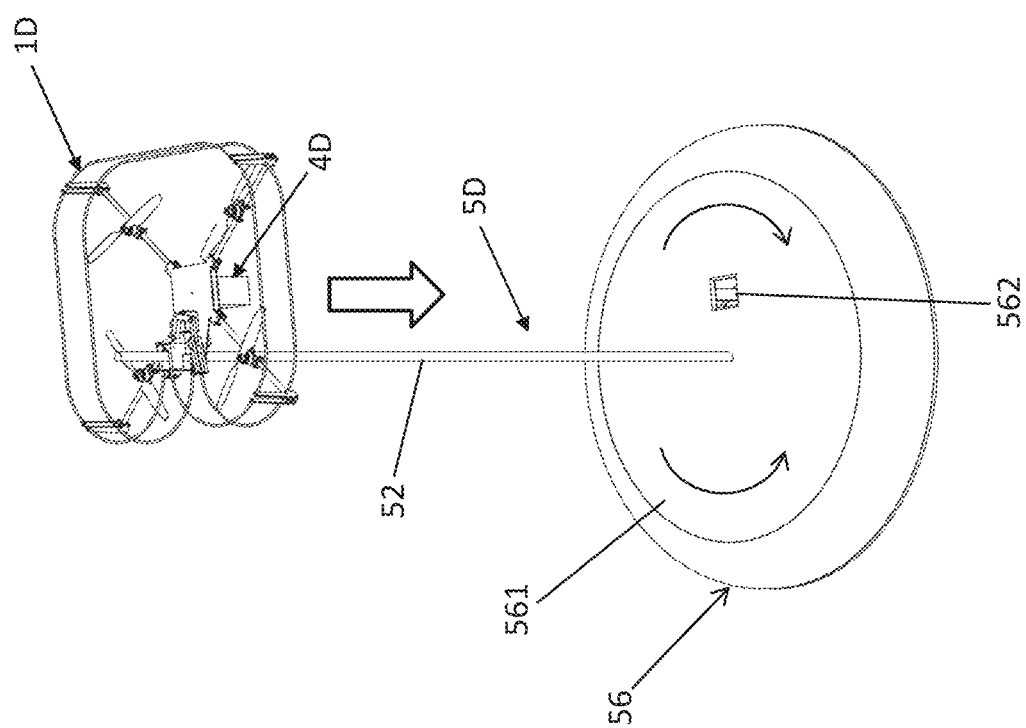
FIG. 28C shows one example of the process for delivering a package (package replacement) according to the variation.

As shown in FIG. 28C, in a second step, the mooring device 5D rotates the turnable plate 561 to position the reception opening 562 with respect to the multicopter 1D. Specifically, the mooring device 5D drives the reception opening turning motor 573 while referring to a result of detection performed by the rotary encoder 572 for detecting a turn angle of the reception opening, to rotate the turnable plate 561 and move the reception opening 562 to a desired position.

For example, the mooring device 5D receives data via the communication module 541 from a sensor (not shown), such as a geomagnetic sensor or a gyroscope sensor, that is mounted in the multicopter 1D. The mooring device 5D identifies the position of the multicopter 1D based on the thus obtained data, and moves the reception opening 562 to a position directly under the package holding portion 18 (the package 4D) of the multicopter 1D based on the identified position of the multicopter 1D. In this operation example, the package 4D is held by the package holding portion 18. Therefore, the mooring device 5D drives the replacement motor 576 while referring to a result of detection performed by the replacement rotary encoder 575 to rotate the turntable 564 and move an empty package holding portion 566 that is not holding a package to a position directly under the reception opening 562. If the package 4D is not held by the package holding portion 18, this operation for rotating the turntable 564 may be omitted.

In a third step, the multicopter 1D moves along the linear member 52 to approach the base portion 56. In this variation, the base portion 56 is set on the ground, and therefore the multicopter 1D moves downward along the linear member 52. As a result, as shown in FIG. 28D, the multicopter 1D can land on the base portion 56 with the package 4D held by the package holding portion 18 entering the interior space 563 via the reception opening 562. Note that the second step and the third step may also be carried out at the same time, either one of the steps may also be carried out before the other, or both steps may also be partially carried out in parallel.

Figure 28E:
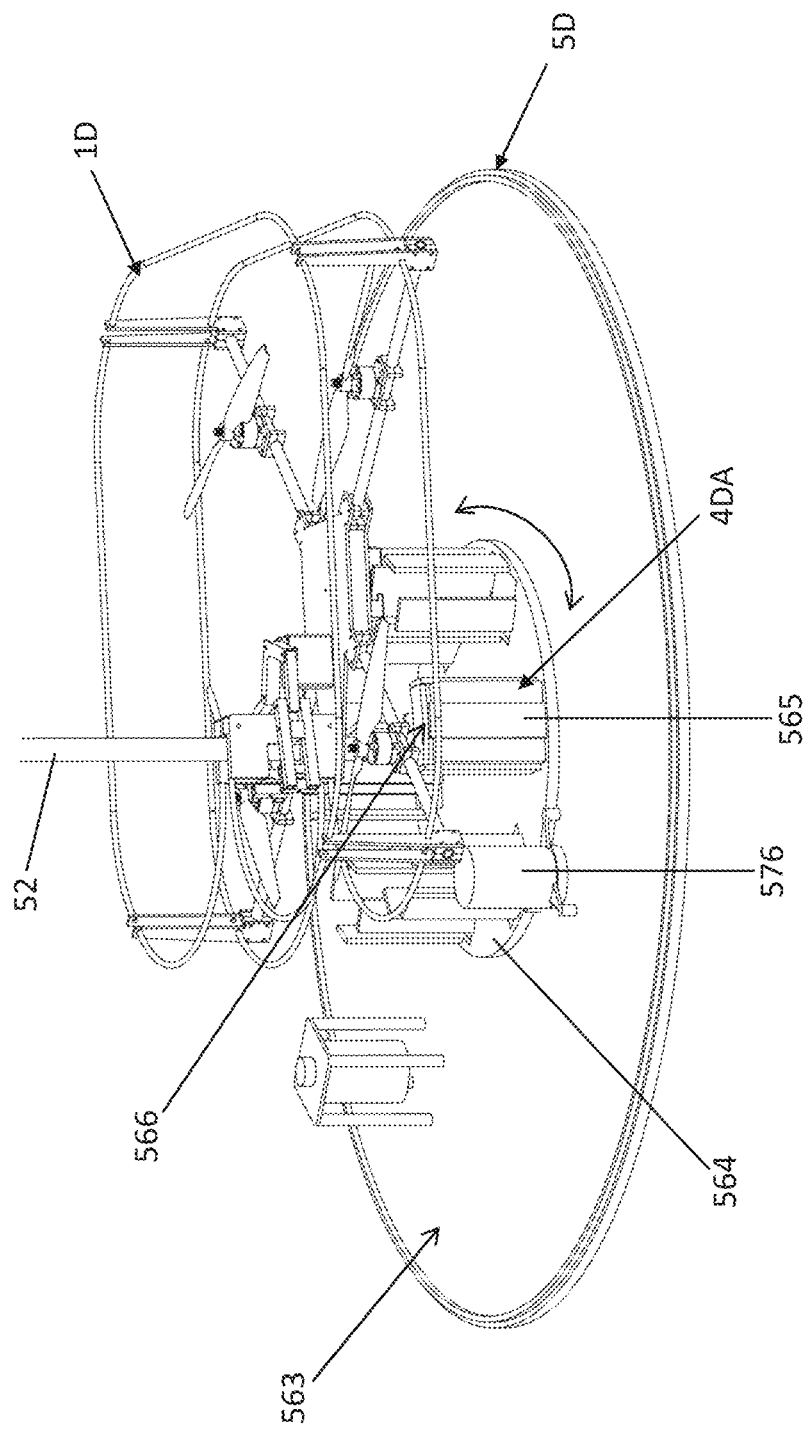
FIG. 28E shows one example of the process for delivering a package (package replacement) according to the variation.

In a fourth step, at least one of the multicopter 1D and the mooring device 5D delivers the package between the interior space 563 of the base portion 56 and the multicopter 1D via the reception opening 562. In this variation, when the multicopter 1D lands on the base portion 56, the package 4D held by the package holding portion 18 is housed in the package holding portion 566 arranged directly under the reception opening 562. The holding member 181 of the package holding portion 18 is configured similarly to the holding member 172 of the above-described battery holding portion 17 and the holding member 555 of the movable portion 55C, and the package 4D is configured similarly to the above-described batteries (61, 62). Therefore, similarly to the above-described <3.7> and <3.9>, the package 4D can be released from the package holding portion 18 as a result of the mooring device 5D driving the replacement motor 576 to rotate the turntable 564 and change positions of the package holding portions 566 as shown in FIG. 28E. Also, the package 4DA that is held in another package holding portion 566 and has the same configuration as the package 4D can be held by the package holding portion 18. Thus, the packages (4D, 4DA) can be delivered between the multicopter 1D and the mooring device 5D.

In a fifth step, after the packages (4D, 4DA) have been delivered, the multicopter 1D moves along the linear member 52 to separate from the base portion 56 as shown in FIG. 28F. Also, the multicopter 1D drives the opening/closing servomotor 151 to open the leading end portion of the opening/closing portion 15D so that the linear member 52 can be released from the opening 141. Then, in a sixth step, the multicopter 1D separates from the linear member 52 of the mooring device 5D as shown in FIG. 28G.

Thus, operations for delivering the packages according to this operation example end. Thereafter, the multicopter 1D may also continuously execute operations for delivering the package 4DA to another place, for example. The package 4D delivered to the mooring device 5D may be appropriately collected using a robot or by a person, for example. According to this variation, the multicopter 1D can safely land on the base portion 56 along the linear member 52 and deliver the package 4D mounted on the multicopter 1D to the interior space 563 of the base portion 56. Furthermore, the multicopter 1D can collect the package 4DA housed in the base portion 56 and transport the collected package 4DA to another place. Therefore, it is possible to build a logistics system by disposing mooring devices 5D at various places and using the mooring devices 5D as bases. Note that configurations of the multicopter 1D and the mooring device 5D need not be limited to the above-described examples, and may be appropriately changed according to the embodiment.

<3.11>

In the above-described embodiment and variations, a package is delivered between the multicopter (1, 1A, 1B, 1C, 1D) and the mooring device (5, 5A, 5B, 5C, 5D). However, in a case in which the mooring device (5, 5A, 5B, 5C, 5D) is not used, a package may also be delivered between the multicopter (1, 1A, 1B, 1C, 1D) and another multicopter (hereinafter also referred to as a "second multicopter"). In this case, the multicopter (1, 1A, 1B, 1C, 1D) may also be referred to as a "first multicopter" to distinguish the multicopter from the other multicopter.

Second Multicopter

Figure 29A:
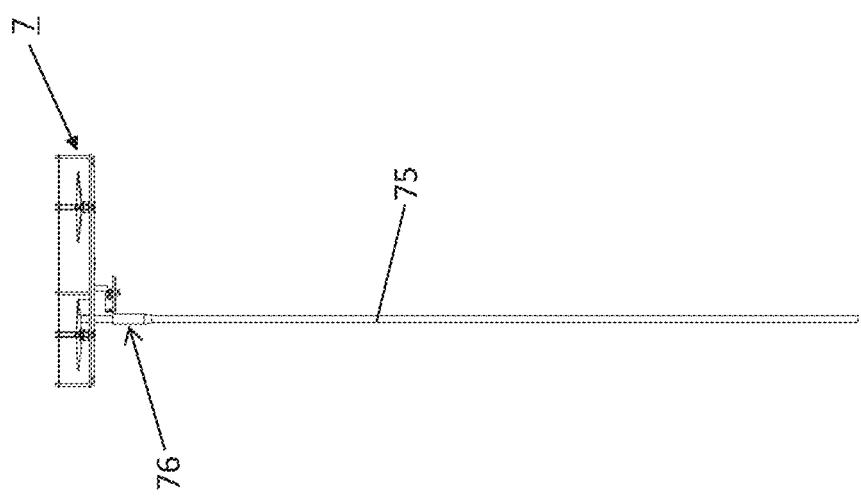
FIG. 29A is a side view showing one example of a second multicopter according to a variation.
Figure 29B:
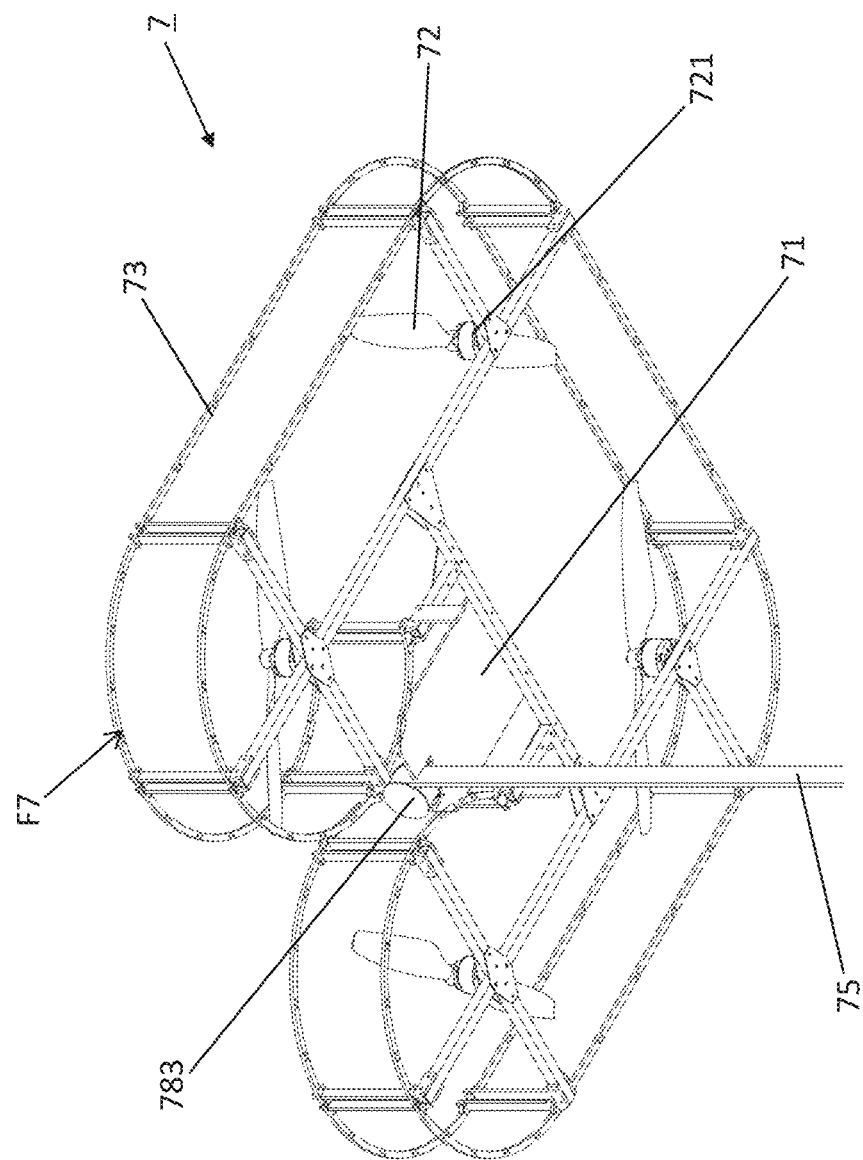
FIG. 29B is a rear perspective view showing one example of the second multicopter according to the variation.

A second multicopter 7 according to this variation will be described using FIGS. 29A to 29C. FIGS. 29A and 29B are a side view and a rear perspective view showing one example of the second multicopter 7 according to this variation. FIG. 29C is a side view showing one example of a movable portion 76 of the second multicopter 7 according to this variation.

An airframe F7 of the second multicopter 7 according to this variation includes a rectangular main body portion 71 that is formed from frame members and a base member and four propellers 72 that are respectively arranged at four corners of the main body portion 71. Similarly to the above-described multicopter 1, each propeller 72 is driven by a rotor 721, and the second multicopter 7 is configured to fly as a result of the propellers 72 being driven by the rotors 721. The propellers 72 are protected by a pair of propeller guards 73 that are arranged in the up-down direction.

A linear member drive unit 783 for letting out and rewinding a linear member 75 is mounted in the main body portion 71. The linear member 75 and the extension direction of the linear member 75 may be similar to the linear member 52 of the above-described mooring device 5 and the extension direction of the linear member 52. The second multicopter 7 also includes the movable portion 76 that is configured to move along the linear member 75. The movable portion 76 is configured to be mostly the same as the above-described movable portion 53B. That is, the movable portion 76 includes a tubular member 761 through which the linear member 75 passes, a support table 762 that is coupled to the tubular member 761, and a hook member 766 for locking a package. The support table 762 includes a support surface (lower surface in FIG. 29C) for supporting a package, a back surface that is located opposite to the support surface, and a through hole that extends from the back surface to the support surface. The hook member 766 is attached to a package lock servomotor 792 that is arranged on the back surface and is configured to take a first position at which the hook member 766 protrudes toward the support surface side via the through hole and is inserted into an opening of a package and a second position at which the hook member 766 does not protrude toward the support surface side and releases the package, as a result of being driven by the package lock servomotor 792.

Figure 30:
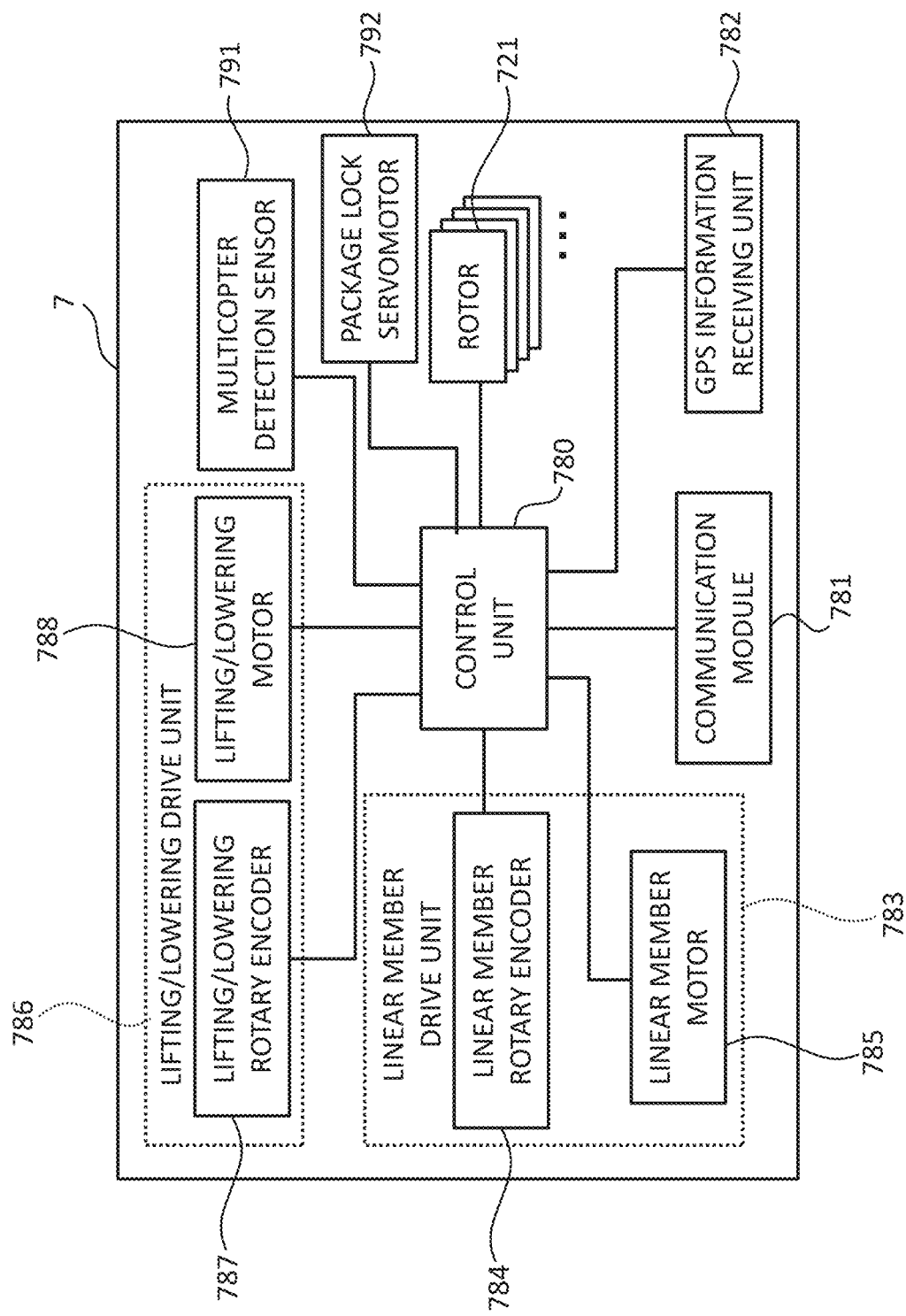
FIG. 30 schematically shows one example of a system configuration of the second multicopter according to the variation.

Next, a system configuration of the second multicopter 7 according to this variation will be described using FIG. 30. FIG. 30 schematically shows one example of the system configuration of the second multicopter 7 according to this variation. The second multicopter 7 according to this variation includes a control unit 780 and a communication module 781. The control unit 780 and the communication module 781 may be similar to the control unit 190 and the communication module 191 of the above-described multicopter 1.

In this variation, the control unit 780 is connected to a GPS information receiving unit 782. The GPS information receiving unit 782 may be similar to the GPS information receiving unit of the above-described multicopter 1. The control unit 780 transmits a result of measurement of position (position information) performed by the GPS information receiving unit 782 to the control device 3. The control device 3 creates navigation information regarding a flight to a desired position based on position information received from the second multicopter 7 and transmits the created navigation information to the second multicopter 7. The control unit 780 appropriately controls the rotors 721 of the propellers 72 based on the received navigation information. Thus, the second multicopter 7 is controlled to fly to the desired position.

Also, the control unit 780 is connected to a linear member drive unit 783, a lifting/lowering drive unit 786, a multicopter detection sensor 791, and the package lock servomotor 792. In this variation, the linear member drive unit 783 is constituted by a linear member rotary encoder 784 and a linear member motor 785. A known rotary encoder may be used as the linear member rotary encoder 784. The linear member rotary encoder 784 is used to monitor a driving amount of the linear member motor 785. The control unit 780 may drive the linear member motor 785 while referring to a result of detection performed by the linear member rotary encoder 784, in response to an instruction given from the control device 3 to rewind or let out the linear member 75. Thus, the control unit 780 can adjust the linear member 52 let out from the main body portion 71 to a desired length.

The lifting/lowering drive unit 786 is constituted by a lifting/lowering rotary encoder 787 and a lifting/lowering motor 788 and is similar to the lifting/lowering drive unit 542 of the above-described mooring device 5. The control unit 780 may drive the lifting/lowering motor 788 while referring to a result of detection performed by the lifting/lowering rotary encoder 787, in response to an instruction given from the control device 3 to lift or lower the movable portion 76. Thus, the control unit 780 can move the movable portion 76 to a desired position (height) of the linear member 75.

The multicopter detection sensor 791 and the package lock servomotor 792 are similar to the multicopter detection sensor 546 and the package lock servomotor 547 of the above-described mooring device 5. The control unit 780 can determine whether or not the support surface of the support table 762 has approached (or is in contact with) a multicopter based on a result of detection performed by the multicopter detection sensor 791. Upon determining that the support surface of the support table 762 has approached a multicopter, the control unit 780 can drive the package lock servomotor 792 to move the hook member 766 to the first position and lock a package held by the multicopter on the support table 762 by using the hook member 766.

Operation Example

Next, a process for delivering the package 4B between the second multicopter 7 according to this variation and the multicopter 1B according to the above-described variation will be described using FIGS. 31A to 31E. FIGS. 31A to 31E show one example of the process for delivering the package 4B between the multicopter 1B and the second multicopter 7. However, the following procedure is merely one example, and steps may be changed where possible. Also, steps of the following procedure can be appropriately omitted, replaced, or added according to the embodiment. The following describes a process for delivering the package 4B between the multicopter 1B and the second multicopter 7, but the multicopter with which the second multicopter 7 delivers a package need not be limited to the multicopter 1B. Furthermore, the following describes a situation in which the package 4B is delivered from the second multicopter 7 to the multicopter 1B, but the package 4B does not necessarily have to be delivered as in this example, and may also be delivered from the multicopter 1B to the second multicopter 7, or packages 4B may also be delivered in both directions where possible. Note that similarly to the above-described embodiment, the multicopter 1B and the second multicopter 7 may execute operations in the following steps as a result of being controlled by the control device 3.

Figure 31A:
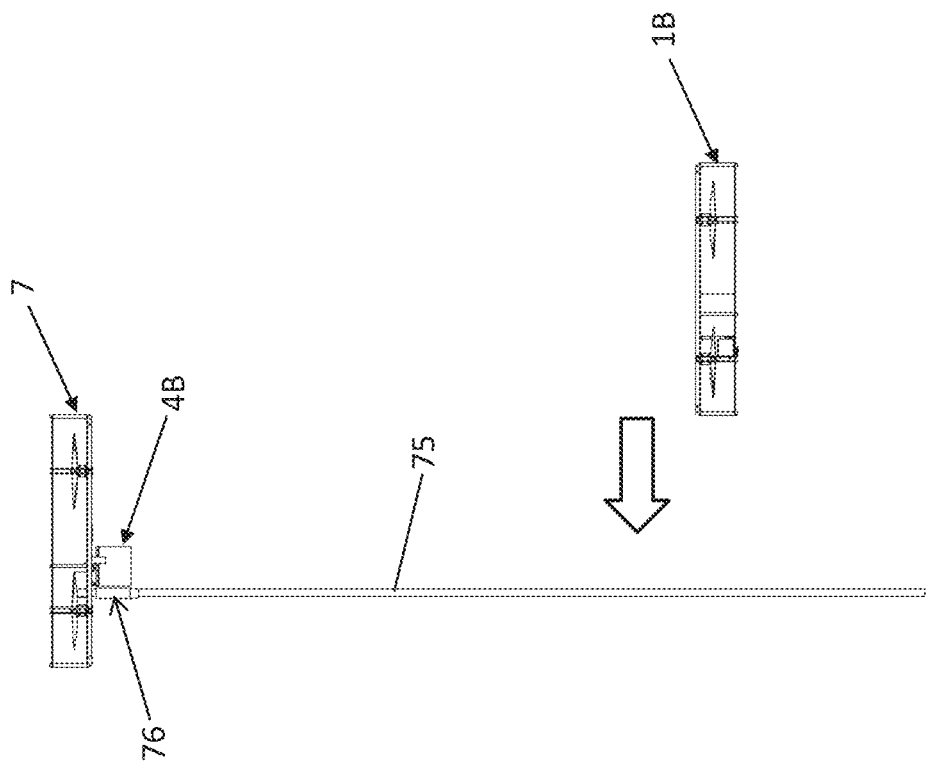
FIG. 31A shows one example of a process for delivering a package according to the variation.

As shown in FIGS. 31A and 31B, in a first step, the second multicopter 7 lets out the linear member 75 to make a path for delivering the package 4B between the second multicopter 7 and the multicopter 1B. In this variation, the second multicopter 7 flies above the multicopter 1B. As shown in FIG. 31A, the second multicopter 7 lets out the linear member 75 by driving the linear member drive unit 783 so that the linear member 75 hangs down from the airframe F7. Next, as shown in FIG. 31B, the multicopter 1B approaches the linear member 75 and receives the linear member 75 in the reception portion 14 in a direction intersecting with the extension direction of the linear member 75. This operation of the multicopter 1B can be executed similarly to the first step of the above-described <3.8>. Thus, the multicopter 1B and the second multicopter 7 are coupled to each other in the up-down direction via the linear member 75, and a path for delivering a package is made between the multicopter 1B and the second multicopter 7.

Figure 31C:
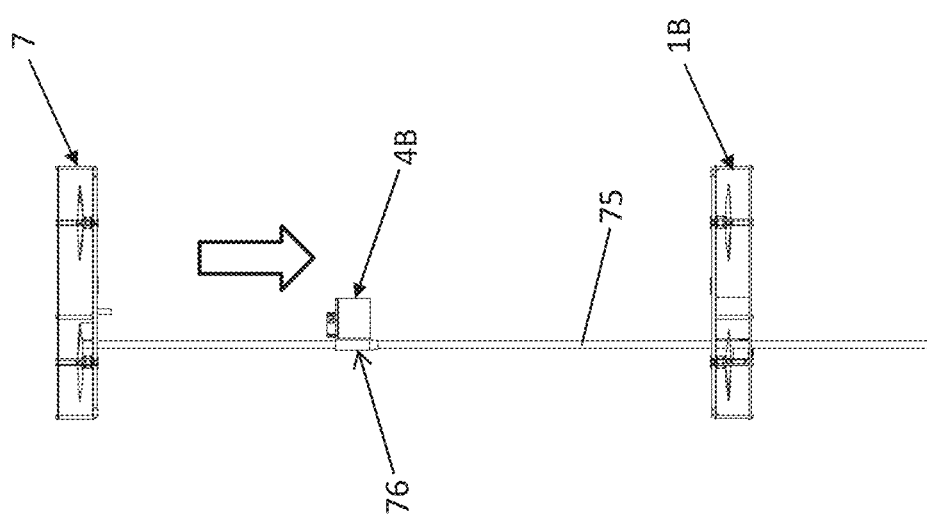
FIG. 31C shows one example of the process for delivering a package according to the variation.

As shown in FIG. 31C, in a second step, the second multicopter 7 moves the movable portion 76 close to the multicopter 1B. The second step according to this variation can be executed similarly to the second step of the above-described <3.8>. The second multicopter 7 lowers the movable portion 76 that is located in the vicinity of the main body portion 71 and holds the package 4B to the position of the multicopter 1B by driving the lifting/lowering motor 788 while referring to a result of detection performed by the lifting/lowering rotary encoder 787. Upon recognizing that the support table 762 of the movable portion 76 has approached (or is in contact with) the package holding portion 16B of the multicopter 1B based on a result of detection performed by the multicopter detection sensor 791, the second multicopter 7 stops driving the lifting/lowering motor 788 to stop lowering the movable portion 76.

As shown in FIG. 31D, in a third step, at least one of the multicopter 1B and the second multicopter 7 delivers the package 4B between the movable portion 76 and the multicopter 1B, which have come close to each other. In this operation example, based on a result of detection performed by the multicopter detection sensor 791, the second multicopter 7 recognizes that the support table 762 of the movable portion 76 has approached (or is in contact with) the package holding portion 16B of the multicopter 1B and the package 4B has been housed in the housing space 161B. Then, based on this recognition, the second multicopter 7 drives the package lock servomotor 792 to move the hook member 766 to the second position. Thus, coupling between the hook member 766 of the movable portion 76 and the package 4B can be canceled, and the slide plate 44B of the package 4B can be moved to the second position to insert the protrusions 441B of the slide plate 44B in the recesses 163B of the package holding portion 16B and fix the package 4B to the package holding portion 16B.

As described above, in this operation example, the package 4B is delivered from the movable portion 76 of the second multicopter 7 to the package holding portion 16B of the multicopter 1B by housing the package 4B supported by the support table 762 of the movable portion 76 in the housing space 161B of the package holding portion 16B and driving the package lock servomotor 792 to release the package 4B from the hook member 766. Note that the movable portion 76 can receive a package 4B held in the package holding portion 16B of the multicopter 1B as a result of the above-described series of operations being executed in a reverse manner.

Figure 31E:
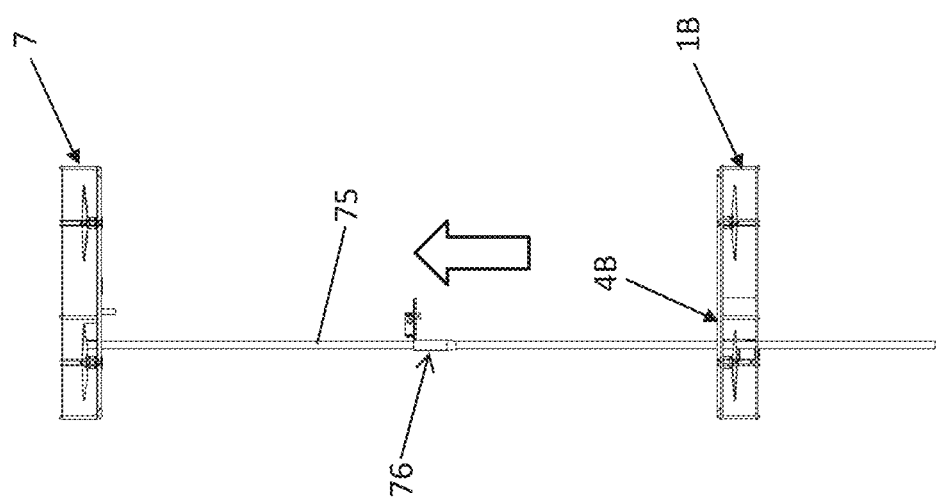
FIG. 31E shows one example of the process for delivering a package according to the variation.

In a fourth step, after the package 4B has been delivered, the second multicopter 7 separates the movable portion 76 from the multicopter 1B as shown in FIG. 31E. In this variation, the second multicopter 7 lifts the movable portion 76 toward the main body portion 71 by driving the lifting/lowering motor 788 while referring to a result of detection performed by the lifting/lowering rotary encoder 787. Also, similarly to the above-described embodiment, before executing the following fifth step, the multicopter 1B opens the opening 141 by driving the opening/closing servomotor 151 to turn the turn pieces 15 to the open position.

In a fifth step, the multicopter 1B separates from the linear member 75 of the second multicopter 7. Thus, operations for delivering the package 4B according to this operation example end. Thereafter, the multicopter 1B may also continuously execute operations for transporting the package 4B to another place, for example. On the other hand, the second multicopter 7 may also continuously execute operations for collecting another package, for example, after rewinding the linear member 75 by driving the linear member drive unit 783. According to this variation, a package can be delivered between two multicopters (in this variation, the multicopter 1B and the second multicopter 7). Note that the configuration of the second multicopter 7 need not be limited to the above-described example, and may be appropriately changed according to the embodiment.

<3.12>

The length of the linear member 52 according to the above-described embodiment and variations is preferably set to be longer than the length of utility poles from the standpoint of avoiding collision between the multicopter (1, 1A, 1B, 1C, 1D) and utility poles or electric cables. For example, in a region where utility poles commonly have a height of about 10 m, the length of the linear member 52 is preferably set to 10 m to 15 m. However, if the length of the linear member 52 is increased, it may be difficult to stably support the linear member 52 extending in the vertical direction with the base portion 51. Therefore, both ends of the linear member 52 in the vertical direction may also be fixed to stably support the linear member 52. It is also possible to adopt the following configuration.

FIG. 32 shows one example of a mooring device 5E according to this variation. In the mooring device 5E shown in FIG. 32, a support 59 that is thicker and more rigid than the linear member 52 is further attached to the base portion 51. The support 59 is parallel to the linear member 52 and extends in the vertical direction from the base portion 51. The support 59 and the linear member 52 are coupled to each other at one or more positions (two positions in the example shown in FIG. 32) by a coupler 591 that is made of metal or resin. With this configuration, the linear member 52 can be stably supported.

Note that when the above-described multicopter 1 passes through a portion in which the coupler 591 is provided, the multicopter 1 turns a turn piece 15 that is close to the coupler 591 out of the pair of turn pieces 15 arranged in the up-down direction to the open position and turns the other turn piece 15 to the closed position. Then, after the turn piece 15 turned to the open position has passed through the portion in which the coupler 591 is provided, the above-described multicopter 1 turns that turn piece 15 to the closed position and turns the other turn piece 15 to the open position so that the other turn piece 15 passes through the portion in which the coupler 591 is provided. Thus, the above-described multicopter 1 can pass through the portion in which the coupler 591 is provided, without releasing the linear member 52. In the case of the multicopter 1D including the opening/closing portion 15D, it is also possible to use a coupler 591 that is thinner than a gap in the leading end portion of the opening/closing portion 15D. With this configuration, the multicopter 1D can pass through the portion in which the coupler 591 is provided by passing the coupler 591 through the gap in the leading end portion of the opening/closing portion 15D while confining the linear member 52 with the opening/closing portion 15D.

LIST OF REFERENCE NUMERALS

1 Multicopter
F1 Airframe
11 Main body portion
12 Propeller
121 Rotor
13 Propeller guard
14 Reception portion
141 Opening
Turn piece
151 Opening/closing servomotor
16 Package holding portion
161 Housing space
162 Insertion hole
163 Protrusion
164 Lower surface
190 Control unit
191 Communication module
192 GPS information receiving unit
193 Camera
194 Reception detection sensor
195 Package attachment detection sensor
3 Control device
31 Control unit
32 Storage unit
33 Communication module
34 Input device
35 Output device
4 Package
41 Main body portion
42 Bottom surface
421 Protruding portion
422 Groove portion
43 Opening
44 Slide plate
441 Protrusion
5 Mooring device
51 Base portion
52 Linear member
53 Movable portion
531 Tubular member
532 Support table
533 Support surface
534 Back surface
535 Through hole
536 Hook member
540 Control unit
541 Communication module
542 Lifting/lowering drive unit
543 Lifting/lowering rotary encoder
544 Lifting/lowering motor
545 Lock drive unit
546 Multicopter detection sensor
547 Package lock servomotor
1A Multicopter
FA Airframe
11A Main body portion
17 Battery holding portion
171 Arm portion
172 Holding member
173 Groove portion
5A Mooring device
55 Movable portion
551 Tubular member
552 Turntable
553 Column portion
554 Partition plate
545A Rotation drive unit
547A Turntable servomotor
61,62 Battery
601 Casing portion
602 Neck portion
603 Protrusion
1B Multicopter
16B Package holding portion
161B Housing space
162B Insertion hole
163B Recess
5B Mooring device
51B Base portion
53B Movable portion
532B Support table
533B Support surface
534B Back surface
536B Hook member
4B Package
44B Slide plate
441B Protrusion
1C Multicopter
11C Main body portion
17C Battery holding portion
174 Turntable
175 Column portion
176 Partition plate
177 Turntable servomotor
178 Pressing servomotor
179 Pressing member
201 Power supply circuit
202 First relay switch
203 Second relay switch
204, 205 Diode
241 First battery support portion
242 Terminal portion
243 Second battery support portion
244 Terminal portion
5C Mooring device 55C Movable portion
555 Holding member
556 Groove portion
1D Multicopter
11D Main body portion
15D Opening/closing portion
18 Package holding portion
181 Holding member
182 Groove portion
4D Package
451 Casing portion
452 Neck portion
453 Protrusion
5D Mooring device
56 Base portion
561 Turnable plate
562 Reception opening
563 Interior space
564 Turntable
565 Side plate
566 Package holding portion
571 Reception opening turning unit
572 Rotary encoder for detecting turn angle of reception opening
573 Reception opening turning motor
574 Replacement drive unit
575 Replacement rotary encoder
576 Replacement motor
7 Second multicopter (another multicopter)
F7 Airframe
71 Main body portion
72 Propeller
721 Rotor
73 Propeller guard
75 Linear member
76 Movable portion
761 Tubular member
762 Support table
766 Hook member
780 Control unit
781 Communication module
782 GPS information receiving unit
783 Linear member drive unit
784 Linear member rotary encoder
785 Linear member motor
786 Lifting/lowering drive unit
787 Lifting/lowering rotary encoder
788 Lifting/lowering motor
791 Multicopter detection sensor
792 Package lock servomotor

The invention claimed is:

1. A multicopter system comprising:
a multicopter configured to fly in a state of holding a package; and
a mooring device that is installed at a target position of a flight of the multicopter and includes a linear member that extends in a predetermined direction from the target position,
wherein the multicopter includes a reception portion that has the shape of a recess including an opening that is open toward one direction, the reception portion being configured to receive the linear member via the opening in a direction intersecting with the predetermined direction.

2. The multicopter system according to claim 1,
wherein the mooring device further includes a movable portion that moves along the linear member and is configured such that the package can be delivered between the movable portion and the multicopter.

3. The multicopter system according to claim 2,
wherein the multicopter further includes a package holding portion that includes a housing space formed to be able to house the package, the housing space being in communication with the outside via an insertion hole that is formed on a side on which the movable portion is disposed,
the package includes an opening in a surface that is exposed from the insertion hole, and
the movable portion includes a hook member that is configured to be inserted into the opening of the package and lock the package.

4. The multicopter system according to claim 3,
wherein the movable portion further includes a support table including a support surface that supports the package, a back surface that is located opposite to the support surface, and a through hole that extends from the back surface to the support surface, and
the hook member is attached to a motor arranged on the back surface of the support table and is configured to take a first position at which the hook member protrudes toward the support surface side via the through hole and is inserted into the opening of the package and a second position at which the hook member does not protrude toward the support surface side and releases the package.

5. The multicopter system according to claim 1,
wherein the mooring device further includes a base portion that supports the linear member, and
the base portion includes:
an interior space that is formed to be able to house one or more packages;
a turnable plate that is arranged adjacent to the interior space in the direction in which the linear member extends and is configured to rotate around the direction in which the linear member extends; and
a reception opening that is provided in the turnable plate, through which the interior space is in communication with the outside, and that is formed such that the package can pass through the reception opening.

6. The multicopter system according to claim 5,
wherein the base portion further includes:
a turntable that is housed in the interior space and is configured to rotate coaxially with the turnable plate; and
a plurality of package holding portions that are arranged on a surface of the turntable facing the turnable plate so as to divide the surface in a direction of the rotation and are each configured to hold the package.

7. The multicopter system according to claim 1,
wherein the multicopter further includes a turn piece that is supported by an edge of the opening to be able to turn and take an open position at which the turn piece opens the opening and a closed position at which the turn piece closes the opening.

8. The multicopter system according to claim 1,
wherein the mooring device is installed on the ground or a ceiling, and
the linear member extends in a vertical direction from the ground or the ceiling.

9. A method for delivering a package between a multicopter and a mooring device, the multicopter being configured to fly in a state of holding a package, the mooring device being installed at a target position of a flight of the multicopter and including a linear member that extends in a predetermined direction from the target position, wherein the multicopter includes a reception portion that has the shape of a recess including an opening that is open toward one direction, the reception portion being configured to receive the linear member via the opening in a direction intersecting with the predetermined direction, and the mooring device further includes a movable portion that moves along the linear member and is configured such that the package can be delivered between the movable portion and the multicopter, the method comprising:

a first step of the multicopter approaching the linear member of the mooring device and receiving the linear member in the reception portion;

a second step of the mooring device moving the movable portion close to the multicopter;

a third step of at least one of the multicopter and the mooring device delivering the package between the movable portion and the multicopter that have come close to each other;

a fourth step of, after the package has been delivered, the mooring device separating the movable portion from the multicopter; and a fifth step of the multicopter separating from the linear member of the mooring device.

10. A method for delivering a package between a multicopter and a mooring device, the multicopter being configured to fly in a state of holding a package, the mooring device being installed at a target position of a flight of the multicopter and including a linear member that extends in a predetermined direction from the target position, wherein the multicopter includes a reception portion that has the shape of a recess including an opening that is open toward one direction, the reception portion being configured to receive the linear member via the opening in a direction intersecting with the predetermined direction, the mooring device further includes a base portion that supports the linear member, and the base portion includes an interior space that is formed to be able to house one or more packages, a turnable plate that is arranged adjacent to the interior space in the direction in which the linear member extends and is configured to rotate around the direction in which the linear member extends, and a reception opening that is provided in the turnable plate, through which the interior space is in communication with the outside, and that is formed such that the package can pass through the reception opening, the method comprising:

a first step of the multicopter approaching the linear member of the mooring device and receiving the linear member in the reception portion;

a second step of the mooring device positioning the reception opening with respect to the multicopter by rotating the turnable plate;

a third step of the multicopter moving along the linear member to approach the base portion;

a fourth step of at least one of the multicopter and the mooring device delivering the package between the interior space of the base portion and the multicopter via the reception opening;

a fifth step of, after the package has been delivered, the multicopter moving along the linear member to separate from the base portion; and a sixth step of the multicopter separating from the linear member of the mooring device.

* * * * *